US011994321B2

(12) United States Patent
Lee et al.

(10) Patent No.: US 11,994,321 B2
(45) Date of Patent: May 28, 2024

(54) HIGH PERFORMANCE COMPRESSORS AND VAPOR COMPRESSION SYSTEMS

(71) Applicant: ASPEN COMPRESSOR, LLC, Marlborough, MA (US)

(72) Inventors: Kang P. Lee, Sudbury, MA (US); Douglas S. Olsen, Natick, MA (US); Brian Callan, Stow, MA (US)

(73) Assignee: ASPEN COMPRESSOR, LLC, Marlborough, MA (US)

( * ) Notice: Subject to any disclaimer, the term of this patent is extended or adjusted under 35 U.S.C. 154(b) by 25 days.

(21) Appl. No.: 17/420,370

(22) PCT Filed: Jan. 3, 2020

(86) PCT No.: PCT/US2020/012216
§ 371 (c)(1),
(2) Date: Jul. 1, 2021

(87) PCT Pub. No.: WO2020/142712
PCT Pub. Date: Jul. 9, 2020

(65) Prior Publication Data
US 2022/0090829 A1    Mar. 24, 2022

Related U.S. Application Data

(60) Provisional application No. 62/787,943, filed on Jan. 3, 2019.

(51) Int. Cl.
*F25B 31/02*    (2006.01)
*F25B 1/047*    (2006.01)
(Continued)

(52) U.S. Cl.
CPC ............ *F25B 31/026* (2013.01); *F25B 1/047* (2013.01); *F25B 1/053* (2013.01); *F25B 31/002* (2013.01); *F25B 31/008* (2013.01)

(58) Field of Classification Search
CPC ........ F25B 31/026; F25B 1/047; F25B 1/053; F25B 31/002; F25B 31/008; F25B 31/023
See application file for complete search history.

(56) References Cited

U.S. PATENT DOCUMENTS 2,991,931 A  *  7/1961  Galin .................... F25B 31/026
                                                    418/91
3,105,633 A     10/1963  Dellario
(Continued)

FOREIGN PATENT DOCUMENTS

CH          98303 A      3/1923
CN        1420282 A      5/2003
(Continued)

OTHER PUBLICATIONS

Chinese Office Action dated Jun. 13, 2022 in connection with Chinese Application No. 202080018821.1.
(Continued)

*Primary Examiner* — David J Teitelbaum
(74) *Attorney, Agent, or Firm* — Wolf, Greenfield & Sacks, P.C.

(57) ABSTRACT

The present disclosure relates to a new breed of high performance compressors and associated vapor compression systems that can be used in wide ranging refrigeration, cooling and heating applications with significantly increased compressor isentropic efficiency, motor efficiency, reliability and longevity of the motor, the compressor pump and the system as a whole, as well as COP, heating capacity, and SEER of the new vapor compression systems utilizing the new high performance compressors. The design philosophy and modifications to the current configuration of rolling piston rotary compressor to arrive at the high-performance version of the same type will be readily applicable to other types of vapor compression compressors with only minor changes opening the way for adoption of the new design (Continued)

philosophy by the entire compressor industry resulting in serious reduction of carbon footprint for air conditioners, heat pumps and refrigerators worldwide.

29 Claims, 28 Drawing Sheets

(51) Int. Cl.
  *F25B 1/053*  (2006.01)
  *F25B 31/00*  (2006.01)

(56) References Cited

U.S. PATENT DOCUMENTS

| | | | | |
|---|---|---|---|---|
| 3,240,424 | A * | 3/1966 | Richardson | F25B 1/053 417/423.13 |
| 3,423,013 | A | 1/1969 | Rinehart | |
| 3,913,346 | A * | 10/1975 | Moody, Jr. | F25B 31/008 62/505 |
| 4,187,064 | A * | 2/1980 | Wheeler | F01C 1/3562 418/187 |
| 4,557,677 | A | 12/1985 | Hasegawa | |
| 5,012,896 | A | 5/1991 | Da Costa | |
| 5,222,885 | A | 6/1993 | Cooksey | |
| 5,322,420 | A | 6/1994 | Yannascoli | |
| 5,640,854 | A * | 6/1997 | Fogt | F25B 31/008 62/505 |
| 6,152,714 | A * | 11/2000 | Mitsuya | F01C 17/066 418/61.1 |
| 7,040,840 | B2 | 5/2006 | Zook | |
| 8,506,272 | B2 | 8/2013 | Fan et al. | |
| 11,655,820 | B2 | 5/2023 | Lee et al. | |
| 2003/0094007 | A1 | 5/2003 | Choi et al. | |
| 2006/0008360 | A1 * | 1/2006 | Nishikawa | F01C 21/0863 417/244 |
| 2015/0125330 | A1 | 5/2015 | Komura et al. | |
| 2015/0276282 | A1 * | 10/2015 | Heiden | F04D 29/5806 62/505 |
| 2016/0201669 | A1 | 7/2016 | Ryu et al. | |
| 2017/0002834 | A1 | 1/2017 | Powell et al. | |
| 2017/0248356 | A1 * | 8/2017 | Lee | F04C 18/3564 |
| 2021/0239118 | A1 | 8/2021 | Lee et al. | |
| 2023/0313797 | A1 | 10/2023 | Lee et al. | |

FOREIGN PATENT DOCUMENTS

| | | |
|---|---|---|
| EP | 3 406 905 A1 | 11/2018 |
| JP | H05-10278 A | 1/1993 |
| JP | 2012-247134 A | 12/2012 |
| WO | WO 2015/081338 A1 | 6/2015 |

OTHER PUBLICATIONS

International Search Report and Written Opinion mailed Mar. 4, 2020 in connection with International Application No. PCT/US2020/012216.

International Preliminary Report on Patentability mailed Jul. 15, 2021 in connection with International Application No. PCT/US2020/012216.

[No Author Listed], Aspen's New, Miniature, Rotary BLDC Compressors with 360 & 455W Ashrae LBP Ratings. Aspen Compressor. 2013. 1 page.

[No Author Listed], Q-Series Low Noise Miniature, Rotary BLDC Refrigeration Compressors. Aspen Compressor. Dec. 2013. 2 pages.

Dellinger, The temperature coefficient of resistance of copper. Bulletin of the Bureau of Standards. Nov. 1910;7(I):71-97. 31 pages.

Kim et al., Development of High-Side Shell Scroll Compressor with Novel Oil Return Mechanism. International Compressor Engineering Conference. Paper 2023. 2010. 8 pages.

Lungoci et al., Temperature effects on torque production and efficiency of motors with NdFeB. Revue Roumaine des Sciences Techniques. Serie Electrotechnique et Energetique. 2008;53(4):445-454.

Montone, Understanding DC Motor Curves and Temperature: Part 2. Motors/Ametek Precision Motion Control. Dec. 6, 2013. 20 pages. URL:https://www.motioncontroltips.com/understanding-dc-motor-curves-temperature-part-2 [retrieved on May 12, 2021].

* cited by examiner

| Description | Symbol | @ 25°C | @ 125 °C |
|---|---|---|---|
| No Load Speed | $n_0$ | 3160 RPM | 3979 RPM |
| No Load Angular Velocity | $\omega_0$ | 331 rad/s | 417 rad/s |
| Locked Rotor Current | $I_{LR}$ | 40.7 A | 28.9 A |
| Locked Rotor Torque | $T_{LR}$ | 2.88 Nm | 1.65 Nm |
| Terminal Resistance | $R_{mt}$ | 0.59 Ω | 0.83 Ω |
| Voltage Constant | $K_E$ | 0.071 V/(rad/s) | 0.057 V/(rad/s) |
| Torque Constant | $K_T$ | 0.071 Nm/A | 0.057 Nm/A |
| Motor Regulation | $R_m$ | 1111 RPM/Nm | 2412 RPM/Nm |

| Estimated performance comparison of a cooling system using compressors with a conventional, discharge-gas cooled, motor and a motor cooled by evaporation of liquid at suction temperature | | | | | | | | | |
|---|---|---|---|---|---|---|---|---|---|
| RPM | T EVAP, C | T CONDENSER, C | HI-SIDE MOTOR OPERATING TEMP, C | HIGH-SIDE MOTOR EFF AT OPERATING TEMP | HIGH/LOW SIDE MOTOR EFF AT TEVAP | HIGH-SIDE COMPRESSOR COP | HI/LO-SIDE COMPRESSOR COP | COP INCREASE % | MOTOR COOLING FLOW / EVAPORATOR FLOW, % |
| 6000 | -18.9 | 140.0 | 150 | 52% | 87.0% | 1.06 | 1.423 | 34.3% | 12.3% |
| 6000 | 4.4 | 120.0 | 130 | 64% | 84.1% | 1.90 | 2.150 | 12.9% | 8.4% |
| 6000 | 15.6 | 100.0 | 110 | 70% | 82.7% | 2.75 | 2.870 | 4.4% | 6.3% |

Figure 5

M: basic mass flow rate based on compressor displacement
m1: mass flow rate of In-shell heat exchanger for motor
m2: mass flow rate of In-shell heat exchanger for pump body/compression chamber
m3: mass flow rate of External vaporizer for extra subcooling

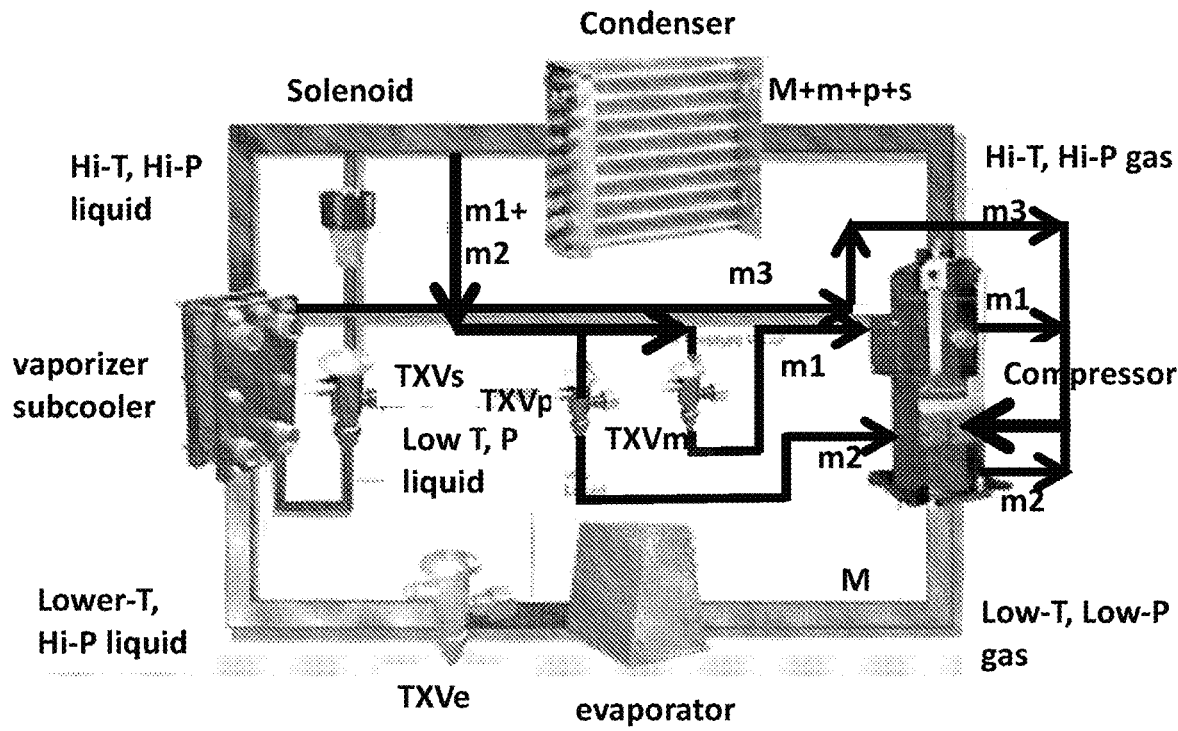

TXVe: Thermal expansion valve (TEX) for Evaporator
TXVm: TEX for Secondary Heat Exchanger for Motor
TXVp: TEX for Secondary Heat Exchanger for Pump
TXVs: TEX for Sub-cooler
T: temperature          P: Pressure

Figure 30

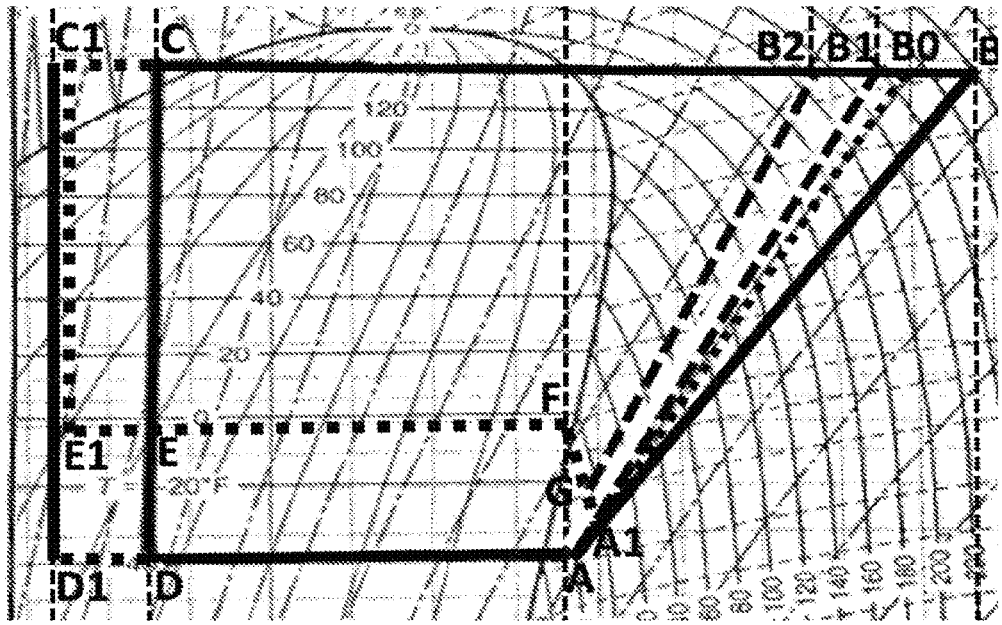

- Ideal isentropic compression curve: A-B0
- Basic refrigeration cycle: A-B-C-D-A (compressor mass flow rate M, compressor power $h_{B0}-h_A$ )
- Cycle with pump body cooling: A-B1-C-D-A (compressor mass flow rate M, compressor power $h_{B1}-h_A$ )
- Idealized supercharging process: F-G
- Process in External vaporizer, in-shell Motor cooler, In-shell Pump cooler: E1-F
- Cycle with supercharging: A-A1-G-B2-C-E-D-A (compressor mass flow rate M+m1 (In-shell Motor cooler) +m2 (In-shell Pump cooler))
- Cycle with supercharging and extra sub-cooling in external vaporizer: A-A1-G-B2-C1-D1-A (compressor mass flow rate M+m1 (Inshell Motor cooler) +m2 (In-shell Pump cooler) + m3 (external Vaporizer for extra subcooling)

Figure 31

HIGH PERFORMANCE COMPRESSORS AND VAPOR COMPRESSION SYSTEMS

CROSS-REFERENCE TO RELATED APPLICATIONS

This application is a 35 U.S.C. § 371 National Phase filing of International Application No. PCT/US2020/012216, filed on Jan. 3, 2020, entitled "HIGH PERFORMANCE COMPRESSORS AND VAPOR COMPRESSION SYSTEMS," which claims priority and the benefit under 35 U.S.C. § 119(e) to U.S. Provisional Application Ser. No. 62/787,943, entitled "COMPRESSORS WITH IMPROVED EFFICIENCY", filed on Jan. 3, 2019. The entire contents of these applications are incorporated herein by reference in their entirety.

FIELD

Disclosed embodiments are related to high efficiency compressors and vapor compression systems.

BACKGROUND

Various types of compressors, such as rotary compressors or scroll compressors, are used in a variety of applications such as air conditioners or heat pumps. In so-called high-side compressor designs, an interior space of a shell of the compressor is exposed to the discharge gas. In these compressors, most of the heat generated by the motor is removed by the discharge gas at the highest temperature within the system and with relatively poor heat transfer properties which drives up the motor operating temperature much higher than the already high discharge temperature. Resulting high motor operating temperature leads to lower motor efficiency which in turn causes more heat generation by the motor setting up a vicious cycle. In addition, the pump body, instead of getting cooled, gets heated by being exposed to the high temperature discharge gas with adverse consequence of lower isentropic efficiency of compression and higher shaft power for compression and lower volumetric efficiency and lower capacity.

Other existing compressor designs use a low-side arrangement, in which heat generated by the motor is mostly removed by the relatively low temperature suction gas but with relatively poor heat transfer properties which drives up the motor operating temperature much higher than the suction temperature. So therefore, the motor operating temperature is not that low even though suction gas is used as coolant. The pump body also gets cooled by the suction gas. These two heat sources, the motor and the pump body increase the temperature of the suction gas. Unfortunately, heating of the suction gas before entering the compression chamber has serious adverse effects of lowering volumetric and isentropic efficiencies which is what happens in a low side shell scroll compressor or a low side shell reciprocating compressor.

SUMMARY

The inventors have recognized and appreciated that existing state of the art compressor designs, including the above-described high-side shell and low-side shell designs, leave a lot to be desired because they are not utilizing the benefits of running the motor and the pump body at low temperatures to increase efficiencies. Instead the current state of the art compressors use counterproductive methods of cooling the motor and the pump body as described above. The current disclosures describe new design approaches to make the compressors operate far more efficiently by following a number of design guidelines, including: (1) significantly lowering the operating temperature of the motor to achieve much higher efficiency of conversion from the electrical power input to mechanical shaft power output, lower power input per unit mass processed in the compressor, and increasing the reliability of the motor; (2) providing affordable and simple means of effective cooling of the compression chamber to achieve much higher isentropic efficiency for the compression process thereby reducing the mechanical power required for compression process per unit mass; and (3) achieving the above two goals without adversely affecting cooling capacity, heating capacity, coefficient of performance ("COP" hereinafter) in cooling, and Seasonal Energy efficiency ratio ("SEER", hereinafter) in heating, and without materially increasing the cost of the compressor.

These design principles can be applied to a wide variety of hermetic, semi-hermetic and even some of open shaft compressors so long as their motor or the compressor pump assembly can be enclosed in a pressure sealing shell to incorporate features described in this disclosure in order to provide effective cooling. The compressors that can be modified will include, without excluding others not mentioned herein, roller-piston/vane type rotary compressors such as rolling piston compressors, concentric vane compressors, and swing compressors; high-shell scroll compressors; low-shell scroll compressors, screw compressors; linear compressors; double rotor compressors; reciprocating; and swash-plate compressors.

According to some aspects, a motor of a compressor according to the current disclosure may be internally disposed within its own independent shell such as in the case of open shaft configuration or magnetically driven configuration, a separate compartment within the compressor shell, or within the single contiguous shell of the compressor. The motors include permanent-magnet based BLDC motors, switching reluctance motors, induction motors, transverse flux motors, and other motors that can be used in these compressors with a characteristic that the performance of the said motor improves as the operating temperature of the motor decreases. This covers substantially all of the electric motors used.

The new cooling methods described herein make use of the working fluid at temperatures significantly lower than the discharge temperature, and optionally, in vapor compression applications, evaporation over the motor at pressures set between suction and discharge pressures to take advantage of the highly effective evaporative cooling, or in $CO_2$ based trans-critical refrigeration systems, high pressure fluid coming out of the high pressure heat exchanger (equivalent to condenser in a vapor compression system) endowed with much higher heat transfer properties compared to the case of cooling the motor using suction gas or discharge gas. In any of these cases, the new way of cooling the motor and the pump body would result in operating temperatures of the motor and the pump body much lower or closer to the cooling fluid temperature compared to those possible in the state-of-the-art compressors resulting in notable increases in motor efficiency and isentropic efficiency. The cooling fluid for the new compressors can be the refrigerant fluid at the evaporator temperature or between the evaporator temperature and condenser temperature. In a new VCS defined as S-Series VCS utilizing a new efficient compressor, defined as S-Series Compressor, the motor inside a shell or the pump inside a shell functions as a secondary evaporator or In-shell Heat Exchanger dedicated to effectively cool the motor or the pump so that motor operating temperature is close to that of the cooling fluid and the compression chamber operates at a much lower temperature to reap the benefits of intercooling or quenching. Cooling of the compression chamber, in this context, can be done by heat transfer between the cooling fluid and the external surface of the pump body or forcing the cooling fluid through strategically placed channels through the wall of the pump body conveniently and readily produced during manufacturing processes for components such as cylinder, flanges and mid plate with little appreciable cost impact, if any. Each of the two In-shell secondary heat exchangers can be designed to operate at the same or at pressures appropriate for each. In other forms of compression chamber cooling, liquid refrigerant coming out of the condenser can be injected into the compression chamber during compression stroke to quench the compressing gas to lower the effective discharge temperature and increase the isentropic efficiency of the compressor per unit mass processed by the compressor. Incorporating the Secondary Heat Exchangers for the motor or the pump of a compressor requires a very careful look into the design of each type of compressor to make sure the lubrication, leakages, friction, etc. are under control and the overall performance will improve as a result of the modifications.

The new cooling method of using the lower temperature working fluid as coolant and/or utilizing the above-mentioned secondary evaporators not only allow the use of less expensive, lower-temperature rated magnet and motor components but may also significantly increase the electrical efficiency, reliability and longevity of the internally disposed motor as well as increasing the isentropic efficiency, reliability and longevity of the pump body. However, using a portion of the condenser outflow for the secondary evaporators or direct liquid injection process would reduce the flow rate through the evaporator thus reducing the cooling performance of the vapor compression system.

In order not to adversely affect the cooling or heating performance of the vapor compression system when the secondary evaporators are used, supercharging process can be introduced by reinjecting the cooling fluid out of the secondary heat exchangers or external vaporizer into the compression chamber thereby creating a closed loop for the additional refrigerant flow needed in the secondary evaporators and the external vaporizer given a fixed displacement of a compressor if the motor, the BLDC drive and the pump mechanisms can withstand the higher torque requirement. It just happens that the supercharging injection opens another opportunity to increase the isentropic efficiency of the compression cycle, and ultimately the COP (coefficient of performance) of the cooling system or SEER of a heat pump. As a highly recommended option for the new compressors, re-injecting the refrigerant through a supercharging process into the compression space after effectively cooling the motor, the pump body or both, or using a separate flow from the condenser for this specific purpose of internal quenching of compression process. If done under the right conditions, the supercharging injection may result in significant improvement in isentropic efficiency of the compressor by effectively introducing a quenching effect during the compression process especially if the supercharging injection fluid has much lower specific enthalpy than that of the vapor inside the compressor for duration of the supercharging injection process, and the quenching effect will be more pronounced if the refrigerant contains liquid refrigerant that will rapidly evaporate upon injection without the damaging effect of liquid slugging or lubricant dilution by the liquid. The refrigerant (refrigerant vapor or wet vapor meaning vapor containing liquid) injected into the compression space via supercharging process during an appropriate duration of the compression process effectively increases the mass flow rate of the compressor beyond possible for its fixed displacement, thus the descriptor "supercharging". In the "supercharging" method, the supercharged amount of the refrigerant will be recirculated in a loop in addition to the flow going to the evaporator. As a result, there will be no reduction in mass flow rate through the main evaporator and therefore no reduction in cooling capacity for the cooling system. On the other hand, the higher compressor output due to supercharging will increase the heating capacity of the VCS in a heat pump mode, the latter is already used in a state-of-the-art heat pump system using scroll compressors and the extra refrigerant flow diverted from the condenser is not used to do any cooling for the motor.

According to some aspects, the supercharging mechanisms and the processes disclosed herein may be designed and optimized to fit the particular needs of a VCS. For example, to cool the motor at the lowest possible evaporation temperature in the secondary heat exchanger as close to the temperature of the primary evaporator, the injection pressure into the secondary heat exchanger cannot be much higher than the pressure of the primary evaporator. This means that the discharge pressure from the secondary heat exchanger would be even lower than the injection pressure into the secondary heat exchanger, and the pressure needs to be higher than the compression chamber pressure during the supercharging process. Since the supercharging injection takes place after the suction port is closed and after compression begins, the supercharging injection valve port area needs to be as large as possible allowed by the geometric constrains of a particular compressor to reduce pressure drop during injection, open right after the suction port is closed (by the roller in the case of rolling piston/vane type compressor) and its duration need to be as short as possible to minimize the pressure increase due to on-going compression. In addition, one has to also ensure that a sufficient and appropriate amount of refrigerant required to cool the motor mostly by evaporation will be injected into the compression space during the supercharging process.

In some instances, if the temperature of the secondary heat exchanger can be higher or if it is configured to cool the body of the compressor either on the surface or through the cooling channels inside the compressor, then the requirements for injection port design and timing can be less stringent. For example, if the target motor operating temperature is the average temperature of the primary evaporator and the condenser, the injection can take place much later during the compression cycle and the valve location and size can be more readily accommodated with less limitations imposed by the valve port location, injection pressure, etc.

On the other hand, the case of supercharging condenser liquid into the compression space to quench the compression space toward the end of the compression process to be used to avoid liquid slugging and oil dilution/wash away scenario that might occur in a roller-vane type compressor may present additional considerations. In this case, the supercharging injection is preferably done after the temperature of the refrigerant in the compression space is sufficiently high enough that the injected refrigerant, e.g., spray of fine liquid particles, will instantaneously vaporize on injection throughout the entire injection duration. However, in some instances, some compressors such as oil-less scroll compressor can accommodate certain degree of liquid slugging without much deleterious effect mechanically and performance wise in which case the supercharging becomes easier.

Another notable benefit of the supercharging injection would occur in heat pumps in that the heating capacity measured by the heat released from the condenser will increase because the refrigerant throughput of the compressor into the condenser is increase in the amount of supercharging and the compressor power input.

Certain embodiments using the presently disclosed cooling methods in oil lubricated VCS rotary compressors, in particular, makes it conducive to reconfiguring them into horizontal VCS rotary compressors for applications with limited headroom.

In one embodiment, a vapor compression system comprises a compressor comprising a pressure containment shell, a motor positioned within the shell, and a pump positioned within the shell and operatively coupled to the motor. The vapor compression system further comprises a condenser coupled to a discharge port of the compressor and configured to condense a refrigerant from a gas phase to a liquid phase. A first portion of the liquid phase refrigerant from the condenser is diverted to the motor and/or pump to cool the motor and/or pump. The vapor compression system further comprises a first expansion device configured to receive condensed refrigerant from the condenser and expand the refrigerant to lower a pressure of the refrigerant, and an evaporator configured to receive the refrigerant from the first expansion device and evaporate the refrigerant from the liquid phase to the gas phase. The gas phase refrigerant is directed to a suction port of the compressor.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 5 is a table of the estimated performance improvement of a rotary VCS compressor with a BLDC motor having an NdFeB Magnet rotor/copper stator winding operating at the evaporator temperature over that of a state-of-the-art high-side rotary VCS compressor with the same motor cooled by discharge fluid;

FIG. 30 is a schematic illustration of the performance improvement of Supercharging injection in cooling;

FIG. 31 is a plot of the performance improvement of Supercharging injection in heating;

DETAILED DESCRIPTION

Figure 1:
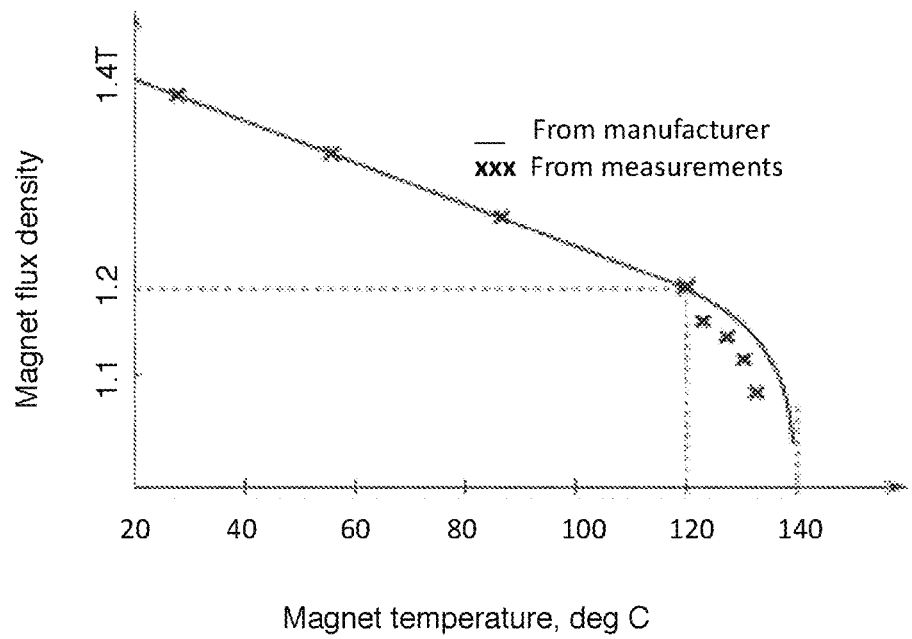
FIG. 1 is a graph of the magnetic flux density of a Neodymium (NdFeB) Magnet as a function of temperature.

As used herein, a Vapor-Compression System (VCS) may refer to a system designed to extract heat from one side and dump heat into the other side in which the working gas undergoes phase changes at two different pressures and temperatures. Its main components are a compressor, condenser, thermal expansion device, and evaporator. VCS is the most widely used method for air-conditioning of homes, buildings and automobiles as well as an efficient method of heating by utilizing the heat from the condenser compared to resistance heating. It is also used in domestic and commercial freezers, refrigerators, large-scale refrigerated warehouses for chilled or frozen storage of foods and meats, refrigerated trucks and railroad cars, and a host of other commercial and industrial services such as oil refineries, petrochemical and chemical processing plants, and natural gas processing plants. It can also be used as heat pumps for hot water, clothes driers, homes, buildings, electric cars, etc.

As used herein, a trans-critical fluid compression system may refer to a sub-set of a VCS reaching into the supercritical and subcritical region of a refrigerant such as $CO_2$ during the high-pressure, high-temperature process. Its main components are a compressor, high pressure trans-critical heat exchanger instead of a condenser, thermal expansion device, and evaporator.

As used herein, an in-shell secondary heat exchanger for the motor may refer to a heat exchanger consisting of a shell, the motor and appropriate flow paths to remove heat from the motor using the liquid refrigerant preferably through evaporation.

As used herein, an in-shell secondary heat exchanger for the pump may refer to a heat exchanger consisting of a shell, the pump and appropriate flow paths to remove heat from the pump/compression chamber using the liquid refrigerant preferably through evaporation.

As used herein, an external vaporizer may refer to a heat exchanger to remove heat from the main liquid flow from the condenser or the high-pressure heat exchanger utilizing the diverted liquid flow expanded to appropriate pressure and temperature preferably through evaporation or high effectiveness heat transfer mechanism of the cooling fluid.

As used herein, diverted refrigerant flow may refer to the portion of the liquid refrigerant out of the condenser in a VCS or refrigerant out of the high pressure heat exchanger of a trans-critical system to be used as coolant in the in-shell secondary heat exchangers for the motor, pump body or external vaporizer and preferably to be returned to the compression space during compression process through supercharging process.

As used herein, supercharging may refer to a method of injecting refrigerant diverted from condenser or high pressure heat exchanger of a VCS, coming out of an in-shell secondary heat exchanger after removing heat from the motor and compression chamber/pump body, or out of an external vaporizer for additional subcooling of the main refrigerant after removing heat from the main liquid stream into a compression chamber at an appropriate time during its compression process preferably after the suction port is closed and before the discharge port opens in order to achieve performance enhancements in terms of, significantly lower motor operating temperature leading to higher motor efficiency, longer motor life, high reliability, significantly lower compression chamber temperature leading to lower operating temperature for the pump, higher compressor isentropic efficiency, lower compressor power per unit mass of refrigerant compressed by the compressor, lower discharge temperature, better lubrication and longer life for the compressor pump, and increased cooling or heating capacity, higher COP, or higher SEER of the VCS.

As used herein, an S-series Compressor may refer to a VCS compressor equipped with provisions for supercharging (reinjecting) the refrigerant into the compressor which is diverted from the liquid flow of a condenser (high pressure heat exchanger in a transcritical CO2 system) and used to cool the motor effectively at low temperature and across low temperature gap to attain low motor operating temperature leading to high motor efficiency; cooling the pump body externally to increase isentropic efficiency; or injection into the compression chamber to quench the compression process to increase the isentropic efficiency and decrease compressor power per unit mass. The supercharging will lead to significantly higher overall performance of the compressor due to much higher electric-to-mechanical power conversion efficiency in the motor owing to lower motor operating temperature, higher volumetric efficiency during suction process due to lower effective suction temperature, higher isentropic efficiency and lower discharge temperature during compression owing to intercooling of the compression chamber, higher total refrigerant discharge flow rate for a fixed displacement compressor owing to added refrigerant flow by supercharging during the compression process, longer life expectancy owing to low temperature operation of the motor with ensuing longer life expectancy and lower temperature operation of the compression chamber and lower discharge temperature leading to better lubrication, sealing, reduced wear of parts and bearing, and increased reliability owing to all of the above.

As used herein, an S-series VCS may refer to a VCS system equipped with an S-series Compressor along with fluid lines, valves, expansion devices, external vaporizer, control logic and hardware, and other provisions to accommodate the S-series compressor's functions and features leading to significantly higher performance of the VCS in terms of coefficient of performance, cooling or heating capacity, and reliability.

As used herein, a roller-piston/vane rotary compressor may refer to a hermetic or semi-hermetic rotary compressor comprising: a pressure containing shell housing a rotary motor, either an inner rotor or outer rotor type, a rotary compressor pump assembly driven by the rotary motor; wherein one end of the eccentric shaft of the compressor pump assembly is connected to and driven by either an inner rotor or an outer rotor of the motor, wherein a compressor pump assembly consists of at least one vane, a shaft with at least one eccentric driving at least one roller per eccentric, at least one cylinder equipped with an intake port and a slot or a cavity to accommodate the movement of the vane during each cycle, at least one roller per eccentric performing the function of a piston, an upper flange with an upper bearing bore and discharge valve and its port (or, in a two-pressure shell configuration, an upper plate with the discharge valve and its port and a separator containing an upper bearing bore), at least one mid-plate in a multiple cylinder configuration, and a lower flange with a lower bearing bore, a discharge valve and its port; wherein the vane is either designed to travel back and forth in the vane slot while the ring shaped roller-piston rolls on the inner contour of the cylinder while maintaining contact with the roller similar to a state-of-the-art rolling piston compressor, or the vane is physically attached to the roller and designed to swing and move in and out of a space provided in the cylinder body while the ring shaped roller-piston driven by the eccentric moves along the inner contour of the cylinder similar to a state-of-the-art swing compressor; wherein the internal compression space(s) within each compressor pump, formed by the cylinder inner diameter surface, flanges, mid plate, upper plate, roller(s), and the vane, etc. undergo(es) cyclic change in volume executing suction, compression, discharge and re-expansion processes; wherein the roller-piston/vane rotary compressor includes, without excluding others that fit the above general description, the state-of-the-art rolling piston compressors, swing compressors, and the so-called concentric vane compressors with two or more nestled rollers forming multiple compression spaces for each pair of shaft eccentric-vane; wherein the roller-piston/vane rotary compressor is either a single-cylinder pump or multiple-cylinder pump compressor; wherein the multiple-cylinder pump compressors is either a single stage or multi-stage compressor; wherein the compressor is a conventional, vertically operating model or a horizontally-operating model with the lubricant intake port located on the periphery of one of the components of the compressor pump assembly where the lower part of the component having the intake port provided is immersed in the lubricant sump, or in communication through a tube connecting the intake port to the lubricant sump, wherein the compressor can have any of the attachment methods between and among the pump assembly, motor, separator, shell, etc. in terms of direct or indirect methods using an intermediary component.

As used herein, a high-side shell roller-piston/vane rotary compressor may refer to a roller-piston/vane rotary compressor wherein the space inside its shell is exposed to the high pressure and high temperature of the discharge gas, and the heat generated by the motor during conversion of electrical power to mechanical power by the motor is carried away mostly through convection heat transfer by the relatively high temperature discharge gas. Therefore, the base temperature of the coolant gas for the motor is the already high discharge gas temperature. The motor operating temperature will go much higher than the discharge temperature due to a relatively low convection heat transfer to the level necessary for the motor heat to be transferred from the motor to the discharge gas. The state-of-the-art roller-piston/vane rotary compressors, such as rolling piston compressor or swing compressor, fall within this category.

As used herein, an adjustable pressure, single shell, rotary vapor compression compressor may refer to a rotary compressor in a single shell used in VCS applications; wherein neither the suction gas nor the discharge gas interact with the gas inside the shell; wherein, if the compressor is oil lubricated, the oil entrained in the discharge gas is separated by an oil separator, either internal or external, and fed back to the in-shaft cavity high pressure oil reservoir or other appropriate internal oil reservoir within the compressor pump assembly; wherein there is a line injecting the liquid refrigerant from the condenser into the shell; wherein the pressure inside its shell is controlled between the suction pressure and discharge pressure by suitable means such as a thermal expansion valve, or needle valve, etc. and the heat generated by the motor during conversion of electrical power to mechanical power is to be mostly carried away by the evaporation of the injected liquid in contact with the motor. The base temperature of the motor is the evaporation temperature of the refrigerant at the shell pressure which is generally much lower than the discharge temperature. Due to the extremely high heat transfer coefficient of evaporative cooling, the motor operating temperature will go only slightly higher than the evaporation temperature of the liquid at the selected pressure. The shell pressure, which determines the evaporation temperature of the liquid and becomes the base temperature of the motor, is to be set for optimum compressor/system performance taking into account motor efficiency, compressor pump cooling, pumping loss of the lubricant leaking from the pump assembly to the shell, etc. This would be much more favorable to what happens in the state-of-the-art rotary compressors in which the motor is cooled by the discharge gas with relatively low convection heat transfer resulting in a much higher temperature rise over the already higher discharge gas temperature resulting in decreased motor efficiency.

As used herein, a low-side shell roller-piston/vane rotary compressor may refer to a roller-piston/vane rotary compressor wherein the space inside its shell is exposed to the suction gas and/or evaporating liquid injected into the shell acting as the cooling medium whose pressure and temperature are at or near those of the suction gas, and the heat generated by the motor during conversion of electrical power to mechanical power is to be carried away by the relatively low temperature cooling medium. Therefore, the base temperature of the coolant gas for the motor is close to the relatively low suction gas or evaporator temperature. The motor operating temperature will increase above the cooling medium temperature to the level necessary for the motor heat to be transferred from the motor to the cooling medium. The low-side shell roller-piston/vane rotary compressor comes with an in-shaft cavity high pressure lubricant reservoir fed from the low-pressure lubricant sump using a lubricant pump with extremely low and variable flow/high pressure boost capability to take the lubricant from the low-pressure sump to a high pressure for lubricating and sealing he rotating components of the compressor pump during the compressor operation. The required lubricant pressure inside the in-shaft cavity high-pressure lubricant cavity would be between the mean pressure within the compression chamber(s) and the discharge pressure and a default pressure would be the discharge pressure. If the compressor comes with an inner-rotor motor, it can have any one of the eight potential configurations. If the compressor comes with an outer-rotor motor, it can have any one of four potential configurations in terms of direct or indirect attachment means among the motor's stator, compressor pump and the shell. There are no known, practical, low-side shell roller-piston/vane rotary compressors used in the world.

As used herein, a vane-assist, high-pressure, gas cavity may refer to an internal cavity in a low-side shell roller-piston/vane rotary compressor at the back of the vane slot opposite to the roller. This cavity, kept at discharge pressure, for example, by providing a connecting passage to the discharge muffler, replicates in a low-side shell roller-piston/vane rotary compressor, the same vane dynamics of a state-of-the-art high-side shell rolling-piston compressor that have been well tested over decades of use. Vane-assist, high-pressure, gas cavity is defined as an enclosed cavity in the back of the vane for a low-side shell rolling piston rotary compressor and Adjustable pressure, single shell, rolling piston rotary compressor, maintained at discharge pressure, to closely replicate the vane operating condition, gas and lubricant leakage phenomena found in a state-of-the-art high-side shell rolling piston compressor.

As used herein, a separator may refer to a pressure-separating member within a shell that would create a discharge pressure/temperature section (high-side shell section), and a low pressure/temperature section (low-side shell section). The separator can be attached to the compressor pump assembly and the shell by various means such as press-fit, interference fit, welding, bolts, screws, etc. The separator can be an extension of one of the components of the compressor pump itself (e.g., the upper flange or the cylinder with an extended perimeter could act as a separator).

As used herein, a high-side/low-side shell roller-piston/vane rotary compressor may refer to a roller-piston/vane rotary compressor, wherein the space inside the shell is divided into two sections by a Separator: a high-side section (high pressure/high temperature section) formed by one side of the separator, the external surface of the compressor pump, and the corresponding side of the shell and to which a discharge tube is connected; in which high-side shell section there are pump assembly, and a lubricant sump at the lower part of the high-side shell, the space within being exposed to and maintained at or near the high discharge pressure; and a low-side shell section (low pressure/low temperature section) formed by the other side of the separator, the exposed portion of the upper flange or low-side flange of the compressor pump and its side of the shell and to which a suction pressure working fluid line and/or liquid injection line is connected; wherein the motor is located inside the low-side shell and cooled by the low temperature fluid coming into the low-side shell; wherein the body of the compressor pump assembly and the high pressure lubricant sump are located in the high-side section; wherein the cooling fluid for the motor exits the low-side shell either through an entrance provided on the separator and through an internal passage in the compressor pump assembly or through an external tube attached to the low-side shell that goes back into the high-side shell, both leading to the suction plenum in the compressor pump located in the high-side shell and to the suction port(s) for the cylinder(s) during suction process; wherein the compressor comes with an in-shaft cavity high pressure lubricant reservoir fed from the high pressure lubricant sump; and kept near discharge pressure; wherein there are optional provisions for balanced axial and radial forces exerted on the shaft by the lubricant; and wherein there are optional provisions for balanced axial forces exerted on the shaft by the gas pressure.

As used herein, a high-side/adjustable low-side shell roller-piston/vane rotary VCS compressor may refer to a high-side/low-side shell roller-piston/vane rotary compressor used in VCS applications wherein there is a line introducing the liquid refrigerant from the condenser into the low-side shell; wherein the pressure inside its low-side shell can be adjusted between the suction pressure and discharge pressure by suitable means such as a thermal expansion valve, or needle valve, etc. and the heat generated by the motor during conversion of electrical power to mechanical power by the motor is mostly carried away by the evaporation of the liquid in contact with the motor. The pressure inside the low-side shell may be adjusted to optimize the compressor/system performance taking into various factors such as the pumping loss due to lubricant leakage past the upper bearing which decreases when the low-side shell pressure is increased so that the pressure differential between the high-side shell and the low-side shell decreases, motor efficiency which increases when the low-side pressure is lowered as the motor coolant temperature gets lower and the motor operating temperature gets lower accordingly; wherein the base temperature of the motor is the evaporation temperature of the refrigerant at the selected pressure. Due to the extremely high heat transfer coefficient of evaporative cooling, the motor operating temperature will go only slightly higher than the evaporation temperature of the liquid at the selected pressure. The cooling fluid will exit the low-side shell and will go through an expansion device, if necessary, leading to the evaporator. This would be much more favorable to what happens in the state-of-the-art rotary compressors in which the motor is cooled by the discharge gas with relatively low convection heat transfer resulting in a much higher temperature rise over the already high discharge gas temperature.

As used herein, a vertical roller-piston/vane rotary compressor may refer to a roller-piston/vane rotary compressor that operates with its axis of the rotating shaft in nominally vertical orientation. A vast majority of the state-of-the-art roller-piston/vane rotary compressors such as rolling piston and swing compressors falls under this category.

As used herein, a horizontal roller-piston/vane rotary compressor may refer to a roller-piston/vane rotary compressor that operates with its axis of the rotating shaft in nominally horizontal orientation.

As used herein, a low-side flange may refer to a flange that is facing the low-side section of the High-side/low-side shell roller piston compressor for both the vertical and horizontal configurations. For example, the upper flange of a vertical High-side/low-side shell roller-piston/vane rotary compressor is a low-side flange.

As used herein, a high-side flange may refer to a flange that is located fully inside the high-side section of a High-side/low-side shell roller piston compressor. For example, the lower flange in a vertical High-side/low-side shell roller piston compressor is a high-side flange.

As used herein, a shaft-balancing gas cavity may refer to an internal cavity within the pump assembly of a High-side/low-side shell roller-piston/vane rotary compressor or high/adjustable low-side shell roller-piston/vane rotary compressor kept at the same pressure as the low-side shell to balance the forces acting on two ends of the eccentric shaft by the gas pressure. In a vertical High-side/low-side shell roller-piston/vane rotary compressor, the top of the shaft is located in the low-side shell and exposed to the pressure between the suction pressure and the discharge pressure, and therefore it is preferred that the bottom end of the shaft needs to be exposed to the same low-side shell pressure to balance the axial forces by the pressure acting on the two ends of the shaft. Its natural and convenient location is below the bottom tip of the sealed-off eccentric shaft and above the sealed off lower flange. The pressure inside the shaft pressure balancing cavity is kept at near suction pressure via a connection to the suction plenum if the low-side shell is at suction pressure. If not, the connection will be to the low side shell. In a horizontal version, the directional descriptors such as top, bottom, upper and lower shall be appropriately replaced by left and right, or low-side or high-side.

As used herein, an in-shaft cavity, high-pressure lubricant reservoir may refer to an internal cavity within the eccentric shaft of a roller-piston/vane rotary compressor as a relatively high-pressure lubricant reservoir for the compressor. Its role is to act as a distribution reservoir for the high-pressure lubricant and provide the lubricant to the pump assembly as needed from its central and proximate location to all the moving parts of the pump assembly. This core feature is present in all the state-of-the art roller-piston/vane rotary compressors, High-side/low-side shell roller-piston/vane rotary compressor, high/adjustable low-side, and low-side roller piston/vane rotary compressors.

As used herein, a critical lubricant reservoir pressure may refer to the minimum lubricant pressure to be maintained inside the In-shaft cavity, high-pressure lubricant reservoir to provide sufficient lubrication into the pump assembly during rotary compressor operation for adequate lubrication and sealing of the interfaces of the moving components of the compressor pump assembly.

As used herein, a motor of a compressor may refer to an electrically driven motor either an inner-rotor motor or outer-rotor motor and can be of any type whose performance improves as the operating temperature is lowered.

As used herein, a working gas of a rotary compressor may refer to a vapor, gas, refrigerant, hydrocarbon gas/vapor or any fluid-mixture that is compressible and to be compressed by the compressor.

As used herein, a lubricant of a rotary compressor may refer to any one or mixture of the following: VCS and gas compressor oils including, but not excluding others, POE oil, PVE oil, PAG oil, mineral oil, Shell Corenatm, Shell Riselatm.

The inventors have recognized and appreciated that there are three primary approaches that can improve the performance of a compressor in a VCS: (1) increase motor efficiency that reduces the input power to meet mechanical shaft power requirement of pump per mass flow rate through the compressor; (2) increase isentropic compression efficiency to reduce the mechanical shaft power needed by the pump per mass flow rate through the compressor; and (3) increase effective capacity (heating or cooling) without proportionately increasing the input power per mass flow rate through the compressor. Motor efficiency will increase if its operating temperature is lowered. Compression efficiency will increase if the compression chamber gets cooled. Added subcooling will increase the cooling or heating capacity but one has to find ways to accomplish it without adversely affecting the overall performance of the VCS.

In general, a state-of-the-art rotary compressor such as roller-piston/vane rotary compressor or scroll compressor has thermodynamic advantages of having a higher isentropic efficiency because of the inherently favorable compression chamber shape that reduces the entropy-generating cyclic heat transfer between the compression space wall and the gas inside, and also generally lower mechanical friction compared to a reciprocating compressor. However, there are applications in which the use of a rotary compressor is not recommended in favor of a reciprocating compressor (which has a low-side shell and the motor is exposed to the suction gas) or downright untenable due to the significant adverse effects of operating the motor in the high discharge gas environment (in most rotary compressors) which could result in very poor efficiency or insufficient torque or downright damage to the motor due to the high temperature resulting in permanent compressor damage.

One such example occurs when the suction pressure and density are extremely low because the desired evaporator temperature is very low but the desired discharge pressure is very high because of high ambient temperature and correspondingly high condensing temperature. In this example of double whammy, the refrigerant flow rate is very low and the discharge temperature is very high creating a condition for motor burnout at worst or very poor and unacceptably low performance at best.

A second example is a BLDC roller-piston/vane rotary compressor for compressing air or gases when the suction pressure is very low but the desired discharge pressure is very high. In these examples of high pressure-ratio compression, the temperature of the discharge gas could become extremely high due to high heat of compression, and the flow rate of the gas is also low due to low suction density and low volumetric efficiency as a result of high pressure-ratio.

A third example is the use of certain refrigerants such as R410a or $CO_2$ that the discharge temperatures are inherently high as to reduce the motor performance significantly or go beyond the maximum tolerable temperature of affordable or economically feasible permanent magnet material or stator insulator.

In the above examples, the high discharge temperature would set the baseline coolant temperature for the motor at the highest end, the low coolant flow rate would cause a low rate of heat transfer between the motor, because the heat transfer coefficient between the discharge gas and the motor is relatively low, and as a result, operating temperature of the motor may increase to the point that the performance and reliability degrades so that the use of the BLDC roller-piston/vane rotary compressor will become unwise or downright untenable.

In a state-of-the-art roller-piston/vane BLDC compressor, the discharge gas comes out of the discharge valve port out of the pump assembly into the space inside the shell and blows by the motor. This means that the space inside the shell is exposed to the relatively high pressure and the temperature of the discharge gas which happens to be highest in the whole refrigeration or vapor compression process in the system, and the internally disposed motor is, unfortunately, cooled by the highest temperature refrigerant, i.e., discharge gas. In other words, the starting temperature of the coolant for the motor is the discharge gas temperature and the motor operating temperature will inevitably go much higher than the discharge temperature, due to the generally poor heat transfer coefficient between the motor and the discharge gas, to the level necessary for the motor heat to be transferred from the motor to the discharge gas. Therefore, when the discharge temperature becomes elevated due to operating requirements such as high condensing temperature, high compression ratio, or use of a refrigerant that inherently has higher discharge temperatures, the motor has to deal with the problem of having a cooling fluid at an already high base temperature of the discharge gas temperature. To make matters worse, in a case of very low temperature applications, the flow rate of the refrigerant and the convection heat transfer coefficient may become too low to provide adequate cooling of the motor by the discharge gas and as a consequence the motor temperature rises too high above the already discharge temperature in order to shed the heat generated by the motor to the cooling fluid as an inevitable consequence of the low refrigerant flow rate and low convection heat transfer rate. As a result, the motor operating temperature may rise to too high a level leading to extremely low motor efficiency or the high motor temperature may damage the rotor magnet or stator winding. Either way, these drawbacks of high-side rotary compressors will either prevent their use in these applications altogether, or requires the high-side shell rotary compressor to be equipped with more expensive higher temperature grade, rare-earth and other permanent magnets and stator wiring coating resulting in higher costs for the compressor. Given the fact that rotary compressors are already much more expensive than reciprocating counterparts, the use of even higher cost motor components would not be conducive to widespread use of generally more efficient and desirable rotary compressors. However, having the entire shell at discharge pressure has the benefit of easily injecting the flow of lubricant from the sump into the compressor pump assembly through the center intake hole at the bottom tip of the eccentric shaft from the lubricant sump below. This current configuration of the state-of-the-art roller-piston/vane rotary compressor and its minor variations have been successfully used for decades in VCS and other systems when the pressure ratios were not extremely high and the discharge temperature does not exceed temperature limits set by the properties of the magnet for the rotor, and/or the stator winding. In applications in which the discharge temperature becomes excessively high or the motor operating temperature becomes excessively high, the roller-piston/vane BLDC compressors were simply not used in favor of reciprocating and other types of compressors despite the fact that their efficiencies of roller-piston/vane compressors are generally higher. Described below is an example of why the standard roller-piston/vane BLDC compressor design configuration may not work for the case of extremely high discharge temperatures.

The following expressions/equations for ideal gases can be used to estimate the temperature increase due to compression, with a pressure ratio of P2/P1, where P1=suction gas pressure, and P2=discharge gas pressure; V1=clearance volume, and V2=Maximum volume; and T1=suction gas temperature, and T2=discharge gas temperature:

$$P1V1/(mRT1)=P2V2/(mRT2) \quad \text{(Eqn. 1)}$$

$$P1V1k=P2V2k \quad \text{(Eqn. 2)}$$

$$T2/T1=(P2/P1)(k-1)/k \quad \text{(Eqn. 3)}$$

where k is the ratio of specific heats (~1.2 for natural gas, and ~1.4 for air).

As an illustrative example, in order to compress low-pressure gas (e.g., natural gas at 15 psia and 68 F/528R) to high pressure gas into a reservoir with a high pressure boost ratio of 33 to 100 (e.g., 500 psia or 1500 psia), the extreme high temperature (e.g., 485 F or 690 F using ideal gas equations above) of the compressed gas due to the high compression ratios of 33 to 100 simply precludes the use of the standard configuration of the roller-piston/vane BLDC compressor using permanent magnet rotor and copper winding of the stator. If air with k=1.4 is to be compressed, the discharge temperatures become 974 F and 1508 F, respectively. These high discharge temperatures render the use of standard design BLDC roller-piston/vane rotary compressors even more untenable. The copper winding, its coatings and insulators used for the stator will be damaged and even, Samarium Cobalt magnet, the highest temperature grade permanent magnet, will not survive these temperatures causing permanent and irreparable damages to the BLDC motor and disabling the compressor and therefore BLDC roller-piston/vane rotary compressors cannot be used.

Cooling the internally disposed motor of roller-piston/vane compressors by liquid refrigerant injection instead of the discharge gas and/or suction gas would certainly increase the range of applications for a roller-piston/vane rotary compressor. For example, a compressor motor operating at much lower temperature close to evaporator temperature will have the added benefits of lower resistance heating in the stator wire, higher magnetic flux density, and higher torque generated by the motor, and higher overall electrical efficiency and higher reliability of the motor for a given current and voltage. In the present disclosures, in addition to making it possible to cool the motor using the suction gas, the new configuration used in vapor compression systems such as a refrigeration, air conditioning or heat pump applications, enables a simple and convenient way of injecting a separate, metered or unmetered stream of liquid refrigerant or other working fluids diverted directly from the condenser into the low-side section at pressures between the suction pressure and the discharge pressure to accomplish the following: Direct evaporative cooling of the motor by evaporation of the liquid.

The injection of a small portion of the refrigerant fluid flow from the condenser (or high pressure heat exchanger) in the form of liquid sprayed onto the motor ensures that the motor winding and magnet temperatures will remain much closer to the temperature of the evaporating liquid (which could become as low as suction gas temperature or evaporator temperature if the motor's shell pressure is adjusted to the suction pressure) than just using a working gas at low temperature.

The immediate effect of operating the motor near suction or evaporator temperature, is a potential increase in motor efficiency to a significant but varying degrees depending on the operating conditions of the compressor as described previously. The optimum pressure at which the low-side shell is maintained will vary between the suction pressure and the discharge pressure depending on various factors such as the rate of lubricant leakage from the pump assembly to the low-side shell through the shaft seal (upper bearing), the degree of improvement of motor efficiency at the temperature achieved at the low-side shell, heat transfer effectiveness between the cooling fluid and the motor, etc. The low-side shell pressure can be adjusted, for example, by using a thermal expansion valve.

In one example, the estimated performance advantages that can be achieved if the motor can be cooled by the suction gas or liquid refrigerant impingement instead of the discharge gas are as follows:

A. The Reduction in Resistance Heating in the Motor Wiring:

The temperature dependence of copper wiring resistance is provided as R(initial)[1+α(T(final)−T(initial)], where α is the temperature coefficient of resistivity and, for copper, ~0.004/° C. Because the difference between the discharge temperature and suction temperature can easily be 100° C. in an air conditioning or VCS compressor (e.g., 20° C. compressor suction temperature, and 120° C. discharge temperature), the resistance heating by the stator wire if exposed to the suction gas rather than the discharge gas could be reduced by ~27% {=1−(1+0.004×20)/(1+0.004×120)}. In addition to the fact that the suction gas itself is already colder (e.g., 20° C.) providing baseline motor temperature of 20° C. instead of 120° C., the level of resistance heating of the wiring is much less which in turn causes less resistance heating creating a cascading benefits in motor/compressor performance. The heat generated by the motor supplying the same mechanical power in the case of motor operating at −20° C. is reduced by 38% {=1−(1−0.004×20)/(1+0.004×120)} compared to 120° C. In a motor operating with efficiency of 90% at −20° C., 10% of the electrical input power input turns into heat. The same motor at 120° C. will lose 16% (10%/(1−0.38)) of the electrical input power into heat resulting in motor efficiency of 84%.

Therefore, it is highly desirable to expose the motor (rotor magnet and stator) to the low temperature suction gas and, if possible, the evaporating liquid even for the commonly encountered discharge temperatures in air conditioning, heat pump and VCS applications. If it can be done without much increase in cost for the compressor, the new low temperature, liquid cooled configuration would be highly desirable for the significant advantages over conventional discharge cooled roller-piston/vane rotary compressors in general just from the view point of reducing the motor winding loss due to resistance of the winding.

B. A Higher Magnetic Flux at Lower Permanent Magnet Temperatures:

There are other as important advantages of operating the BLDC motor at much lower temperatures: higher magnetic flux (increase of 0.0011 per ° C. decrease in motor temperature) and longer life of magnet itself, the lower cost grade for rare earth magnet by using low temperature rated magnets compared to the high temperature capable magnets, and the lower cost and likely longer life expectancy of the insulator and the integrity of the wiring for the stator, and therefore motor and the compressor itself. FIG. 1 shows the relationship between the magnetic flux density of a commonly used grade of NdFeB magnet as a function of the magnet temperature. It shows that the flux density of the same grade NdFeB magnet increases from 1.2 T to 1.4 T as the temperature goes from 120° C. to 20° C., a 17% increase which is significant. This would enable the reduction in magnet material of the same grade or downgrading to a less expensive grade of NdFeB magnet.

Figure 2:
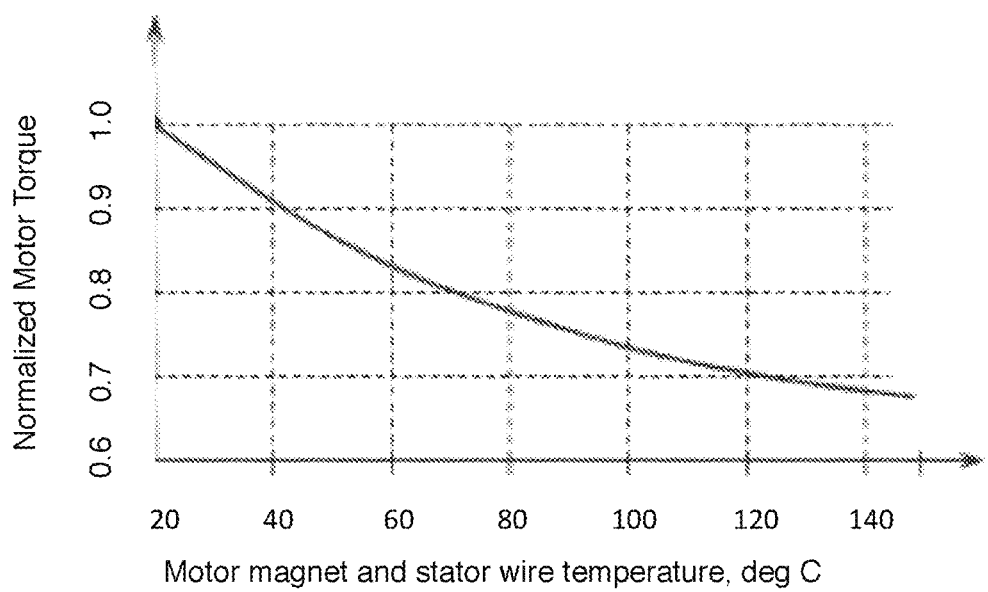
FIG. 2 is a graph of the normalized torque for a BLDC motor with a Neodymium (NdFeB) magnet rotor and copper stator winding as a function of the operating temperature of the motor.
Figure 3:
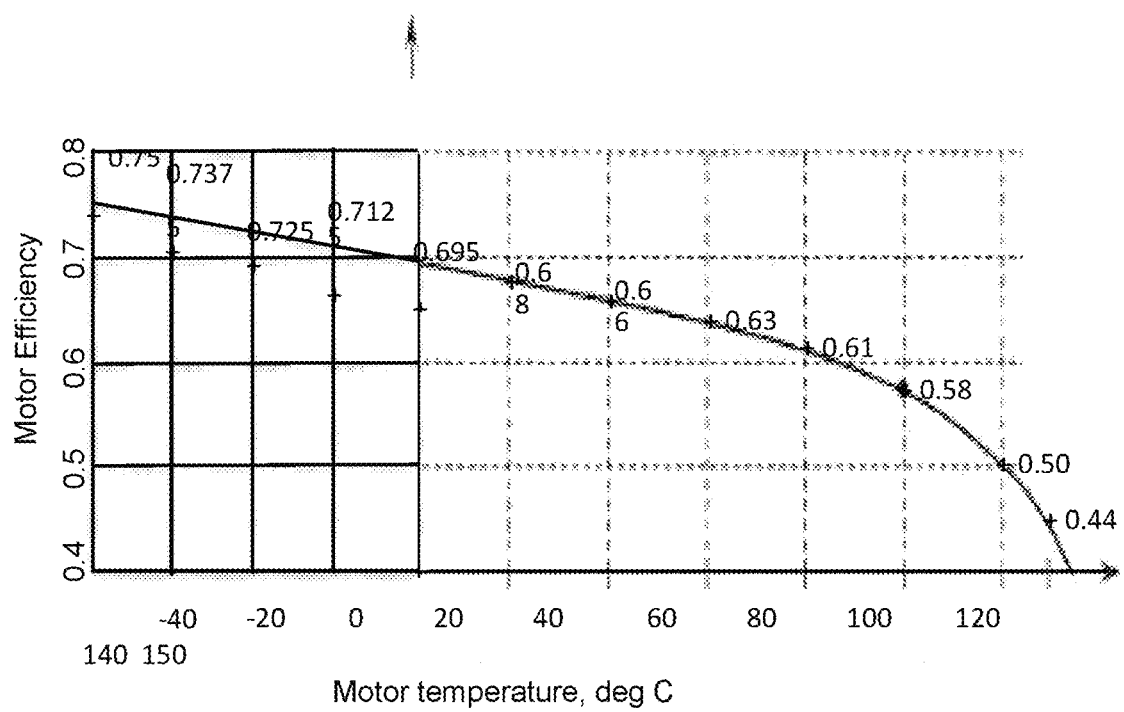
FIG. 3 is a graph of the efficiency of a BLDC Motor with Neodymium (NdFeB) Magnet rotor and copper stator windings as a function of the operating temperature of the motor.
Figure 4:
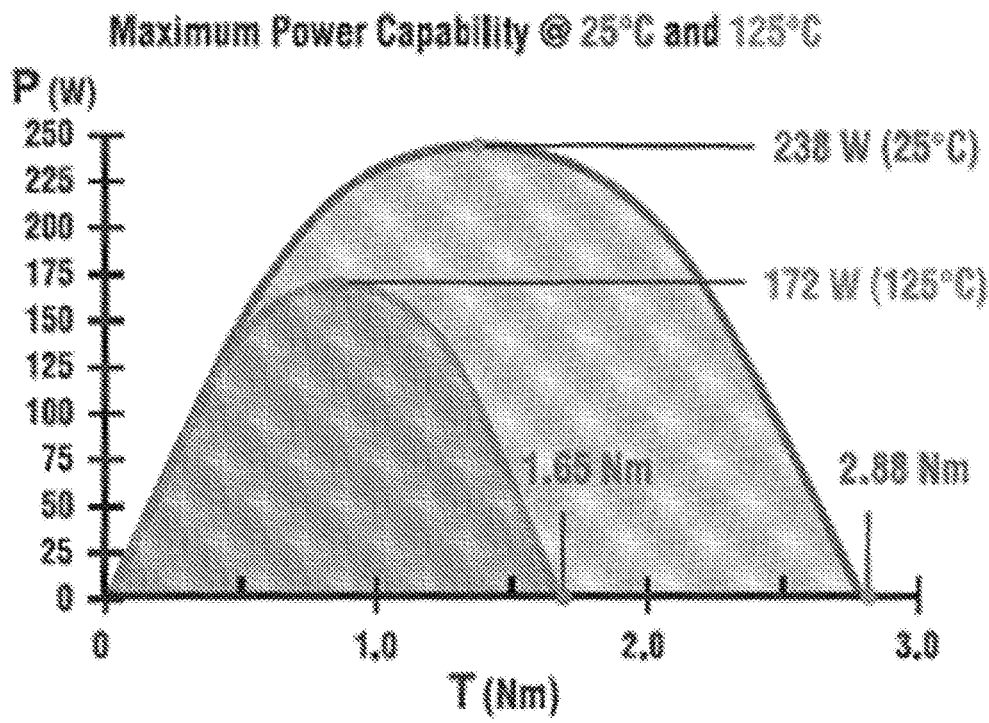
FIG. 4 is a plot and table showing the effect of temperature on the performance of a BLDC motor with Strontium-ferrite-magnet rotor and copper stator winding.

FIG. 2 shows, by changing the operating temperature of the same NdFeB magnet-based motor from 120° C. which could readily occur in a compressor with a discharge gas cooled motor to 20° C. which could occur in a compressor with a suction gas or liquid injection cooled motor, that the torque increases from 0.7 to 1.0 (non-dimensional numbers), a 43% increase for the same current. This simply means that to get the same torque generated at 120° C., the supply current can be reduced by 30% (=1/1.43) if the motor temperature can be lowered from 120° C. to 20° C. FIG. 3 shows the efficiency of the same NdFeB based motor increasing from 0.58 to 0.7, a 21% increase, by changing the motor operating temperature from 120° C. to 20° C. FIG. 4 shows the performance enhancement of a motor with Strontium Ferrite magnets as its operating temperature is lowered from 125° C. to 25° C. It shows the following percentage increases for various performance measures as the operating temperature of the Strontium ferrite based motor is lowered from 125° C. to 25° C.: maximum power by 38% (=238/172), locked rotor torque 74% (=2.88/1.65), torque per ampere by 25% (=0.071/0.057), no load speed by 26% (=3979/3160), etc. The Ferrites and NeFeB based permanent magnets are the most prevalently used magnets in BLDC motors. Ferrites are generally used for large but low cost, reciprocating, linear or rotary compressors, and NdFeB magnets for relatively compact, higher efficiency, higher cost BLDC compressors. As illustrated above, the potential benefits of operating these motors at low temperature on motor performance are significant enough to warrant investigation of practical and affordable changes that the roller-piston/vane rotary compressor configuration requires in order to provide the means of operating the motor at significantly lower temperature rather than the high discharge temperature as is done today. A successful transition to the new rotary compressor design will be quite a feat so long as it can be accomplished without causing unacceptable detrimental consequences such as significant increases in cost, compressor size, or unacceptable complexity in manufacturing.

C. Adverse Effects of Heating the Suction Gas and the Counter Measures:

The internal motors used inside rotary compressors have always less than 100% conversion efficiencies of electrical power to mechanical shaft power imparted by the shaft of the motor to the compressor pump assembly. The conversion efficiency could range from as low as 40% to mid 90%. The remainder of the power converts into heat. So, in a suction gas cooled state-of-the-art compressor, it would be even more advantageous to choose a motor with a high conversion efficiency such as a highly efficient permanent magnet based BLDC motor. One obvious concern, immediately raised by the designers of the compressors and those knowledgeable in Thermodynamics of gas compression and vapor compression cycle, is the potentially detrimental effect on the compressor performance caused by heating of the suction gas by the heat generated by the motor due to the above mentioned, less than 100% conversion efficiency of electrical input power into a mechanical shaft power.

The detrimental effects of heating of the suction gas include a lowered isentropic efficiency of compression in addition to a reduced "effective" volumetric efficiency due to lower density of heated suction gas compared to that without the suction gas heating by the motor. A relatively poor overall performance sometimes as low as 50%, compared to a conventional BLDC rotary compressor with high-side shell, of suction cooled reciprocating compressors that are widely used in low cost, low efficiency refrigerators with a medium efficiency BLDC motor is a case in point.

In order to ensure that the compressor suction temperature does not increase much or at all due to motor giving off heat, and also that the motor wiring temperature stays as close to the suction gas temperature as possible by utilizing evaporation, in VCS systems, one can introduce an additional measure in the new compressor configurations: a small portion of the liquid refrigerant from the condenser can be routed to the in-shell secondary heat exchanger to effectively cool the motor by evaporation to maintain a stator wire operating temperature as close to the evaporation temperature as possible. Diverting a portion of the liquid from the condenser to cool the motor by evaporation obviously will increase the motor efficiency significantly but would decrease the overall cooling capacity in a vapor compression cycle because the refrigerant flow to the evaporator is decreased by the same amount diverted to the motor cooling unless an appropriate counter measure is taken. The decrease in cooling capacity can be countered by increasing the operating speed of the compressor, oversizing the displacement of the compressor to compensate for the reduction in cooling capacity and provide the same cooling capacity so long as doing so makes the system COP high enough to warrant the effort both of which will have adverse impacts on cost and performance. One way to effectively increase the compressor displacement without increasing the operating speed or physical size of the compressor is to utilize supercharging injection of the exact amount of refrigerant flow diverted from the condenser into the compressor during compression process thereby increasing the effective pumping rate of the compressor, i.e., effective displacement of the compressor. This will in turn increase the refrigerant flow rate through the condenser by the same amount injected during supercharging. The method of supercharging injection has been extensively used in scroll compressor-based heat pumps in the form of vapor injection into the compression chamber to increase the effective pumping rate of the compressor and condenser and also the heat output from the condenser. This vapor injection is quite beneficial especially during cold weather conditions not only to increase the heat output but also to increase the refrigerant flow through the motor to better cool the motor and protect it from damages due to low refrigerant pressure, low density, and therefore low refrigerant flow which tends to occur in cold weather conditions. In the case of scroll compressor-based heat pumps, necessary amount of liquid refrigerant coming out of the condenser is vaporized in an external vaporizer and then the resulting vapor is injected into the compressor at an appropriate point in compression. The key difference in the proposed in-shell heat exchanger for the motor is that the supercharging fluid is the liquid taken from the condenser, expanded down to proper pressure and temperature, and then vaporized by taking away the heat generated by the motor and cool the motor. The supercharging process and its implementation will be presented in detail for roller piston/vane type compressor toward the end of the specification. The similar improvements would occur in other refrigeration compressors such as scroll, reciprocating, screw, turbine type, etc. even though details are not presented herein.

The combined benefits of operating the motor near suction temperature and cooling the internal parts of the compressor pump will manifest themselves in potentially significant increases in compressor efficiency and the system COP. Table 1 in FIG. 5 shows theoretical maximum increase in COP of a High-side/low-side shell roller-piston/vane rotary compressor over conventional high-side shell roller-piston/vane rotary compressor both equipped with the same NdFeB magnets, whose temperature dependence was described in FIGS. 1 to 3, if the new suction gas cooled motor configuration were used. A vapor compression refrigeration System based on a conventional high-side shell roller-piston/vane rotary compressor with −12.2° C. evaporator temperature and the motor operating temperature of 140° C. will have the BLDC motor operating at 58% efficiency. In contrast, for the new high performance compressors with sufficient liquid injection for evaporative cooling of the motor, the motor temperature will approach the evaporator temperature of −12.2° C. with much higher efficiency of 84%, a truly significant 45% increase. Ignoring relatively small, additional losses such as caused by various potential leakages, the COP will increase by 31% from 1.06 to 1.38 based on the 45% increase in motor efficiency while it will require either increasing the speed by 11.6%, increasing the displacement by 11.6%, or supercharging additional 11.6% of the refrigerant flow into the compression space to maintain the same level of cooling capacity while diverting the same amount of the liquid from the condenser to cool the motor. It is also shown that for certain applications with higher evaporator temperatures such as air conditioners, the increase in COP will be less than 31%. On the other hand, for applications with lower evaporator temperatures such as −40° C. to −20° C. routinely required for vast majority of refrigerators and freezers, the increase in COP will be much higher than 31%. Also, in applications with high discharge temperatures such as heat pumps, the increases in COP can be just as equally significant. The above level of motor temperature reduction would not be uncommon in refrigeration, HVAC, air conditioning and heat pump applications as well as gas compressors if the new compressor configurations are used. Another important benefit is the use of roller-piston/vane rotary compressors that are generally much more energy efficient than reciprocating compressors in applications that were not possible to date: high compression ratio applications, high discharge temperature applications, use of less expensive, lower temperature grade magnets, or reduction in the use of expensive rare earth magnets, etc. Since these new types of roller-piston/vane rotary compressors will be able to handle many of the applications in refrigeration, HVAC, air conditioning, heat pumps, and gas compressors today, when used worldwide in the ubiquitous refrigeration, HVAC and heat pump, as well as various gas compressor products, the global energy savings would be quite large and the reduction of the global warming gas CO2 would be significant.

According to some aspects of the present disclosure, lowering the operating temperature of the motor may provide numerous benefits. It is well known that most motors including BLDC motors, switching reluctance, inductance motors, etc. run more efficiently as the operating temperature is lowered. An extreme example is a superconducting motor with near zero losses at liquid helium temperature of −268.93° C. with the efficiency of the motor (defined as mechanical output power divided by electrical input power) close to 100%. The beneficial effect of low operating temperature on motor performance turns out to be significant even in more common ranges of low temperature. For example, the performance of a BLDC motor with copper stator winding and a common grade of permanent magnet rotor (NdFeB, Ferrite, etc.), will increase from ~44% at a motor operating temperature of 150° C. to ~70% at −12° C. A 150° C. motor operating temperature could readily occur as the temperature of the discharge gas that cools and takes away the heat generated by the inefficiencies of the motor, increases in low evaporator temperature applications such as a −40° C. chest freezer or refrigerator with freezer compartment operating in high ambient temperatures. In order to lessen the performance degradation of motors at such a relatively high discharge temperature and an even much higher motor operating temperature, one may be forced to use more expensive, higher-temperature grade permanent magnets and high temperature stator materials which would in turn limit the market size for the already higher priced roller-piston/vane rotary compressor relative to suction cooled reciprocating compressors. However, the higher price stemming from this stop-gap approach of using more expensive, higher grade rotor magnets and stator windings would be untenable for increasing the application areas of generally far more efficient rotary compressors including roller-piston/vane rotary compressors in wider areas that would lead to energy savings on a global scale.

As an example, the cooling medium for BLDC motors in a state-of-the-art hermetic and semi-hermetic roller piston/vane rotary compressor is the relatively high temperature discharge gas. In other words, the base temperature of the coolant to cool the motor is the discharge gas temperature. Adding to this already high base temperature of the coolant is the low heat transfer coefficient between the discharge gas and the motor rendering the motor operating temperature much higher than the already high discharge gas temperature. It therefore sets off a vicious cycle of higher motor operating temperature, lower motor efficiency, higher motor heat output, leading to even lower motor efficiency. This highly unfavorable mode of motor cooling prevalently used in the state-of-the art rotary compressor design has been adopted at the beginning of the rolling piston compressors for various practical considerations and been used for decades as a given.

At very low evaporator temperatures such as −40° C. to −20° C. required for refrigerators with freezer section or stand-alone freezers, the flow rate of the refrigerant for a given compressor displacement becomes extremely low, the heat transfer becomes even less effective, and the motor operating temperature will increase to much higher level than discharge gas temperature to take away the heat generated in the motor. This means that the motor winding, magnet and its core would be operating at much higher temperatures than the discharge gas temperatures due to very low refrigerant flow rate and low convection heat transfer coefficient between the discharge gas and the motor, in addition to the unavoidable conductive thermal resistance within the stator and the rotor. Therefore, the motor operating temperature (stator wire temperature and rotor magnet temperature in particular) could easily reach or surpass 150° C. with significant performance degradation if not permanent damages to the magnet. This is one of the main reasons why the state-of-the-art roller-piston/vane rotary compressors with internally disposed permanent magnet based BLDC motors, despite their potential advantages of highly desirable variable speed and exceptionally high efficiencies in other less demanding operating conditions, have not been used much in applications where the discharge temperature could become too high, or the evaporator temperature becomes very low such as refrigerators with freezer compartment, or free standing freezers where the evaporator temperature may have to be close to −40° C. or below.

Similar situations can be found in the so-called suction cooled reciprocating compressors that are prevalently used in refrigerators and freezers and scroll compressors that are becoming popular in high-end air conditioners and heat pumps. In these cases, the suction gas is used to cool the motor but it has the following problems: first, the suction gas gets heated by the inefficiencies of the motor and also by the compressor pump assembly which could severely reduce the volumetric and isentropic efficiencies of the compressor. Even though the base temperature of the coolant for the motor is the suction gas temperature, because of very low convection heat transfer coefficient between the suction gas and the motor, the motor operating temperature may be significantly higher than the suction gas temperature largely negating the effect of using the low temperature cooling medium for the motor. This sets off a "vicious cycle" of the motor releasing more heat into the suction gas which in turn increases the temperature of the suction gas before entering the compression chamber, and lowers the volumetric and isentropic efficiencies of the compressor and lowers the motor efficiency which requires more power and causes more heating of the suction gas. This vicious cycle will be exacerbated and unacceptable when the evaporator temperature is very low and the condenser temperature is relatively high such as in most refrigerators with freezer sections, free standing freezers, heat pumps and air conditioners with very low refrigerant flow rates, low heat transfer rates resulting in motor temperatures much higher than suction gas temperature despite the fact that the motor is cooled by the suction gas.

Departing from the conventional and long-accepted ways of designing these roller piston/vane compressors combined with due attention paid to practicality of manufacturing and commercial viability, the inventors arrived at a common primary feature that, by properly modifying the designs of a roller-piston/vane rotary compressor, scroll compressor and reciprocating compressor, the cooling for the motor is done by a much cooler working fluid with a temperature near the suction gas temperature instead of the discharge gas and, in vapor compression refrigeration systems, liquid can be added to cool the motor to take advantage of the evaporative cooling with far higher heat transfer coefficient than gas convection cooling, in both cases resulting in much lower motor operating temperature to start the "virtuous cycle" of higher motor efficiency, less heat to the suction gas, and higher isentropic compressor efficiency, less power to the motor, less heat generated by the motor, and higher system performance.

According to some aspects of the current disclosure, lowering the operating temperature of the compression chamber may provide one or more benefits additional to, or alternatively to the above described benefits. Above, the beneficial effects of cooling the motor were described if it can be achieved. Similar argument can be presented regarding the advantages of cooling of the pump body of the compressor to increase the isentropic efficiency of a compressor. It is well known among those knowledgeable in art that cooling the compression chamber enhances the compressor's isentropic efficiency and increases the effective volumetric efficiency by reducing the heating of incoming gas by the wall of the compression space during suction process, which means higher density and higher amount of refrigerant is introduced into the compression space during suction process. The higher the isentropic efficiency, the lower the mechanical power needed for compression per unit mass of refrigerant processed each stroke or revolution of the compressor. The combined effect of the increases in the isentropic efficiency and the volumetric efficiency by cooling the compression chamber leads to higher mass flow rate through the compressor and thus the evaporator which leads to higher cooling capacity and higher heating capacity. Cooling the compression chamber may be accomplished either by cooling the wall, the body of the pump, injecting small amounts of liquid refrigerant or fluid with much lower enthalpy than the enthalpy of the gas inside the compression chamber or a combination of the above.

According to some embodiments, a set of new configurations of compressors are provided that are applicable to hermetic or semi-hermetic roller-piston/vane rotary compressors in general. The disclosed configurations include a common primary feature that a lower temperature cooling fluid and higher heat transfer mechanisms are used to cool the motor, the pump body, or both while ensuring adequate lubrication of the moving parts of the compressor pump and also balancing the axial forces by the working fluid and the lubricant acting on the shaft. The new configurations are designed to increase the efficiency, reliability and longevity of the motor and/or the pump body and enable the new BLDC roller-piston/vane rotary compressor to be used even in high discharge temperature applications and/or low evaporator temperature applications not possible or tenable with the state-of-the-art roller-piston/vane rotary compressors. Similar configurations will bring advantages to other compressors used in vapor compression or CO2 based systems.

According to some aspects, supercharging may provide one or more benefits in a compressor. The presently disclosed arrangements include features that would significantly improve the performance of the refrigeration system, air conditioning system or heat pump system based on thermodynamic principles on how a supercharging of high-pressure refrigerant into a refrigeration compressor chamber during the compression process would complement and add to the advantages of the new compressors compared to state-of-the-art compressors in terms of enhanced COP, SEER and/or heating capacity of the vapor compression systems.

The new efficient, reliable and versatile roller-piston/vane rotary of compressors could be used in a wide range of applications including those that a state-of-the-art roller-piston/vane rotary compressor aren't generally used such as refrigerators, freezers and heat pumps for HVAC, electrical dryers, dishwashers, and industrial processing with significant global benefits in this era of global warming. Some of the configurations introduced herein for the roller-piston rotary compressors are also applicable to scroll compressors, screw, turbine, swash plate and reciprocating compressors with similar attendant benefits over the state-of-the-art compressor configurations with internally disposed motors resulting in lower motor operating temperatures and higher performance.

According to some aspects, a new general approach of cooling the internally disposed motor of a roller-piston/vane rotary compressor is introduced that provides effective and beneficial cooling of the internally disposed motor by liquid injection and evaporation at relatively low temperatures. As detailed below, there are several considerations that need to be taken into account to make this design transition possible, relatively risk free, and commercially successful.

Lubrication Considerations:

First, it is instructive to fully understand how the lubrication system in the state-of-the-art roller-piston/vane rotary compressor functions so that one can take advantage of the core of its lubrication system that has been field tested and proven by several decades of wide-spread use around the world. The state-of-the-art roller-piston/vane rotary compressors are high-side shell compressors, which means that the space inside the shell is at discharge pressure and therefore the lubricant in the lubricant sump that gathers at the lower side of the shell is already at the discharge pressure. Some of the lubrication oil coming out of the discharge port mixed with the compressed gas into the shell will first be separated during its flow within the shell and collected at the lubricant sump at the bottom of part the shell before the compressed gas flows out of the shell through a discharge tube. Below is a detailed description of lubrication mechanism common in most of the state-of-the-art rolling piston compressors.

Figure 6:
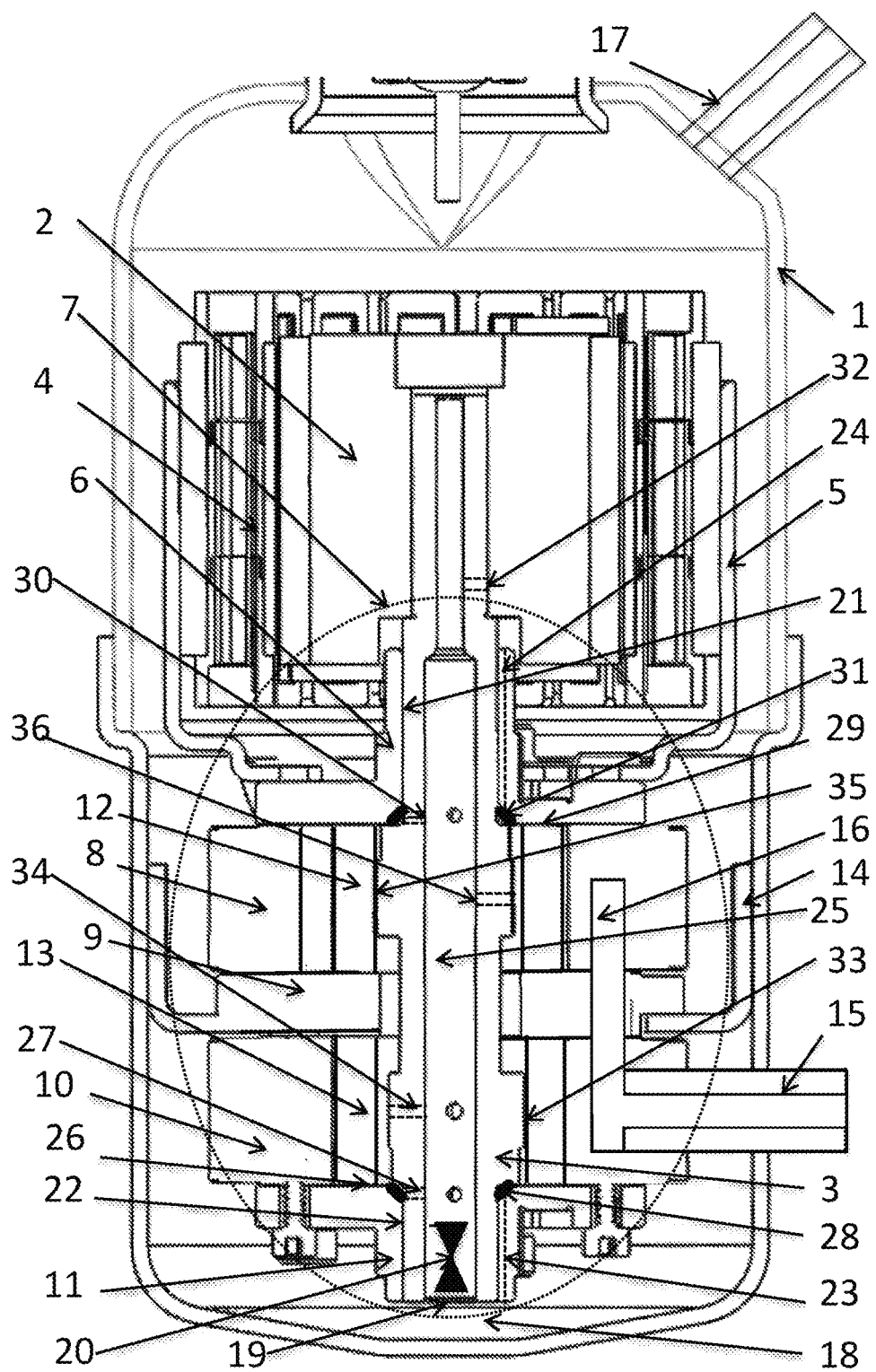
FIG. 6 is a schematic representation of one embodiment of a high-side shell, BLDC rolling piston compressor with the motor cooled by the discharge gas and with the compressor's pump assembly indirectly mounted to the shell via compressor pump assembly holder and the stator indirectly mounted via stator holder to the compressor pump assembly.

FIG. 6 shows the basic compressor design and its lubrication mechanism of an indirectly mounted, high-side shell, twin-cylinder rolling piston compressor whose single cylinder version was first disclosed in PCT/US2014/067933 by the current inventors and both the single and twin cylinder version of which are now in production+. Inside its shell 1, there is a BLDC motor consisting of the rotor 2 (containing the rotor core and permanent magnet) attached to the top portion of the eccentric shaft 3, the stator 4 supported by stator holder 5 which is fastened to the upper flange 6. The compressor pump assembly 7 indicated by the dotted ellipse, consisting of the eccentric shaft 3 below the rotor 2, upper flange 6, upper cylinder 8, mid plate 9, lower cylinder 10, lower flange 11, the upper roller 12, the lower roller 13, is supported by compressor pump assembly holder 14 which is in turn attached to the shell 1. The main suction tube 15 goes through the shell 1 and connects directly to the suction port of one of the cylinders, in this case the lower cylinder 10, and into the suction plenum 16 which feeds suction gas to both cylinders 8 and 10. The gas gets compressed and discharged by the pump assembly inside the shell 1 from both cylinders 8 and 10 and goes out of the shell through the discharge tube 17. Before going out of the shell, the discharge gas picks up the heat from the motor consisting of rotor 2 and the stator 4. The lubricant from the lubricant sump 18, gets pushed into the pump assembly through an lubricant intake port 19 at the bottom tip of the eccentric shaft 3, mostly by the pressure differential between the lubricant sump 18 at discharge pressure and the compression chamber with fluctuating pressure between the suction pressure and the discharge pressure and aided by a small in-line screw pump 20 that generates a small increase in pressure over the pressure of lubricant sump 18 to assist lubricating two flange bearings, i.e., the upper bearing 21 and the lower bearing 22. In order to assist lubrication of the lower bearing 22 further, there is a lower bearing lubricant supply groove 23 (customarily straight in axial direction) on the internal diameter surface of the lower bearing 22, and there is the upper flange lubricant groove 24 (customarily helical) on the internal diameter surface of the upper bearing 21. The lubricant is pushed through the intake port 19 into the in-shaft cavity lubricant reservoir 25 of the eccentric shaft 3. The in-shaft cavity, high-pressure, lubricant reservoir 25 is centrally located to act as the main hub for lubricating the entire pump assembly and constitute the core of the lubrication system for the roller-piston/vane rotary compressor as described in detail below: lubricates the lower bearing 22 and the lower roller/lower flange interface 26 through the lower bearing lubricant supply port(s) 27 and the lower flange lubricant manifold 28 with assist from the lower bearing lubricant supply groove 23; lubricates the upper bearing 21 and the upper roller/upper flange interface 29 through the upper bearing lubricant supply port(s) 30 and the upper bearing lubricant supply manifold 31 with assist from the upper bearing lubricant supply groove 24 with a vent hole 32 to prevent vapor lock within the in-shaft cavity, high-pressure, lubricant reservoir 25 on the eccentric shaft 3 above the top of the upper flange 6 to drive out any vapor or gas out of the center cavity and avoid vapor lock to ensure that only liquid lubricant is used to lubricate and seal the moving components of the roller-piston/vane rotary compressor; lubricates the lower roller/lower eccentric interface 33 through lower roller/lower eccentric lubricant supply ports 34, and the upper roller/upper eccentric interface 35 through upper roller/upper eccentric lubricant supply ports 36. The small helical screw type pump 20 installed at the bottom opening of the eccentric shaft 3 generates a small amount of pumping pressure to help push the lubricant through the 22 via the lower bearing manifold 28 and the upper bearing 21 via the upper bearing manifold 31. Without that small pressure increase generated by the helical screw pump 20, there would be little to no driving force to push the lubricant from the in-shaft cavity lubricant reservoir 25 to lubricate the upper and lower bearings 21 and 22.

In the conventional high-side shell rolling piston compressor, whatever amount of oil that is coming back from the vapor Compression Refrigeration System into the suction port goes into the compression chamber and gets out of the pump again. In these high-side shell roller-piston/vane rotary compressors, the lubricating/sealing lubricant from the in-shaft cavity, high-pressure, lubricant reservoir 25 is pumped into the internal part of the pump assembly due to the fact that the shell pressure, i.e., the oil sump pressure, and therefore the pressure of the lubricant reservoir 25 in the center cavity of the shaft are generally higher than the fluctuating pressure inside the compression chamber of the cylinder except during a very short period toward the end of compression process when the compression space pressure slightly exceed the shell pressure toward the end of the compression cycle and during the ensuing short discharge cycle. So, there is a net in-flow of lubricant from the In-shaft cavity, high-pressure lubricant reservoir 25 into the compressor pump assembly 7.

The above described lubrication method for the state-of-the-art (i.e., high-side shell) roller-piston/vane rotary compressors has been proven to be quite robust and reliable through decades of use of hundreds of of millions of rolling-piston rotary compressors around the world. The core of the robust and proven lubrication system in the state-of-the-art roller-piston/vane rotary compressor is the centrally and proximately located, In-shaft cavity, high-pressure lubricant reservoir 25 inside the in-shaft center cavity that efficiently supplies and lubricates all the moving parts of the compressor's pump assembly.

Any attempt to redesign a roller-piston/vane rotary compressor into an evaporatively cooled motor would benefit from keeping the functionality of this core of the lubrication system intact, similar or enhanced and replicating the core design and functionality of the proven lubrication mechanism of a state-of-the-art roller-piston/vane rotary compressor. In particular, it is quite important to keep the location and the functionality of the high-pressure lubricant reservoir 25 in the center cavity of the shaft. The various embodiments of suction cooled roller-piston/vane rotary compressors to be presented herein utilize, replicate, simulate, maintain or enhance the long-proven lubricant pumping mechanism by keeping the in-shaft cavity, high-pressure, lubricant reservoir at the center cavity of the shaft.

Considerations Related to Balancing of the Forces Acting on the Eccentric Shaft by Gas and the Lubricant:

Another important requirement in designing high performance roller-piston/vane rotary compressors with the low temperature fluid cooled motor is the balancing of forces, both in axial and radial directions, acting on the eccentric shaft by lubricants and the working gas of the compressor. In all high-side shell compressor shown in FIG. 6 as an example, the two ends of the shaft are exposed to the same discharge pressure and therefore the pressure forces acting on the shaft in the axial direction is automatically balanced. Also, the supply ports and manifolds from the lubricant reservoir 25 are all preferably, circumferentially symmetric even though FIG. 6 does not explicitly shows that fact. The shaft pressure balancing is preferably recommended in all new configurations of roller-piston/vane rotary compressors, high-side shell, low-side shell and High-side/low-side shell, in order to prevent excessive friction and premature wear of interfaces between flanges and thrust faces of the shaft if there were a bias force in axial or radial direction due to gas pressure imbalance or lubricant pressure imbalance. In the state-of-the-art high-side shell rolling piston rotary compressors, the shaft balancing is inherently or more easily achieved because the pressure inside the shell is uniform at discharge pressure. In the low-side shell models, the pressures are also balanced at low suction pressure at both ends of the shaft. Achieving the shaft axial force balancing in the High-side/low-side shell roller-piston/vane rotary compressors is more complicated. The imbalance could be countered by a thrust bearing as a brute force approach, but it would cause added cost, complexity, frictional losses, lower reliability, higher starting torque, and shorter compressor life. An example given below clarifies the importance of axially balancing the gas pressure for the shaft: For a small 1.9 cc roller-piston/vane rotary compressor in a High-side/low-side shell configuration, the cross-sectional area of the shaft at both ends are close to 0.1 sq.in. If the pressure difference is assumed to be 300 psi, the upward bias force exerted by the gas pressure on the crankshaft will be 30 lbs which will be just too high to accommodate in any practical compressor of this size. First of all, it will be very difficult to start the compressor due to high friction and high starting torque. Therefore, it is highly desirable to have the pressures acting on both ends of the shaft be balanced axially to avoid having to handle axial thrust force of 30 lbs exerted on the shaft. In other words, both ends of the shaft should preferably be exposed to the same or similar pressure. Use of a thrust bearing in this situation is possible but not desirable for reasons mentioned above. So, it is better to remove the net axial forces by equalizing the pressures acting on both sides of the shaft.

In the state-of-the-art rolling piston rotary compressors (High-side rolling piston rotary compressors), this is automatically done because the entire shell is at discharge pressure and also note that the lubricant sump is at discharge pressure. In fact, one can understand the reasons why the original inventor of the state-of-the-art rolling piston rotary compressor adopted the high side configuration: pressure balancing of the shaft in the axial direction is automatic, the lubricant sump is at discharge pressure and therefore there is no need for a booster pump, and simplicity of producing a single pressure shell. However, there is one significant disadvantage: a relatively lower motor efficiency because cooling of the motor is done by relatively high temperature discharge gas. Overall, it was a good engineering compromise when the rolling piston rotary compressor was first introduced decades ago, especially compared to the performance levels of common reciprocating compressors. However, now that the high energy-efficiency of compressor is of increasing importance worldwide, a fresh look at the fundamental design of roller-piston/vane rotary compressor became warranted especially if there is a high potential for improvement of compressor efficiency up to 10~30% depending on the applications if the motor can be cooled by suction gas! If only a portion of the full potential of the above-mentioned efficiency improvement with minimal cost increase for the suction cooled motor concept can be achieved, this new invention would drastically decrease the worldwide energy consumption for air conditioners, refrigerators, chillers, freezers, heat pumps, etc.

Exemplary Design Guidelines for an S-Series Roller-Piston/Vane Compressor:

The following design guidelines were used to design a roller-piston/vane rotary compressor driven by low temperature fluid cooled motor leading to supercharging: (1) use the same, similar or enhanced compressor pump mechanisms proven in a standard the state-of-the-art rolling piston compressor; (2) maintain the same, similar or enhanced oil lubrication system of the state-of-the-art roller-piston/vane rotary compressor proven through decades of use, especially the core of the system represented by the in-shaft high-pressure lubricant reservoir 25 shown in FIG. 6; (3) preserve balancing of axial and radial forces acting on the eccentric shaft by the gas and the lubricant, respectively; (4) reroute suction and discharge flow paths so that the BLDC motor gets exposed to and cooled by the low pressure and low temperature fluid stream preferably with higher heat transfer characteristics than discharge gas or suction gas; (5) reduce as much as possible the migration of heat from the high temperature discharge side to the low temperature suction gas; and (6) make all these changes without requiring significant changes in the external size of the BLDC roller-piston/vane rotary compressor and without materially increasing the cost of the compressor.

The design guidelines 1 and 2 described above largely obviate the need for a long-term reliability testing of the new compressor design to prove the viability of the pump mechanism and effectiveness of the lubrication system in the new compressor design. It is because the pump assembly components and lubrication mechanisms will have been largely unchanged from the long-used and proven mechanisms while the BLDC motor is operating in a low temperature environment of the suction gas stream. This would significantly increase the efficiency, torque and reliability of the motor and therefore compressor. The design guideline 3 is necessary to prevent large frictional losses and premature wear of parts due to axial or radial force imbalance to retain the potentially much higher efficiency of the new compressors and high reliability. The design guidelines 4 and 5 are crucial to make the new compressors affordable and attractive to be used in many applications and realize the many benefits of roller-piston/vane rotary compressor driven by suction gas/low temperature fluid cooled motor.

Two General Configurations of S-Series Roller-Piston/Vane Rotary Compressors with Evaporatively Cooled Motors:

There are two general configurations of roller-piston/vane rotary compressors that will be conducive to cooling the motor and pump body by evaporation and supercharging into the compression chamber: (a) high-side/low-side shell roller-piston/vane rotary compressor, and (b) low-side shell roller-piston/vane rotary compressor. These configurations are described in more detail below.

A high-side/low-side shell roller-piston/vane rotary compressor uses the two-side approach called High-side/low-side shell roller-piston/vane rotary compressor wherein the space inside the shell is divided into two sections by a separating member called Separator, wherein the motor in the low side is exposed to the liquid refrigerant at an appropriate pressure above suction pressure and the lubricant sump and the pump assembly in the high side are exposed to the discharge gas, wherein the pumping of oil is conveniently done by the sump at discharge pressure as was the case in the conventional High-side shell rolling piston compressors.

The Low-side shell roller-piston/vane rotary compressor has the space inside the compressor shell exposed to pressure slightly above the suction gas to accommodate the supercharging, and therefore the motor, pump assembly and the lubricant reservoir are slightly above the suction gas pressure and temperature. This is the opposite of the state-of-the-art roller-piston/vane rotary compressor that is a high-side shell compressors wherein the space inside the compressor shell is exposed to the discharge gas and therefore the motor, pump assembly and the lubricant reservoir are all at or near the discharge gas pressure and temperature. One can fully understand why the original inventor of the rolling-piston rotary compressor opted for the high-side shell configuration: the ease of providing lubrication and sealing within the pump assembly from the high pressure lubricant reservoir whose pressure is greater than or equal to the internal pressure of the pump assembly for most of the cycle. In contrast, the Low-side shell roller-piston/vane rotary compressor would require an active pumping mechanism to pump the low-pressure lubricant from the sump to a higher pressure in order to lubricate and seal components of the pump assembly whose internal pressure fluctuates between the suction pressure and discharge pressure. This pump can be an external pump or an internal pump. In order to be practical: the pump has to be of low-cost design and low energy consuming and has to provide just the right amount of lubricant to the compressor pump assembly as needed. A relatively simple and low-cost solution is introduced herein to make the low-side roller piston/vane compressor viable.

The first type of configuration, i.e., High-side/low-side shell roller-piston/vane rotary compressor will be described below followed by the second type, Low side roller-piston/vane rotary compressors.

High-Side/Low-Side Shell Roller-Piston/Vane Rotary Compressor:

According to some aspects, there may be as many as 24 configurations of High-side/low-side shell design roller-piston/vane compressors with inner rotor motors. The low-side pressure shall be set above the suction pressure as described by appropriate amount to enable supercharging and the pressure can also be set at any pressure between the above minimum pressure and the discharge pressure for vapor compression compressors in order to optimize the performance of the compressor balancing the motor performance against the loss of performance due to increasing leakage of lubricant/working gas past the upper bearing into the low-side shell and the heat leak between the low-side and the high side among other factors.

The shaft-balancing feature to make practical the highly desirable High-side/low-side shell roller-piston/vane rotary compressor with evaporatively cooled motor and expands the same shaft-balancing feature into all potential configurations of High-side/low (or adjustable low)-side configurations of roller piston type roller-piston/vane rotary compressors and scroll compressor.

Figure 7:
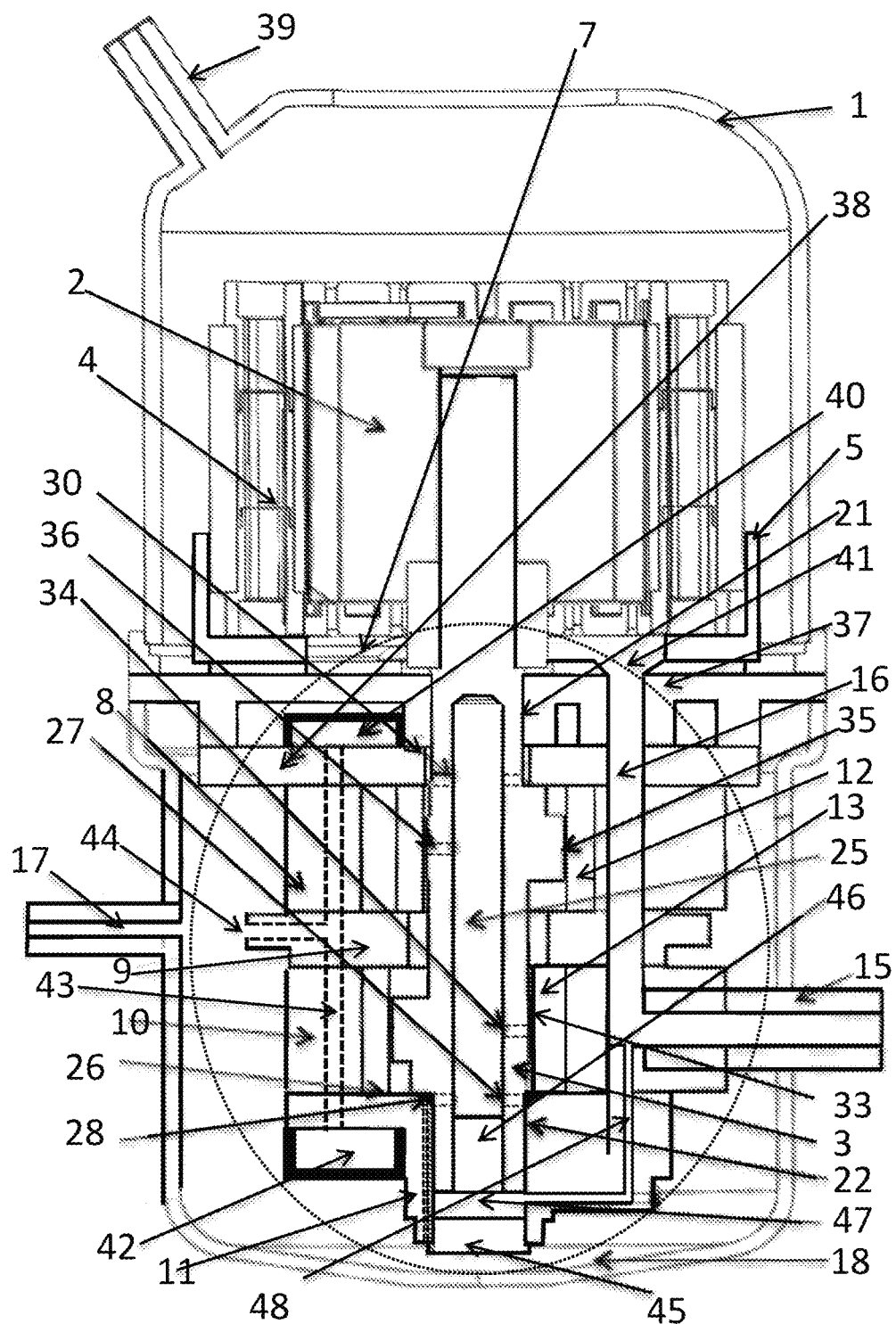
FIG. 7 is a schematic representation of one embodiment of a High-side/low-side shell, BLDC rolling piston compressor with a separator providing separation for the two spaces and also the upper bearing bore, an upper plate incorporating a discharge valve and the muffler and providing ceiling for the roller and the cylinder to form the compression space, and the BLDC motor cooled by near suction-temperature fluid.

FIG. 7 shows an embodiment of a High-side/low-side roller piston/vane compressor following the above-mentioned design guidelines and features without showing the supercharging features that will be described in detail in later sections. Most of the features of the high-side rolling piston compressor shown in FIG. 6 are kept intact: the compressor pump assembly 7 is practically identical except for a few modifications, and the in-shaft cavity, high-pressure lubricant reservoir 25 is present with necessary minor modifications. It has two pressure chambers within the compressor shell: one section maintained at a relatively low pressure between suction pressure and discharge pressure (for the sake of simplicity, we will assume the low-side shell pressure is suction pressure in the ensuing description of FIG. 7) and housing the BLDC motor and into which the suction gas enters and the other section maintained at or near discharge pressure and housing the compressor pump mechanism and lubricant sump at the bottom with its oil lubricating mechanisms similar to the mechanisms of discharge-pressure assisted, oil supply and return system of the state-of-the-art roller-piston/vane rotary compressor.

The separator 37 can be a distinct component attached to the upper part of the compressor pump assembly such as the upper flange or the upper part of the cylinder. Or, the separator can be an extension of the upper flange or the cylinder. Alternatively, the separator can take on some functionalities of a component of the compressor pump assembly such as upper flange.

The upper flange in most roller-piston/vane compressor provides and accommodates an upper bearing bore, discharge valve and its port, muffler and the flat sealing surface for the cylinder and the roller to form a compression space.

In the embodiment of the High-side/low-side shell roller-piston/vane compressor shown in FIG. 7, the functions normally performed by the upper flange are performed by the separator 37 and a new component called the upper plate 38. The Separator is equipped with the upper bearing bore, and the upper plate is equipped with a discharge valve, its valve port, optional upper plate bearing bore, and a provision to accept an optional upper muffler and perform the functions of forming an enclosed space interfacing with the upper cylinder and the roller. One section, called low-side section (denoting low pressure, low temperature space) shown above the Separator 37, containing the motor (rotor 2 and stator 4), is exposed to minimum low-side pressure necessary for supercharging above suction pressure as the metered flow of liquid from the condenser is introduced through liquid injection tube 39 expanded to close to the minimum low-side pressure to provide evaporative cooling to the motor, while the other section, called high-side section (high pressure and high temperature section), containing the compressor pump assembly 7 (separator/upper bearing bore 37, upper plate 38 containing the discharge valve and the upper muffler 40, upper cylinder 8, mid plate 9, Lower cylinder 10, lower flange 11, upper roller 12, lower roller 13, the most of the eccentric shaft 3) and the lubricant sump 18 at the lower part of the shell 1, is exposed to discharge gas, as noted by the location of the discharge tube 17. The main suction tube 15 goes through the high-side shell and goes directly into the suction port of one of the cylinders (as shown, it is the lower cylinder 10) then connected to the suction plenum 16. The vapor from the liquid injected through the liquid injection tube 39 is to be injected back into the compression chamber which is not shown in FIG. 7 but will be described later in detail. In the embodiment of the High-side/low-side shell roller-piston/vane rotary compressor shown in FIG. 7, the four functions of the upper flange, i.e., providing the ceiling and the sealing interfaces for the upper roller 12 and the upper cylinder 8, housing the discharge valve, accommodating an optional upper muffler 40 and providing the bore for the upper bearing 21 for the eccentric shaft 3 are taken up by two new components, the separator 37 and the upper plate 38: the separator 37 doubles as both being the pressure separating member and providing the bore for the upper bearing 21. The upper plate 38 provides the ceiling and sealing interfaces for the upper roller 12 and the upper cylinder 8, houses the discharge valve (not shown), and accommodates the upper muffler 40.

Discharge gas can be released into the high-side shell from the upper cylinder 8 or its muffler 40, the lower cylinder 10 or its muffler 42, and through the mid plate 9. As shown in FIG. 7, a lower muffler 42 and an upper muffler 40 do not release discharge gas into the high-side shell even though either one can be used for the purpose. Instead, in this embodiment, the discharge gas from both upper cylinder 8 and lower cylinder 10 are diverted to the mid plate 9 through the discharge gas flow diverting channel 43 to be released into the high-side shell through the internal discharge port 44 in the mid plate 9, and finally led out of the shell 1 through the discharge tube 17 after ideally separating and depositing most of the entrained lubricant into the lubricant sump 18 below. Note that there is a suction plenum 16 that takes in both the suction gas coming through the suction tube 15 or vaporized liquid (in a vapor compression system) injected through the injection tube 39 from the low-side shell. Note that most of other major components are similar or identical to those found in the high-side shell rolling piston rotary compressor shown in FIG. 6: The motor (rotor 2 and the stator 4) and the rotating parts of pump assembly are either identical or similar. The motor is attached to the separator 37 using the stator holder 5 as shown, and the compressor pump assembly 7 can be attached to the separator 37 directly or indirectly using a compressor pump assembly holder 14.

Figure 8:
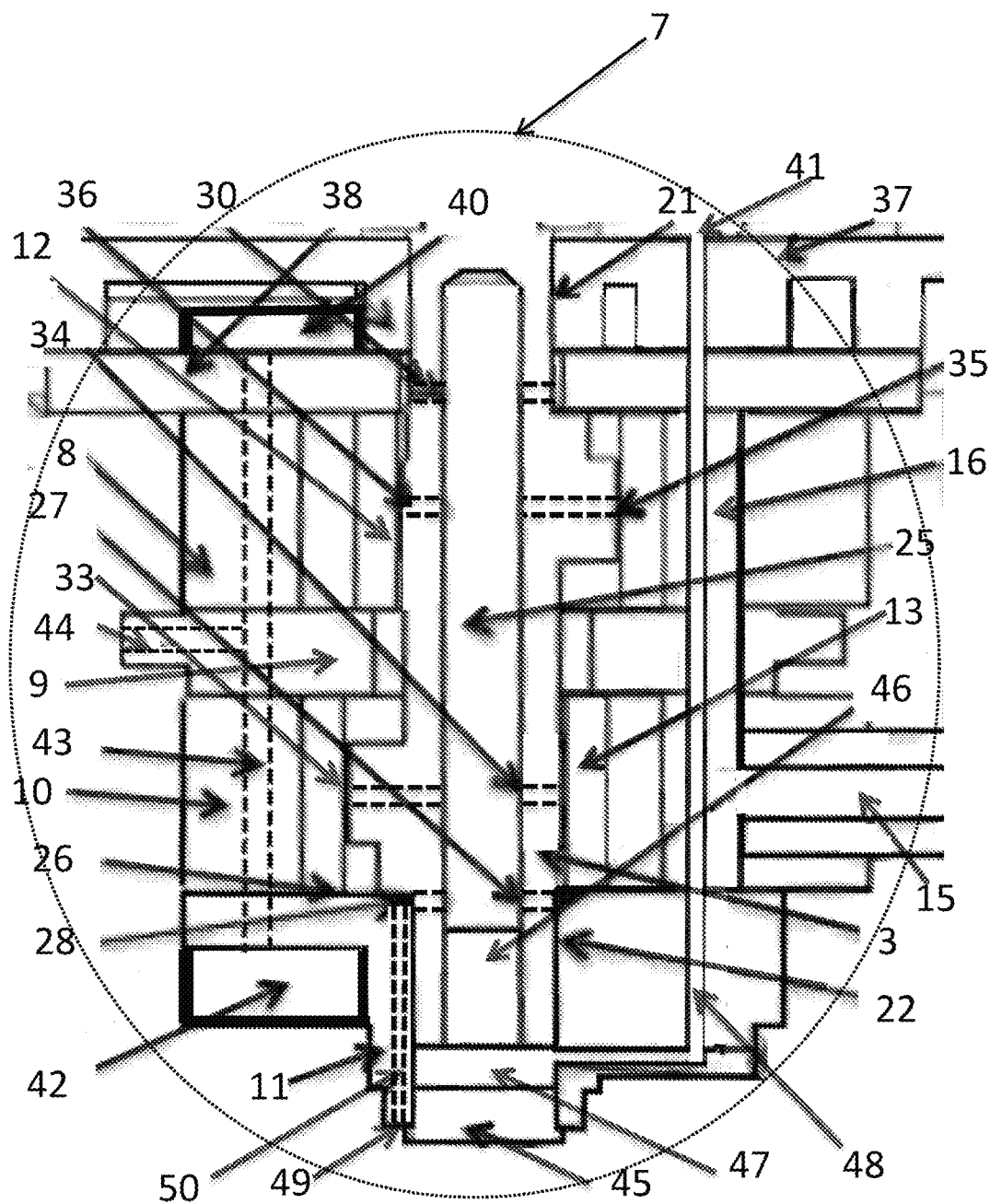
FIG. 8 is a detailed view of the lubrication systems for the High-side/low-side rolling piston compressor shown in FIG. 7.

FIG. 8 shows the details of the lubrication system and the shaft pressure balancing system for the High-side/low-side shell twin cylinder rolling piston compressor shown in FIG. 7. Note the changes from the design shown in FIG. 6 to the new design shown in FIGS. 7 and 8: the bottom of the lower flange is capped by lower flange nose plug 45 and the bottom end of the Eccentric Shaft 3 is also capped off by the eccentric shaft compressor-pump-assembly-side end plug 46. The top portion of the in-shaft cavity, high-pressure lubricant reservoir 25 is closed off without a vent hole. There is a Shaft-balancing, low-pressure gas cavity 47 below the eccentric shaft compressor-pump-assembly-side end plug 46 and above the lower flange nose plug 45. The Shaft-balancing, low-pressure gas cavity 47 is connected to the low-side through the pressure equalizing connector 48 so that the Shaft-balancing, low-pressure gas cavity 47 is at low-side pressure. The tube 39 is used only for injecting small amount of liquid refrigerant drawn from the condenser, isenthalpically (maintaining constant specific enthalpy) expanded to no lower than the minimum supercharging pressure and the resulting liquid will remove heat from the motor mostly by evaporation. In other words, we are essentially creating an additional evaporator/within the low-side shell to keep the motor temperature close to the saturation temperature corresponding to the low-side pressure appropriately chosen for supercharging if supercharging is used. By the same token, one can also inject additional diverted flow from the condenser into the walls of the pump body or to the surface of the pump body to cool the compression chamber to further improve performance. This second diverted flow is to be preferably injected into the compression chamber during supercharging process, as described in more detail below.

The high-pressure lubricant enters into the lubricant intake ports 49 (only one is shown in FIGS. 7 and 8 but preferably a multiple ports should be symmetrically placed on the lower bearing wall) provided at the bottom of the nose of the lower bearing 22, travels through the lubricant path 50 (ideally more than one but only one is shown in FIG. 8) in the bearing wall of the lower flange 11, fills the lower bearing lubricant supply manifold 28 and finally enters the in-shaft cavity lubricant reservoir 25 through the lower bearing lubricant supply ports 27 (preferably placed circumferentially symmetric, only one of them is shown in FIG. 8) provided on the eccentric shaft 3 near the interface of the lower flange 11 and the lower cylinder 10.

The rest of the lubrication supply mechanism is almost identical to that of the state of the art high-side shell roller-piston/vane rotary compressor shown in FIG. 6 with the following differences or modifications: (1) the bottom of the eccentric shaft is closed off by the eccentric shaft compressor-pump-assembly-side end plug 46 and the top of the in-shaft cavity is closed off to form an enclosed in-shaft cavity, high-pressure lubricant reservoir 25, and The vapor/gas vent hole 32 on the eccentric shaft 3 is no longer present; (2) the bottom of the lower flange nose is closed off by the lower flange nose plug 45 and the lubricant intake ports 49 are located at the bottom of the lower flange nose; (3) there is a Shaft-balancing, gas cavity 47 kept at low-side pressure below the bottom end of the shaft to match the pressure acting on the top of the shaft in the low-side shell; (4) the lubricant flows into the pump assembly without any boost by the helical pump because the lubricant from the lubricant sump 18 will be pushed from the sump to the In-shaft high-pressure lubricant sump 18 and to the lower bearing 21 by the almost constant pressure differential between the lubricant sump 18 at discharge pressure and the low-side pressure inside the shaft-balancing gas cavity 47 to lubricate the lower bearing 22, and by the same pressure differential between the high-pressure lubricant sump 18 and the low-side shell pressure to lubricate the upper bearing 21; (5) there is no axial lubricant supply groove 23 in the lower flange bore; and (6) there is no helical lubricant supply groove 24 in the upper flange bore in order to limit the leakage flow rate of the lubricant from the high-side section into the low-side section through the upper bearing 21 and minimize the power loss due to excessive lubricant leakage.

Therefore, the overall lubricant pumping force for the two bearings in the new design shown in FIGS. 7 and 8 is much more powerful and robust than the cyclically varying pressure differential for the state-of-the-art high-side shell roller-piston/vane rotary compressors, one of which was illustrated in FIG. 6.

The supply mechanism of lubricating oil to the rotating parts inside the pump assembly of the High-side/low-side shell roller-piston/vane rotary compressor as described above remains identical functionally to that of the state-of-the-art roller-piston/vane rotary compressor and, overall, it is much more effective owing to more steady lubricant pumping pressure. In short, the new design satisfies all the design guidelines described previously while achieving much cooler operating temperature for the motor, balancing the shaft axially and radially, and without materially affecting the cost of manufacturing for the new compressor close to the conventional rotary compressors.

Low-Side Shell Roller-Piston/Vane Rotary Compressor:

In this new type of configuration of a roller-piston/vane rotary compressor with its motor and the pump body both cooled by evaporation of relatively lower temperature liquid at appropriate pressure, the space inside the shell is exposed to mixture of liquid and gas at the relatively low temperature at the selected shell pressure. In such a configuration, the pump body may be cooled by the same mechanism that cools the motor. Cooling of the pump body from the surface or through the cooling channels within its wall can significantly increase the isentropic efficiency of the compression process thereby reducing the compression work to be supplied by the motor. The low-side shell configuration in general has not been used in roller-piston/vane rotary compressors probably because of the extra requirement for an external or internal oil separation mechanism on the discharge line and oil injection path that feeds the separated oil back to the in-shaft oil reservoir. Another requirement is that the oil has to be separated from the discharge side either within the compressor (as part of the muffler) or by an external oil separator and both cases the separated oil has to be fed back into an oil reservoir and in-shaft oil reservoir. These are a very difficult set of requirements to be satisfied by ordinary oil pumps even if one had a separate pump outside the compressor with sophisticated controls to modulate the flow in accordance with the needs by the compressor pump assembly let alone inside a very confined space of a rotary compressor, all without significant adverse impacts on complexity, cost and size of the compressor. There are other important provisions in a low-side roller-piston/vane compressor: the vane slot as designed becomes an additional source of leaks for both the gas and the refrigerant oil in a VCS compressor because the vane back side will be at low suction pressure. In addition, the vane spring needs to be much stronger to overcome the force exerted on the vane face by the pressure inside the compression space and still maintain constant contact with the roller at all times. These difficulties and complications (internal oil separation on the discharge line, the unavoidable and potentially large leakage through the vane slot out of the compression space throughout the entire compressor cycle, vane back pressure problem, and vane spring issue, etc.) explain the absence of low-side shell, roller-piston/vane rotary compressor over the past several decades since the introduction of the conventional roller-piston/vane compressor. However, if a suitable solution to the lubricant pump mechanism can be found, and if the other shortcomings can be mitigated or avoided by a clever, affordable features, the relatively low-pressure shell roller-piston/vane rotary compressor has advantages over the state-of-the art, high-side shell roller-piston/vane rotary compressors such as: significantly higher motor efficiency due to lower operating temperature of the motor, better separation of lubricant from the suction gas because the entire compressor shell can be utilized to separate the oil from the suction gas into the lubricant sump before entering the compression chamber, ease of injecting liquid refrigerant at suction pressure essentially creating an internal secondary evaporator for much more efficient evaporative cooling of the motor, and much lower shell operating temperature among others. A large portion of returning oil entrained in the suction gas would be separated and collected in the lubricant sump below and the relative oil circulation rate (OCR) would be lower and the heat exchanger effectiveness will be higher than those of the state-of-the art, high-side shell roller-piston/vane rotary compressors.

Figure 9:
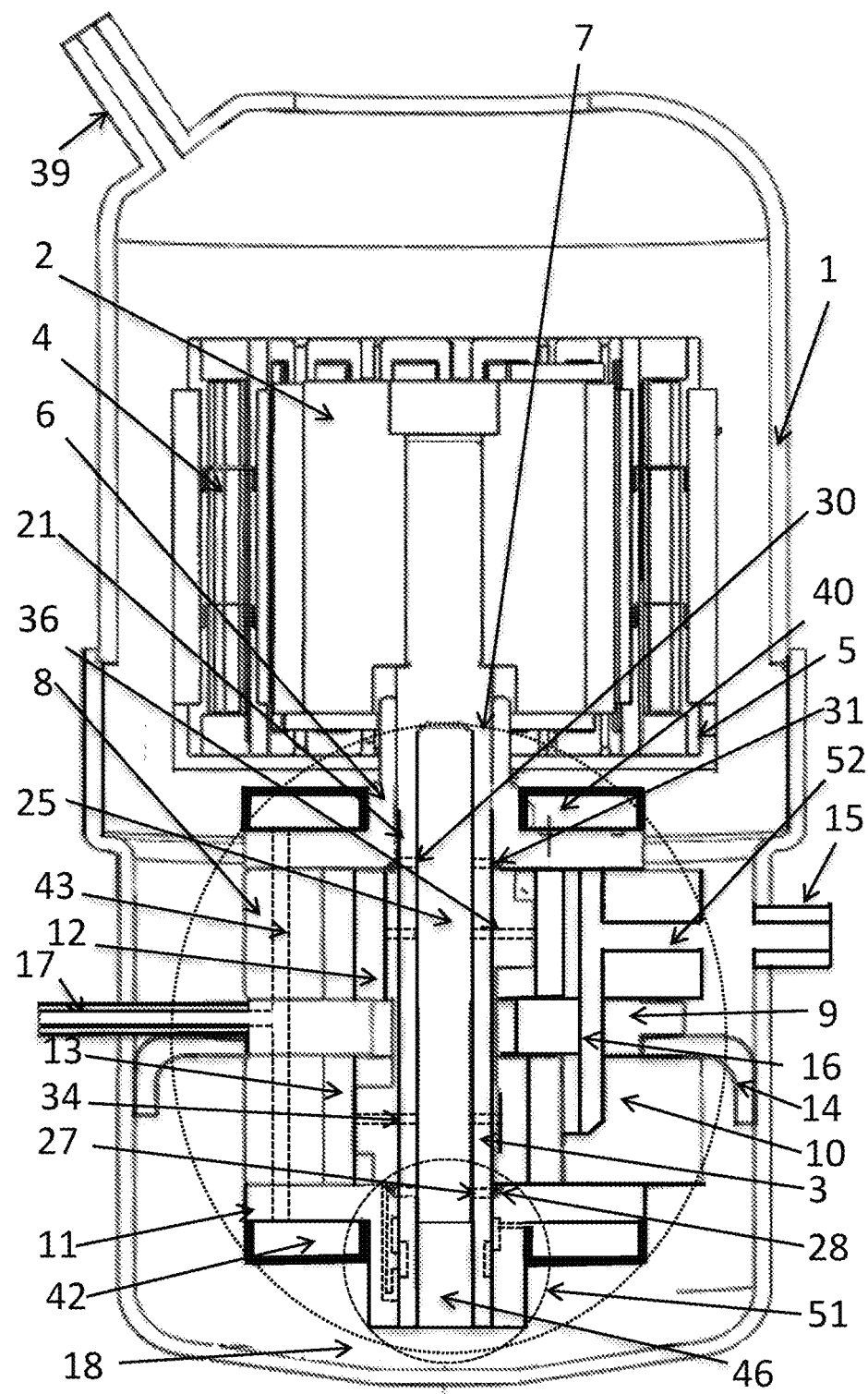
FIG. 9 is a schematic representation of one embodiment of a low-side shell, rolling piston compressor with a motor cooled by suction-temperature fluid and a discharge gas assisted lubricant pump imbedded in the lower flange and the bottom of the shaft.
Figure 10:
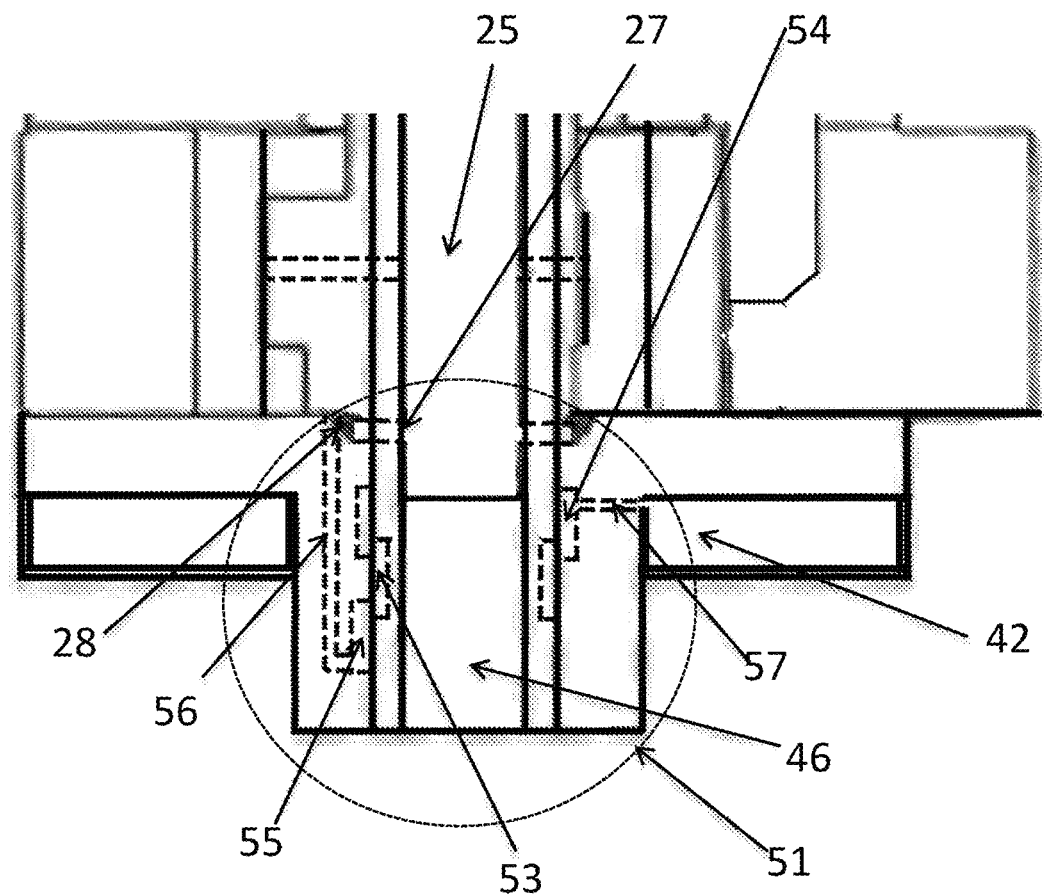
FIG. 10 is a detailed view of a discharge gas assisted lubricant pump embedded in the pump assembly of the compressor shown in FIG. 9.

FIG. 9 shows one of embodiment of a low-side shell rolling piston compressors. with the suction cooled motor on account of the fact that the space inside the shell 1 is exposed to suction gas. Many components of the compressor are similar to those of the conventional rolling piston compressors shown in FIG. 6 and also the High-side/low-side roller-piston/vane rotary compressors shown in FIGS. 7 and 8. The motor (consisting of the rotor 2 and the stator 4), the compressor pump assembly 7 (consisting of the eccentric shaft 3, upper flange 6, upper cylinder 8 with the vane mechanism, mid plate 9, lower cylinder with the vane mechanism 10, lower flange 11, the upper roller 12, and the lower roller 13), and the core of the lubrication system (in-shaft cavity lubricant reservoir 25 along with lubricant supply ports 27, 30, 34, and 36, flange bearing lubricant manifolds 28 and 31, etc.) are identical to those of the conventional rolling piston compressor as was shown in FIG. 6 and also with the High-side/low-side roller-piston/vane rotary compressor shown in FIGS. 7 and 8 with only slight modifications which would maintain or enhance the functionalities of the original system. There is a lubricant separator 51 in the discharge line capable of removing bulk of the oil from the discharge gas and passages for supplying the thus separated oil to the in-shaft oil reservoir and delivering the amount of lubricant only to the extent needed by the moving parts of the pump assembly. One can have two liquid injection tubes, liquid injection tube 39a that supplies the liquid to the motor section and the other liquid injection tube, 39b that supplies the liquid to the pump section either to the outside surface of the pump body or into the coolant paths within the walls of the pump body to maximum intercooling effect. The embodiment shown in FIG. 9 has discharge gas from both cylinders diverted, through the discharge-gas-flow diverting channel 43, to the mid plate 9 before going out of the shell 1 through the discharge tube 17. This discharge configuration has the advantages of simplifying the tightly sealing muffler design for both cylinders and inserting the internal oil separator within each muffler and making it easier to directly connect the discharge tube 17 to the compressor pump assembly 7 through the mid plate 9. FIG. 10 shows a detailed schematic of the special discharge-gas assisted lubricant pump 51 specifically suited for the low-side shell roller-piston/vane compressor. The components of the lubricant pump 51 are incorporated into the lower flange 11 and the eccentric shaft 3 in a simple way from the manufacturing point of view and as a consequence it minimizes the cost impact and any need for increasing the compressor size or weight. They consist of the following components: (a) lubricant scooping pockets 53 symmetrically placed around the shaft outer diameter to be properly shaped in order to efficiently scoop the lubricant and retain during the scooping process; (b) high pressure gas plenums 54 on the flange bore; (c) high pressure lubricant plenums 55 on the flange bore; (d) internal flow passages 56 for high-pressure lubricant connecting the high pressure lubricant plenums 55 to the lower bearing lubricant supply manifold 28, the lower bearing lubricant supply ports 27, and the in-shaft cavity high-pressure lubricant reservoir 25; and (e) connecting passage between the lower muffler 42 and high-pressure gas plenums 54.

Figure 11:
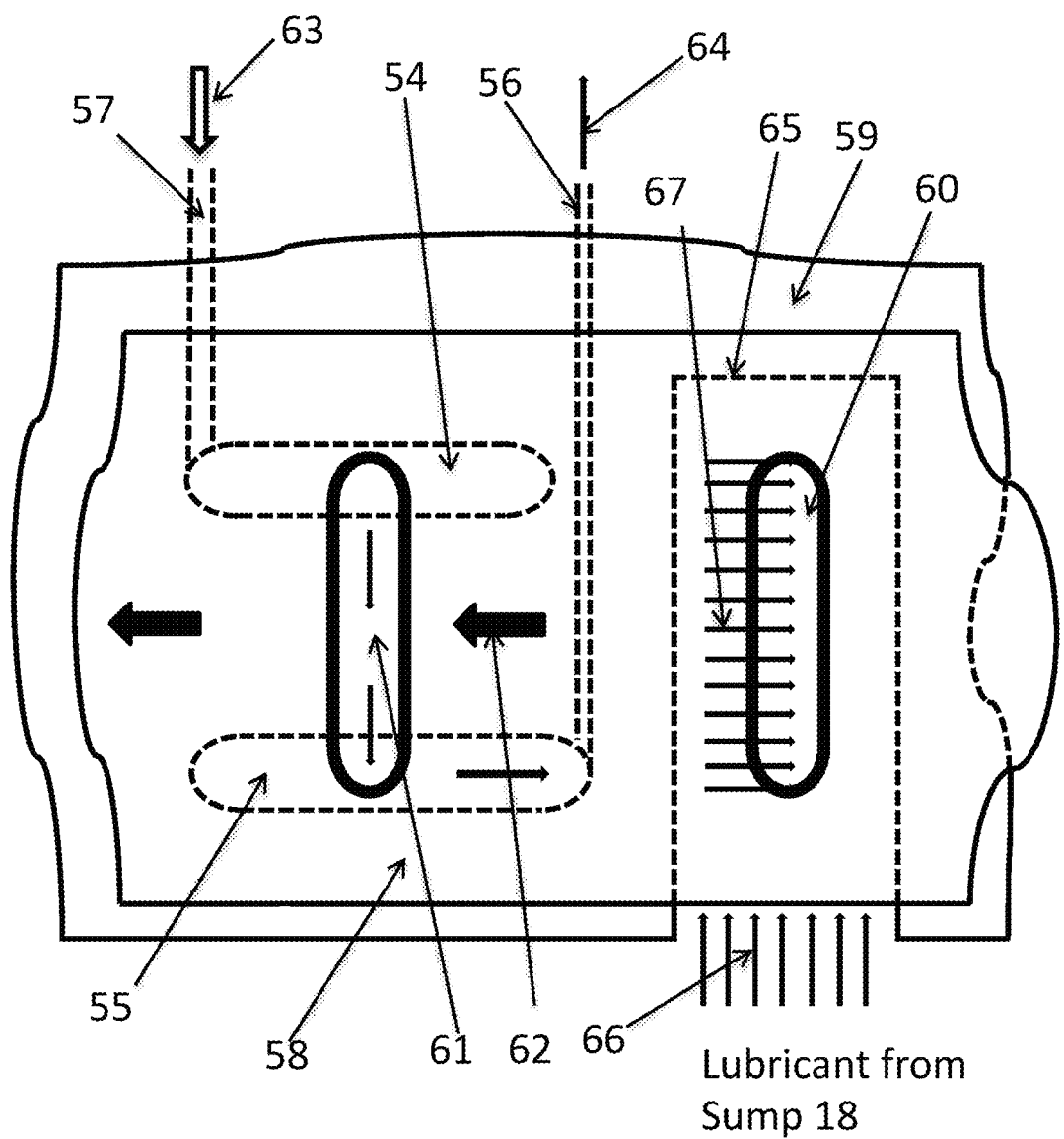
FIG. 11 is a two-dimensional representation of the pumping mechanism for the embedded lubricant pump used in the low-side shell, rolling piston compressor shown in FIGS. 9 and 10.

FIG. 11 is a 2-dimensional representation of the discharge-gas-assisted lubricant pump 51 to help describe the pumping process of the special pump imbedded into the compressor's the lower flange 11 and the lower end of the eccentric shaft 3. The moving sheet 58 is a 2-dimensional representation of the outer diameter surface of the rotating shaft of the lubricant pump 51. The stationary 2-dimensional sheet 59 is a two-dimensional representation of the stationary inner diameter of the bearing section of the Lower flange 11 acting as the cylinder wall for the lubricant pump 51. The lubricant scooping pocket 60 and 61 are carved out of the plane of the sheet 58 meaning the two lubricant scooping pockets 60 and 61 are carved starting at and into the outer diameter surface of the bottom portion of the eccentric shaft 3. The arrows 62 show the direction of the rotation of the shaft as converted to translational movement of the sheet 58 to the left as shown. The arrow 63 denotes the direction of discharge gas bleed flow into the high-pressure gas plenum 54. The high-pressure gas plenum 54 and the high-pressure lubricant plenum 55 are carved into the plane of the stationary sheet 59 meaning that the two plenums 54 and 55 are carved starting at and into the bore of the lower flange 11. The high-pressure gas plenum 54 can be connected to the source of discharge gas via the connecting passage 57 between the lower muffler 42 and the high-pressure gas plenum 54. The high-pressure lubricant plenum 55 is connected by the internal flow passage 56 to the lower bearing lubricant supply manifold 28, the lubricant supply ports 27 and the in-shaft cavity lubricant reservoir 25. The arrows 64 denote the direction of lubricant flow from the lubricant plenum 55 toward the in-shaft cavity, high-pressure lubricant reservoir 25. The open window 65 cut in the sheet 58 denotes the opening on the lower flange nose (pump cylinder) to expose a lubricant scooping pockets to the low-pressure lubricant as they pass through the open window 65 to the lubricant sump 18. The arrows 66 indicate the direction of lubricant flow from the lubricant sump 18 into the opening 65. The arrows 67 denote the lubricant flowing into the lubricant scooping pocket at the pocket at position 60 (or scooped up by the pocket) as it moves through the opening 65. The lubricant-scooping pocket 60 is shown at its oil scooping position and the lubricant scooping pocket 61 is shown at its pumping position assisted by the discharge gas. In short, as the sheet 58 moves, a lubricant scooping pocket will pick up lubricant at the pocket position 60 and pump lubricant toward the in-shaft cavity, high-pressure lubricant reservoir 25 at pocket position 61. The lubricant pumping rate of the lubricant by the lubricant pump 51 will be self-regulating in that the pumping rate is just enough to match the lubricant flow rate out of the in-shaft cavity, high-pressure lubricant reservoir 25 as was the case in the conventional high-side rolling piston compressors.

The pumping of the low-pressure lubricant into the In-shaft cavity, high-pressure lubricant reservoir 25 could also be done using conventional pumps, placed either within the compressor shell or outside the compressor shell as an option. Regardless of how the lubricant is pumped, either by the novel discharge gas assisted lubricant pump 51 described above or conventional pumps, the rest of the lubrication mechanism presented herein for the low-side shell roller-piston/vane rotary compressor shares the core of the lubrication systems that were used in high-side and the High-side/low-side shell, i.e., in-shaft cavity high pressure lubricant reservoir 25 which is an essential feature for effective lubrication of the moving parts of rolling piston compressors regardless of the configuration or embodiments presented here.

The low-side shell roller-piston/vane rotary compressor, as shown in FIGS. 9, 10 and 11, inherently has the highly desired feature of a motor cooled by the relatively low temperature liquid refrigerant through evaporation and an inherently axially balanced eccentric shaft owing to the fact that the pressures acting on both ends of the eccentric shaft are the same suction pressure.

Figure 12:
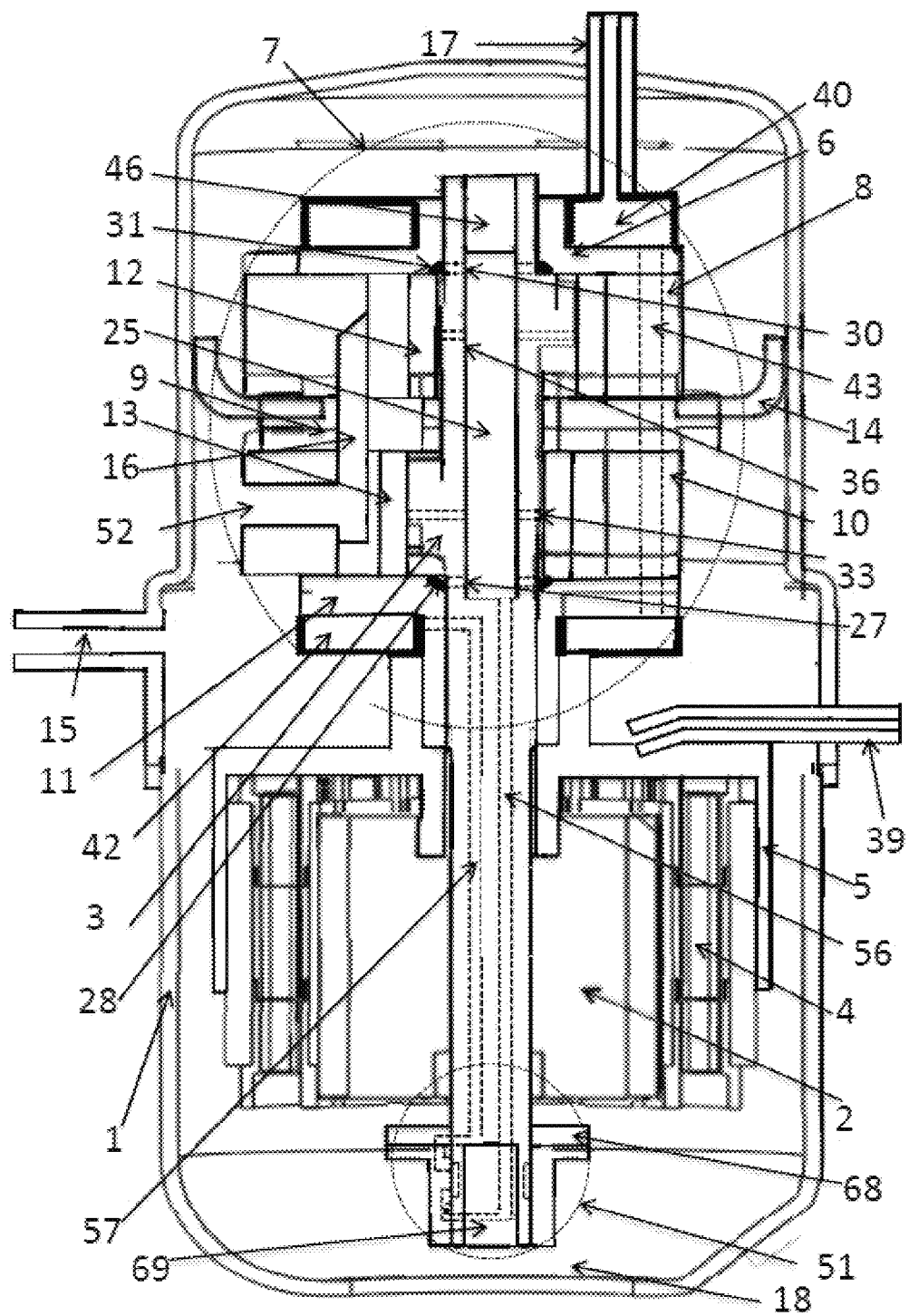
FIG. 12 is a schematic representation of another embodiment of a low-side shell, rolling piston compressor with the locations of the compressor pump assembly and the motor switched, and a lubricant pump attached below the motor.

An alternative configuration to a low-side shell roller-piston/vane rotary compressor shown in FIGS. 9, 10 and 11 is shown in FIG. 12 in which the positions of the motor and the pump assembly are exchanged. In this alternative design, the motor (the rotor 2 and the stator 4) is located below the compressor pump assembly 7. The main suction tube 15 is near the motor away from the compressor pump assembly 7 to discourage thermal interaction of the suction gas with the compressor pump assembly 7. On entrance into the shell 1 the suction gas drops most of the entrained lubricant to the lubricant sump 18 at the bottom before entering the internal suction port 52 and into the suction plenum 16. The shaft 3 will be extended through the center of the motor and extend all the way down to the lubricant sump 18 which is located below the motor. A discharge gas assisted lubricant pump 51 will now be installed below the motor to draw in the low-pressure lubricant and increase the pressure to feed into the in-shaft cavity high pressure lubricant reservoir 25. The lubricant pump 51 will be installed on a fixed base 68 preferably attached the stator 4. The lubricant-side of the shaft 3 will have the center plug 69 at the end with the lubricant flow passage 56 for the pump 51 leading to the in-shaft cavity high pressure lubricant reservoir 25. The discharge gas will come out of the top part of the cylinder through the discharge tube 17 and go out of the shell without much thermal interaction with the rest of the compressor. This alternative configuration resembles that of the low-side shell scroll compressor. This configuration shares many advantages of the low-side shell roller-piston/vane rotary compressor shown in FIG. 9 and can accommodate features such as liquid injection for motor cooling and vane-assist, high-pressure, gas cavity 74 as well. An advantage of this configuration shown in FIG. 12 over the design shown in FIG. 9 would be that the motor will have much less thermal interaction with the hot discharge gas or high temperature metal parts of the compressor and therefore will be able to run at lower temperature.

Figure 13:
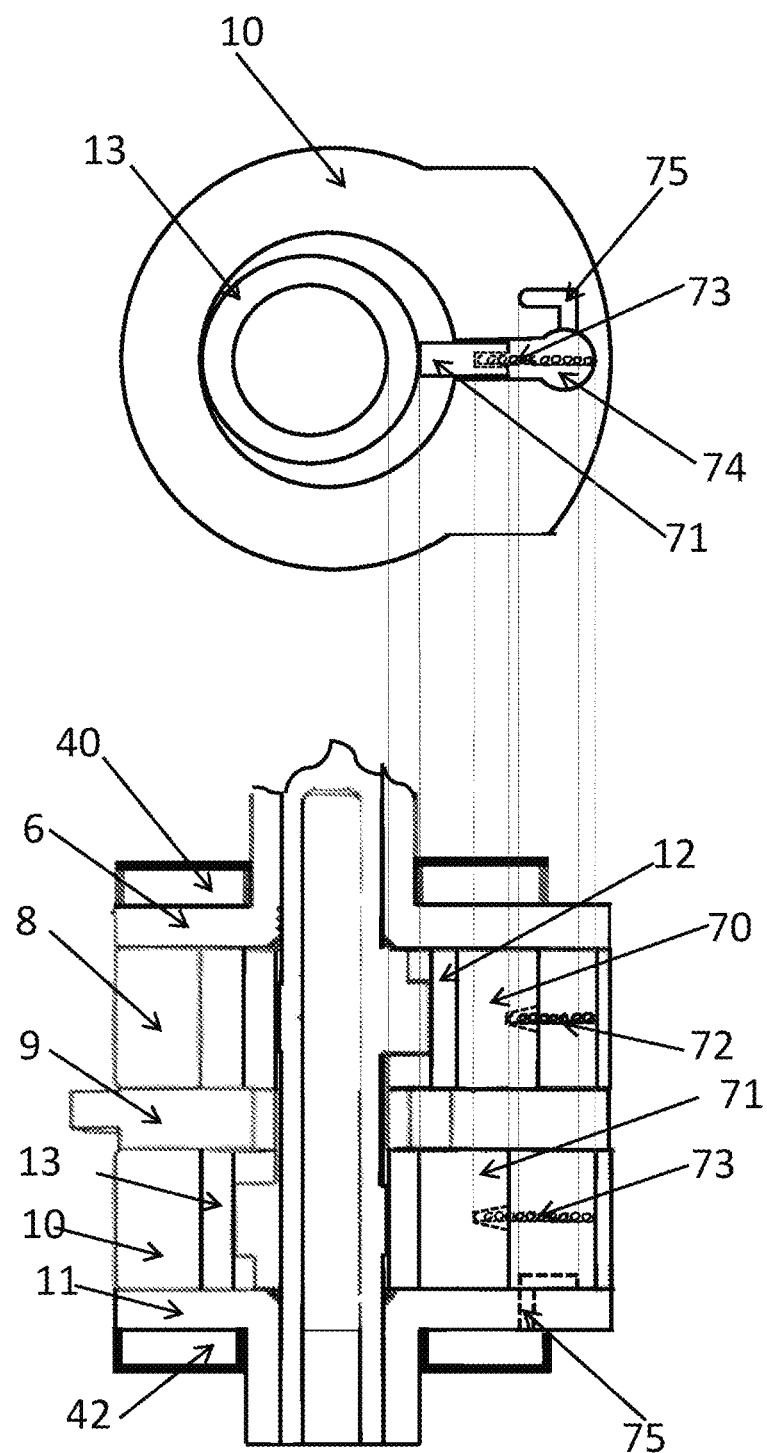
FIG. 13 is a schematic representation of one embodiment of an arrangement for the vane-assist, high-pressure, gas cavity that can be optionally used in the low-side shell rotary compressor shown in FIGS. 9 and 12.

Vane Back Pressure Considerations:

In a typical low-side shell rolling piston compressor, because the vane will not have the discharge pressure in the back, the vane spring will have to be much stronger than in the state-of-the-art high-side shell rolling piston compressor. Also, if the back side of the vane is at a relatively low pressure, this could induce leakages of both the gas and the lubricant out of the compression chamber which will undoubtedly degrade its performance. These issues can be resolved conveniently by having the rear side of the vane completely enclosed and let its pressure reach equilibrium around the average of the suction and discharge pressure. However, this raises another concern regarding the accumulation of the incompressible lubricant inside the enclosed space over time potentially interfering with the movement of the vane. To resolve all these issues, an optional feature can be introduced to have the vane lubrication mechanism and its dynamics nearly identical to what occurs in a state-of-the-art high-side shell rolling piston compressor by having the backside of the vane exposed to the discharge pressure. As shown in FIG. 13, the upper vane 70 and the lower vane 71 move back and forth with the help of the upper vane spring 72 and the lower vane spring 73, respectively. For simplicity, only the lower vane 71 is used for illustration. Behind the vane, there is an enclosed space 74 in the back of the vane. The vane-assist, discharge-pressure gas cavity 74 is connected to the lower muffler 42 via the connecting passage 75 between the gas cavity 74 and the lower muffler 42 for equalizing the pressure at discharge pressure that is carved into the lower cylinder and the lower flange. Since the direction of flow for the gas and any entrained lubricant is always from the muffler into the vane-assist, discharge pressure gas cavity 74 and into the compression space, there is no concern about accumulating incompressible lubricant in this cavity 74. Also, there is no concern about gas and lubricant leaks from the compression chamber through the vane slot into the low-side shell 1. The situation is practically identical to what happens in a conventional rolling piston compressor.

The various configurations of low-side shell roller-piston/vane rotary compressor may be summarized as follows. The discharge gas assisted, high pressure boosting, variable flow rate, lubricant pump 51 would increase the low pressure of the lubricant from the low pressure sump to the required high pressure and feed the high pressure lubricant into the in-shaft cavity high pressure lubricant reservoir to match the lubricant needed by the compressor pump assembly 7. Therefore, the functionality of the lubrication system in the low-side shell rolling piston roller-piston/vane rotary compressor is identical to that of the well-proven lubrication mechanism of state-of-the-art rolling piston compressor. By introducing the backpressure to the vane, the vane lubrication, dynamics and leakages will be also identical to those of the state-of-the-art rolling piston compressor.

Horizontal High/Low Roller-Piston/Vane Rotary Compressor:

The inventors have appreciated that it is possible to redesign any of the high-side shell roller-piston compressor configurations into horizontal roller-piston/vane compressors by properly locating the lubricant intake port in any one of the components of the compressor pump assembly with or without attaching an extension tube to the lubricant sump so that the lubricant from the high pressure lubricant sump can flow into the in-shaft cavity lubricant reservoir 25. One thing to be avoided in this case is that the oil level in the lubricant sump should not reach the rotor due to high viscous loss and potential foaming. This might necessitate having to design in a slight angle such as 5 degrees from the perfectly horizontal orientation to avoid rotor's contact with the lubricant in the sump. In the High-side/low-side BLDC rotary compressor embodiments with their motors cooled by the suction gas and/or the liquid injection presented so far, the lubricant intake port is located in a fixed part of the compressor pump assembly 7. In addition, the separator becomes a perfect dam to contain the lubricant out of the low-side shell space where the motor resides. These attributes make it relatively easy and convenient to design with confidence a High-side/low-side roller-piston/vane rotary compressor that can operate in a perfectly horizontal orientation rather than the more prevalent vertical rotary compressors and that will give more adaptability in case the platform on which the horizontal rotary compressor is mounted tilts out of horizontal plane, such as might occur in an automotive or aerospace applications, by as much 30 to 45 or degrees or even higher as necessary depending on the sump design, the location and the arrangement of the lubricant intake port and its extension.

Figure 14:
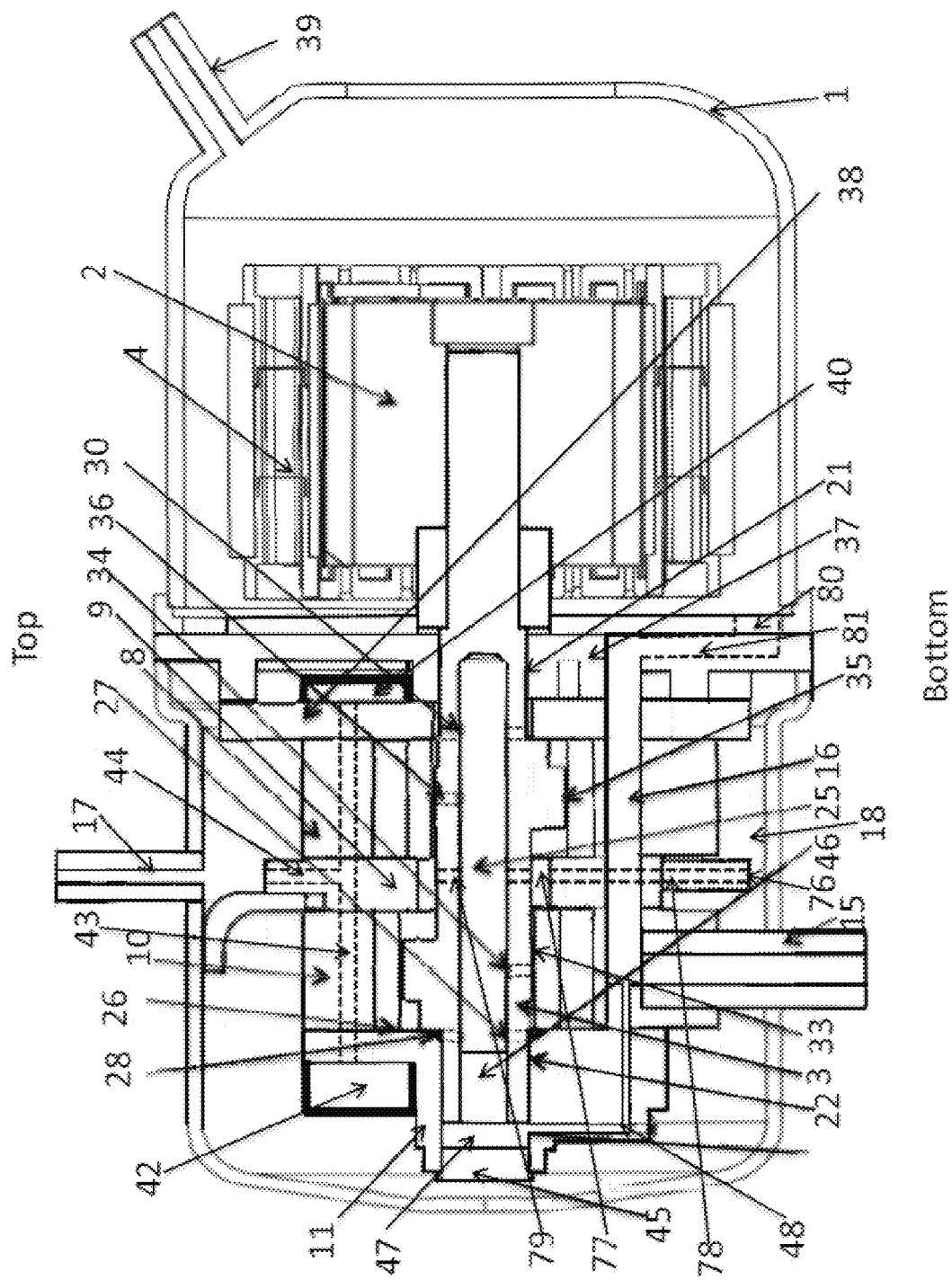
FIG. 14 is a schematic representation of one embodiment of a horizontally operating twin-cylinder, High-side/low-side shell rolling piston compressor with the optional mid plate.

In the High-side/low-side or the high-side roller-piston/vane rotary compressors, there are three convenient locations or components of the compressor pump assembly 7 that can be used to place the lubricant intake port to draw the lubricant from the lubricant sump into the high-pressure lubricant reservoir within the eccentric shaft: The upper flange, the lower flange and the mid-plate if it is a twin cylinder version. The specific location of the intake port will be determined by the choice of the normal operating orientation. For vertically operating model, the best or most convenient location is the bottom tip of the nose of the lower flange even though the other components such as other part of the lower flange, mid plate, upper plate or even the separator can be fitted with a properly shaped extension tubes to perform the same function. FIG. 14 shows an embodiment of a horizontal High-side/low-side shell, twin cylinder roller-piston/vane rotary compressor with requisite modifications. To turn the compressor into a horizontally operating model, one simply has to decide first where and how the horizontal compressor will be attached to the frame, and the lubricant intake port will be located on the lowest point in the periphery of the upper flange, upper plate, lower flange or the mid-plate for a twin cylinder compressor with or without an extension tube. If the upper flange is chosen, the lubricant will enter the high-pressure in-shaft reservoir 25 through the upper flange lubricant supply manifold 31 and its supply ports 30. If the lower flange is chosen, the lubricant will enter the high-pressure in-shaft reservoir through the lower flange lubricant supply manifold 28 and its supply ports 27. If the mid-plate is chosen, then the lubricant will enter the in-shaft cavity, high-pressure lubricant reservoir 25 through its own lubricant supply reservoir 77, lubricant supply path 78, and its supply ports 79. The rest of the components may be identical to those of the vertical High-side/low-side twin cylinder roller-piston/vane compressor shown in FIG. 7. In the embodiment shown in FIG. 14, the new location of the lubricant intake port 76 is at the lowest part of the mid plate 9 below which the lubricant sump 18 will be formed in a horizontal roller-piston/vane rotary compressor. The separator 37 containing the bore of the upper bearing 21 conveniently performs as a dam for the lubricant which ensures that the lubricant sump is contained in the high-side shell and will be away from the motor, and the amount of total lubricant needed inside the compressor during operation is smaller. The other modification is the new location of the internal suction port 80 channeling the flow from the low-side shell through the suction port at the lowest part of the separator 37 into the suction plenum 16. This new internal suction port 80 at this location ensures that any liquid or lubricant entering through the tube 39 will flow into the suction plenum 16 and not accumulate in the low-side shell that might adversely affect the operation of the motor by coming into contact with the rotor. In fact, the same location for the internal suction port 80 can be used in a vertical High-side/low-side roller-piston/vane rotary compressor even though not particularly recommended for maintaining the capability to maintain proper lubrication for largest solid angle tilt off the vertical orientation. In the horizontal High-side/low-side shell roller-piston/vane rotary compressor shown in FIG. 14, the presence of the Separator 37 conveniently blocks the lubricant from migrating toward the low-side section so that the lubricant sump will have more depth for the same amount of lubricant in the high-pressure lubricant sump. The lubricant travels toward the hollow ring shaped, high pressure, lubricant reservoir 77 (formed by the inner diameter surface of the mid plate 9, outer surface of the eccentric shaft 3 and bounded by the two cylinders (cylinder 10 on the left and the cylinder 8 on the right) before being injected into the in-shaft cavity lubricant reservoir 25 through the lubricant supply port 79 provided in the eccentric shaft 3 and then from the lubricant reservoir 25 to the rotating parts of the compressor pump assembly 7 through the lubricant ports 27, 30, 34, and 36.

Evaporative Cooling of the Motor:

In the High-side/low-side shell roller-piston/vane rotary compressors and also the low-side shell roller-piston/vane rotary compressors as described above, wherein the roller-piston/vane rotary compressor is specifically used for refrigeration, HVAC, air conditioning, heat pumps, or any other vapor compression cycle systems, one can provide a separate line through the shell or into the suction tube to inject a relatively small portion of liquid refrigerant flowing out of the condenser to be sprayed onto the motor to achieve more effective evaporative cooling for the motor than a single phase, suction gas cooling to maintain low motor temperature for high motor efficiency and to prevent undesirable heating of the suction gas from the heat generated by the motor to maintain high volumetric efficiency and/or increase the isentropic efficiency of the low-side shell roller-piston/vane rotary compressor with a suction cooled motor. As was shown, the intake tubes 39 in FIGS. 7, 9, 12, and 14 can be used to inject an appropriate portion of the total liquid flow from the condenser for evaporative cooling of the motor in a vapor Compression Refrigeration System. FIG. 5 showed a summary of the projected performance improvements possible with the liquid injection for compressors with suction cooled motor over the conventional state-of-the-art roller-piston/vane rotary compressors. In estimating the projected performance improvement, it was assumed that the same grade NdFeB magnets were used for both conventional and new suction cooled compressors and that all the heat generated by the motor's rotor magnet and the stator winding including eddy current losses in the rotor core and the stator stack were removed by the evaporative cooling at the suction pressure and further that the operating temperature of the motor was the evaporator temperature. With the extremely high heat transfer coefficient possible with the liquid refrigerant injected directly onto the motor, these assumptions would not be too far off from the actual. The projected improvement in Coefficient of Performance (COP) ranges from 8% at high evaporator temperature of 15.6° C. to 31% at low evaporator temperature of −12.2° C. The projected COP improvement is significant enough to warrant a serious undertaking to introduce the new compressors into the air conditioning and refrigeration industries around the world. Because the motors will be shielded from the high temperature discharge gas stream, the new compressors will be a natural fit for heat pumps for residential, commercial as well as industrial applications. As an added benefit, use of relatively low temperature liquid injection to cool the motor will enable the use of less of the same grade magnet material, or use a lower grade and therefore lower cost magnet materials to potentially lowering the cost of compressors at the same time increasing the reliability and longevity of the motor and therefore the compressor themselves. The above described performance and cost advantages will become more pronounced for applications with evaporator temperatures lower than −12.2° C. which covers most of the household refrigerators with freezers and dedicated freezers where the evaporator temperature can easily be as low as −40° C.

Exemplary Configurations for High-Side/Low-Side Shell Roller-Piston/Vane Rotary Compressors:

There are various methods of attaching the pump and the motor available for roller-piston/vane rotary compressors that would make each configuration with distinct advantages and disadvantages. There may be four ways to attach the pump (P) inside a High-side/low-side shell roller-piston/vane rotary compressor with an internally disposed motor: (1) Directly (D) to the shell (C) without a compressor pump assembly holder (P-D-C); (2) Indirectly (I) to the shell (C)

with a compressor pump assembly holder (P-I-C); (3) Directly (D) to the pressure separator (S) without a compressor pump assembly holder (P-D-S); or (4) Indirectly (I) to the pressure separator (S) with a compressor pump assembly holder (P-I-S).

In cases when the pressure separator is an extended part of a pump such as extended top flange that would be attached to the shell, it will be assumed that the pump is directly attached to the pressure separator without any intermediate member.

There may be the following six ways to attach the stator of the motor (M) inside a roller-piston/vane rotary compressor equipped with an inner motor motor: (1) Directly (D) to the shell (C) without a stator holder (M-D-C); (2) Indirectly (I) to the shell (C) with a stator holder (M-I-C); (3) Directly (D) to the pressure separator (S) without a stator holder (M-D-S); (4) Indirectly (I) to the pressure separator (S) with a stator holder (M-I-S); (5) Directly (D) to the upper flange (F) (M-D-F); or (6) Indirectly (I) to the upper flange (F) with a stator holder (M-I-F).

Moreover, there may be the following four ways to attach the stator of the motor (M) inside a roller-piston/vane rotary compressor equipped with an outer-rotor motor: (1) Directly (D) to the pressure separator (S) without a stator holder (M-D-S); (2) Indirectly (I) to the pressure separator (S) with a stator holder (M-I-S); (3) Directly (D) to the upper flange (F) (M-D-F), or (4) Indirectly (I) to the upper flange (F) with a stator holder (M-I-F).

Therefore, there are at least 24 (4×6) configurations that a High-side/low-side roller-piston/vane rotary compressor with an inner-rotor motor can take. There may be a total of 16 (4×4) configurations that a High-side/low-side roller-piston/vane rotary compressor with an outer-rotor motor can take. Since the inner-rotor motor is more prevalently used, the present disclosure focuses on the High-side/low-side shell compressor configurations with the inner-rotor motor to describe the various configurations possible. However, the sixteen (16) configurations available with an outer-rotor motor are also contemplated and within the scope of the present disclosure.

Some of the 24 configurations noted above require only one attachment operation to the shell, whereas others require two or three attachment operations to the shell. From the manufacturing standpoint, it is better to have less number of attachments to preserve the integrity of the components and alignment during assembly and welding operation regardless of the compressor size but especially if the physical size of the compressor is relatively small. Regardless of manufacturing issues, all 24 configurations will share the same performance advantages of the compressors with a suction cooled motor presented so far. Therefore, of the 24 configurations, those requiring only one component to be attached to the shell would be the preferred configurations based on simplicity of manufacturing.

The following are seven (7) embodiments of the present disclosure that would have only one component to be attached to the shell: H/L, P-D-S, M-D-S/F, roller-piston/vane rotary compressor (a High-side/low-side shell, roller-piston/vane rotary compressor with the pump directly mounted to the separator and the stator directly mounted to the separator or the upper flange) is a roller-piston/vane rotary compressor with a pressure separator to form a high pressure/temperature section (high-side shell section) containing the pump assembly, and a low pressure/temperature section (low-side shell section) containing the motor, wherein the pump assembly is directly attached to the pressure separator without an intermediate holder and not in direct contact with the shell directly, and the stator is also directly connected to the pressure separator or the upper flange without an intermediate holder and not in direct contact with the shell. In each of the following embodiments described below, there is only one component attached to the shell, i.e., the separator.

In some embodiments, an H/L, P-D-S, M-I-S/F, roller-piston/vane rotary compressor (High-side/low-side shell, roller-piston/vane rotary compressor with the pump directly mounted to the separator and the stator indirectly mounted to the separator or the upper flange) is a roller-piston/vane rotary compressor with a pressure separator to form a high pressure/temperature section (high-side shell section) containing the pump, and a low pressure/temperature section (low-side shell section) containing the motor, wherein the pump is directly attached to the pressure separator and not in direct contact with the shell and the stator is indirectly connected to the pressure separator or the upper flange with a stator holder and not in direct contact with the shell. In each of these embodiments, there is only one component attached to the shell, i.e., the separator.

In other embodiments, an H/L, P-I-S, M-D-S/F, roller-piston/vane rotary compressor (High-side/low-side shell, roller-piston/vane rotary compressor with the pump indirectly mounted to the separator and the stator directly mounted to the separator or the upper flange) is a roller-piston/vane rotary compressor with a pressure separator to form a high pressure/temperature section (high-side shell section) containing the pump, and a low pressure/temperature section (low-side shell section) containing the motor, wherein the pump body is indirectly attached to the pressure separator with a compressor pump assembly holder and not in direct contact with the shell and the stator is directly mounted to the pressure separator or the upper flange and not in direct contact with the shell. In each of these embodiments described herein, there is only one component attached to the shell, i.e., the separator.

In further embodiments, an H/L, P-I-S, M-I-F, roller-piston/vane rotary compressor (High-side/low-side shell, roller-piston/vane rotary compressor with the pump indirectly mounted to the separator and the stator indirectly mounted to the upper flange) is a roller-piston/vane rotary compressor with a pressure separator to form a high pressure/temperature section (high-side section) containing the pump, and a low pressure/temperature section (low-side section) containing the motor, wherein the pump body is indirectly attached to the pressure separator with a compressor pump assembly holder and not in direct contact with the shell and the stator is directly connected to the upper flange without an intermediate holder and not in direct contact with the shell. In this embodiment, there is only one component attached to the shell, i.e., the separator.

According to the present disclosure, there may be at least eleven (11) configurations that require two attachments of components to the shell during compressor assembly and the following embodiments are given as examples.

In some embodiments, an H/L, P-D/I-S, M-D/I-C, roller-piston/vane rotary compressor (High-side/low-side shell, roller-piston/vane rotary compressor with the pump directly or indirectly mounted to the separator and the stator directly or indirectly mounted to the shell) is a roller-piston/vane rotary compressor with a pressure separator to form a high pressure/temperature section (high-side shell section) containing the pump, and a low pressure/temperature section (low-side shell section) containing the motor, wherein the pump is directly or indirectly mounted to the separator and the stator is directly mounted to the shell and the pump is not directly in contact with the shell. In each of these four (4) examples, there are two attachments to the shell: pump and the pressure separator.

In further embodiments, an H/L, P-D-C, M-D/I-S/F, roller-piston/vane rotary compressor (High-side/low-side shell, roller-piston/vane rotary compressor with the pump mounted to the shell directly and the stator directly or indirectly mounted to the separator or the upper flange) is a roller-piston/vane rotary compressor with a pressure separator to form a high pressure/temperature section (high-side shell section) containing the pump, and a low pressure/temperature section (low-side shell section) containing the motor, wherein the pump is directly or indirectly mounted to the shell and the stator is directly or indirectly mounted to the separator or the upper flange without having the stator in direct contact with the shell. In each of these four (4) examples, there are two attachments to the shell: pump and the pressure separator.

In other embodiments, an H/L, P-I-C, M-D/I-F roller-piston/vane rotary compressor (High-side/low-side shell, roller-piston/vane rotary compressor with the pump mounted to the shell indirectly and the stator directly or indirectly mounted to the separator or the upper flange) is a roller-piston/vane rotary compressor with a pressure separator to form a high pressure/temperature section (high-side shell section) containing the pump, and a low pressure/temperature section (low-side shell section) containing the motor, wherein the pump is indirectly mounted to the shell and the stator is directly or indirectly mounted to the upper flange without having the stator in direct contact with the shell. In these two (2) examples, there are two attachments to the shell: pump and the pressure separator.

In some embodiments, an H/L, P-I-C, M-D-S roller-piston/vane rotary compressor (High-side/low-side shell, roller-piston/vane rotary compressor with the pump mounted to the shell indirectly and the stator directly or indirectly mounted to the separator or the upper flange) is a roller-piston/vane rotary compressor with a pressure separator to form a high pressure/temperature section (high-side shell section) containing the pump, and a low pressure/temperature section (low-side shell section) containing the motor, wherein the pump is indirectly mounted to the shell and the stator is directly mounted to the upper flange without having the stator in direct contact with the shell. In this example, there are two attachments to the shell: pump and the pressure separator.

In still further embodiments, there may be at least three three attachments to the shell. For example, in some embodiments, an H/L, P-D/I-C, M-D/I-C roller-piston/vane rotary compressor (High-side/low-side shell, roller-piston/vane rotary compressor with the pump and the stator directly or indirectly mounted to the shell) is a roller-piston/vane rotary compressor with a pressure separator to form a high pressure/temperature section (high-side section) containing the pump, and a low pressure/temperature section (low-side section) containing the motor, wherein the pump body is directly or indirectly with a compressor pump assembly holder attached to the shell, and the stator is also directly or indirectly with a compressor pump assembly holder attached to the shell. This is the most direct conversion of the state-of-the-art roller-piston/vane rotary compressors to a High-side/low-side shell, roller-piston/vane rotary compressor. In each of these four (4) examples, there will be three attachments to the shell: pump, separator, and the stator. Exemplary Configurations for the Low-Side Shell Roller-Piston/Vane Rotary Compressor:

Similar to the above-described embodiments, there are various methods of attaching the compressor pump assembly and the stator of the motor available for low-side shell roller-piston/vane rotary compressors that would make each configuration with distinct advantages and disadvantages.

There following are two ways to attach the pump (P) inside a low-side shell roller-piston/vane rotary compressor: (1) Directly (D) to the shell (C) without a compressor pump assembly holder (P-D-C); or (2) Indirectly (I) to the shell (C) with a compressor pump assembly holder (P-I-C). There also may be four ways to attach the stator of the motor (M) inside a low-side roller-piston/vane rotary compressor with an inner-rotor motor: (1) Directly (D) to the shell (C) without a stator holder (M-D-C); (2) Indirectly (I) to the shell (C) with a stator holder (M-I-C); (3) Directly (D) to the upper flange (F) (M-D-F) or other part of the pump assembly; or (4) Indirectly (I) to the upper flange (F) with a stator holder (M-I-F) or other part of the pump assembly. Moreover, there may be two ways to attach the stator of the motor (M) inside a low-side roller-piston/vane rotary compressor with an outer-rotor motor: (1) Directly (D) to the upper flange (F) (M-D-F) or other part of the pump assembly; or (2) Indirectly (I) to the upper flange (F) with a stator holder (M-I-F) or other part of the pump assembly.

Therefore, there may be at least 8 (4×2) configurations that a low-side roller-piston/vane rotary compressor with an inner-rotor motor can take. There are a total of 4 (2×2) configurations that a low-side roller-piston/vane rotary compressor with an outer-rotor motor can take. None of these configurations will be described in detail herein for obviousness. Since the inner-rotor motor is more prevalently used in compressors, we will use the case of the inner-rotor motor as examples. Again, configurations requiring only one component to be attached to the shell would be a preferred design. One good example would be Indirectly (I) to the shell (C) with a compressor pump assembly holder (P-I-C) combined with Indirectly (I) to the upper flange (F) with a stator holder (M-I-F) or other part of the pump assembly.

Figure 17:
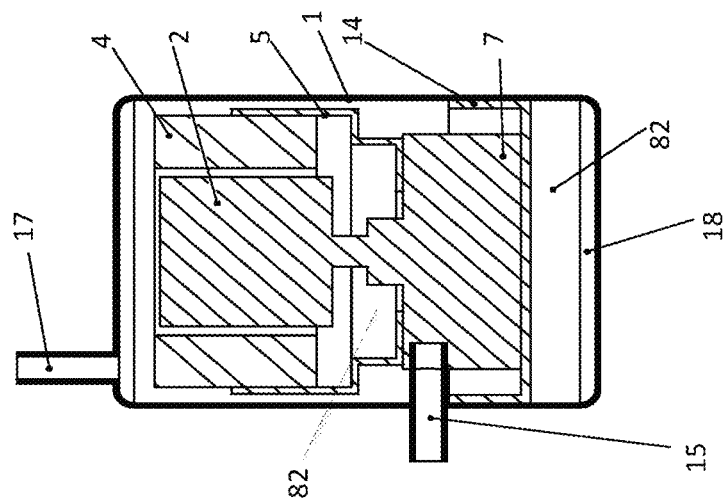
FIG. 17 is a schematic for an embodiment of a variation of a high-side shell roller-piston/vane rotary compressor configuration with the pump assembly indirectly attached to the shell using compressor pump assembly holder and the motor stator indirectly attached to the pump assembly using stator holder.
Figure 16:
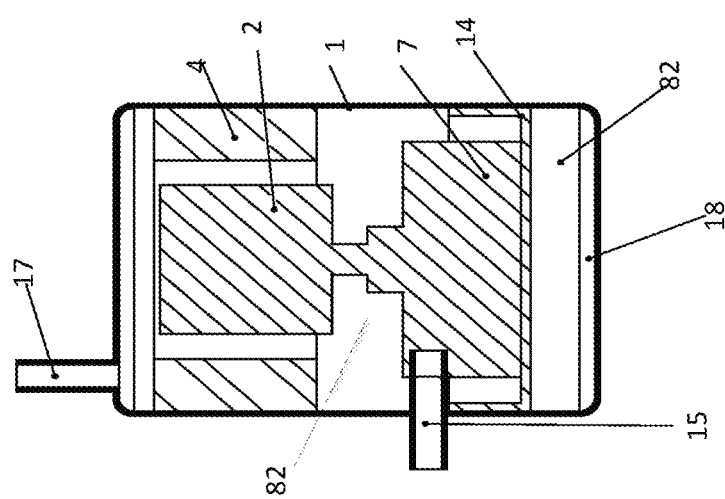
FIG. 16 is a schematic for an embodiment of a variation of a high-side shell roller-piston/vane rotary compressor configuration with the motor stator directly affixed to the shell but with the pump assembly indirectly attached via a compressor pump assembly holder.
Figure 15:
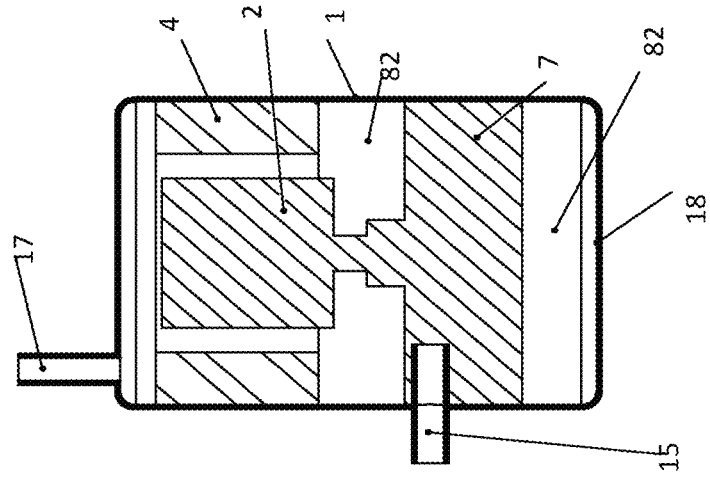
FIG. 15 is a schematic for an embodiment of the most prevalently used, state-of-the art, high-side shell roller-piston/vane rotary compressor configuration with both the pump assembly and the motor stator firmly attached to the shell.
Figure 20:
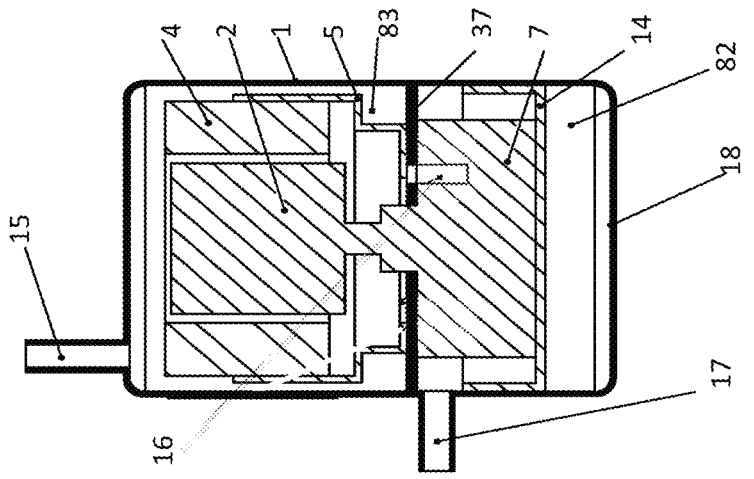
FIG. 20 is a schematic for an embodiment of a High-side/low-side shell roller-piston/vane rotary compressor with the pump assembly indirectly attached to the shell using a compressor pump assembly holder and the motor indirectly attached to the Separator using a stator holder similar to the attachment methods in the design in FIG. 17.
Figure 19:
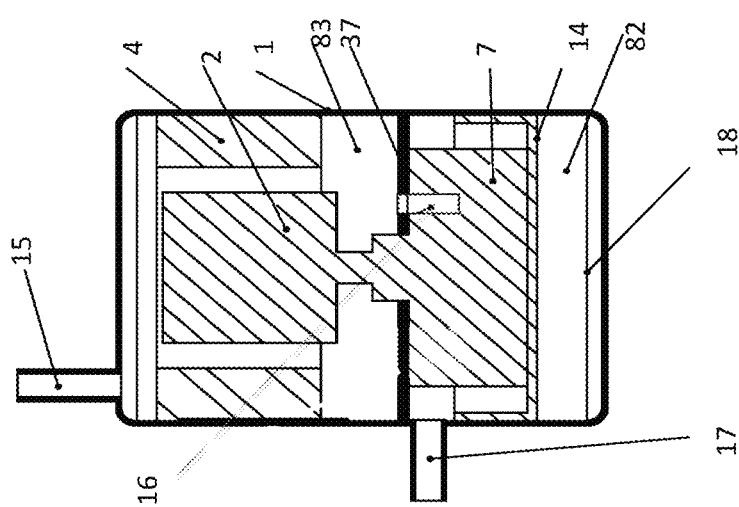
FIG. 19 is a schematic for an embodiment of a High-side/low-side shell roller-piston/vane rotary compressor with the pump assembly indirectly attached to the shell using a compressor pump assembly holder and the motor directly attached to the shell.
Figure 18:
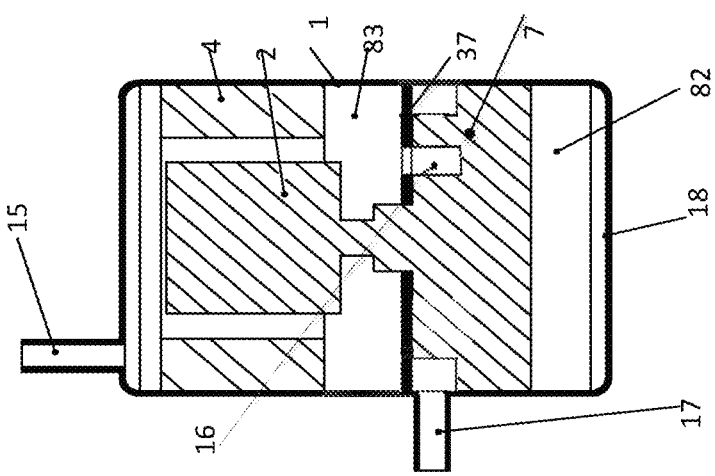
FIG. 18 is a schematic for an embodiment of a High-side/low-side shell roller-piston/vane rotary compressor with both the pump assembly and the motor directly attached to the shell similar to the attachment methods in the most prevalently used state-of-the-art, high-side shell rolling piston rotary compressor.
Figure 22:
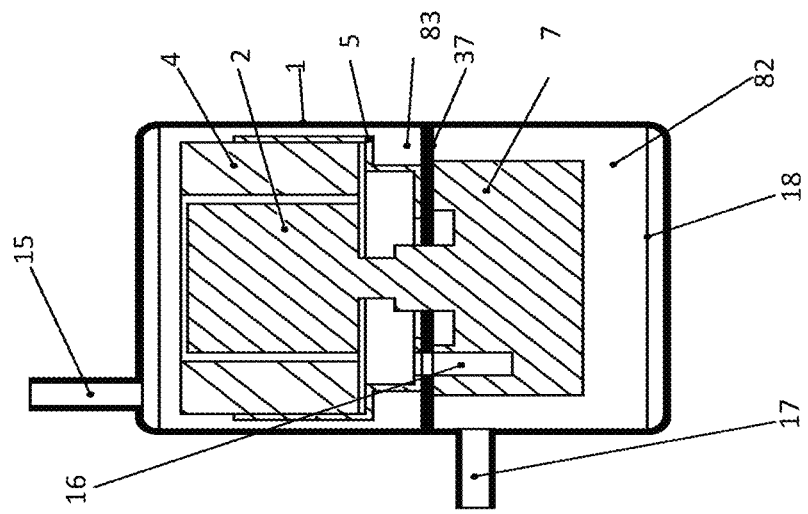
FIG. 22 is a schematic for an embodiment of a High-side/low-side shell roller-piston/vane rotary compressor with the pump assembly directly mounted to the Separator and the motor indirectly attached to the Separator using a stator holder.
Figure 21:
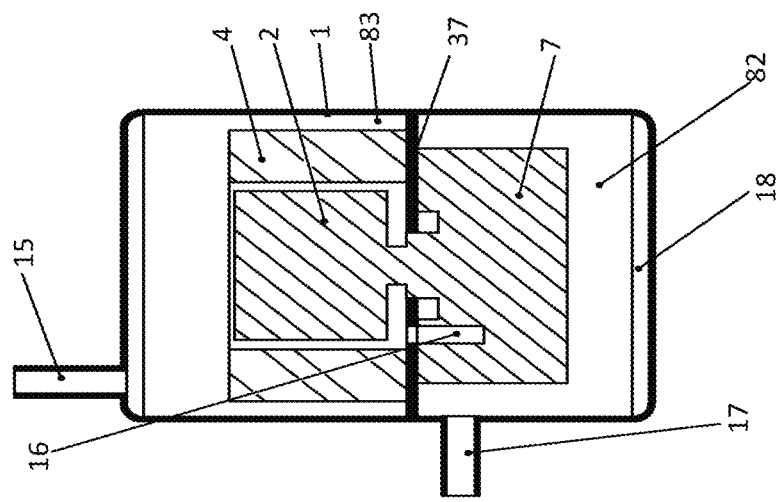
FIG. 21 is a schematic for an embodiment of a High-side/low-side shell roller-piston/vane rotary compressor with both the pump assembly and the motor directly attached to the separator.
Figure 23:
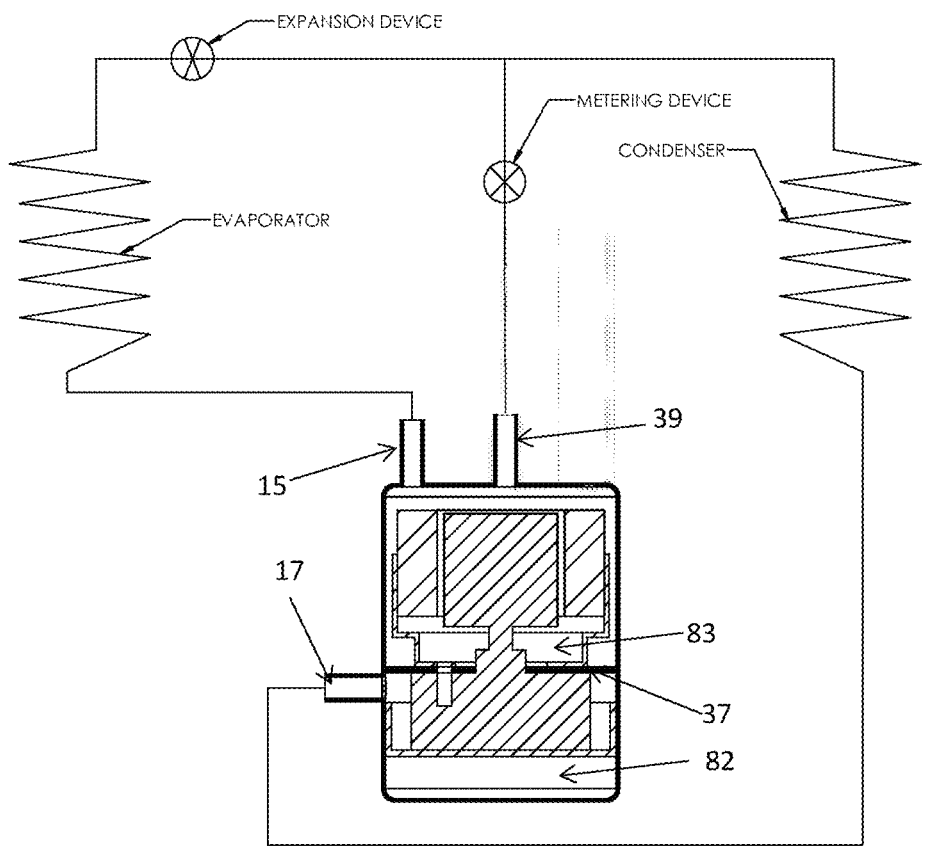
FIG. 23 A simplified schematic for an embodiment of a High-side/low-side shell roller-piston/vane rotary compressor shown in FIG. 20 used in a vapor Compression Refrigeration System with both the main suction line and a metered liquid injection line goes through the low-side shell to cool the motor.

FIGS. 15 through 22 show various configurations of the compressor with an inner-rotor motor in a schematic format. FIGS. 15 to 17 show the configurations for state-of-the-art roller-piston/vane rotary compressors, i.e., the high-side shell roller-piston/vane rotary compressor, and two of its minor variations. Note that the space inside the shell 1 is discharge gas pressure space 82. FIGS. 18 to 22 show five (5) of the above-described twenty four (24) embodiments of the High-side/low-side shell roller-piston/vane rotary compressors. FIG. 15 is the most widely used, conventional, i.e., high-side shell state-of-the-art roller-piston/vane rotary compressor with both the compressor pump assembly 7 and the stator 4 firmly and directly attached to the shell, the suction tube directly connects to the suction port of the compressor pump assembly, and the space 82 inside the shell 1 is in discharge pressure. FIG. 16 is the modification of the conventional high-side shell roller-piston/vane rotary compressor shown in FIG. 15 with one modification: i.e., the compressor pump assembly 7 is indirectly attached to the shell 1 via a compressor pump assembly holder 14. FIG. 17 shows the high-side shell roller-piston/vane rotary compressor with two modifications: i.e., the compressor pump assembly 7 is indirectly attached to the shell 1 via a compressor pump assembly holder and the stator 4 is also indirectly attached to the shell 1 via a stator holder 5. This is the configuration covered by the issued and pending patent by the current inventors (ref. 5). FIGS. 18, 19 and 20 show the addition of separators to the configurations shown in FIGS. 15, 16 and 17, respectively, making all of them a High-side/low-side shell roller-piston/vane rotary compressors. FIG. 21 shows a High-side/low-side shell compressor with both the compressor pump assembly 7 and the stator 4 directly mounted on the separator with only a single component, Separator 37, to be attached to the shell. FIG. 22 shows a High-side/low-side shell roller-piston/vane rotary compressor with the pump directly attached to the separator and the stator indirectly attached to the separator via a stator holder also resulting in a single component, Separator 37, to be attached to the shell. The above eight (5) embodiments were graphically shown to give a reviewer a better understanding of the various configurations covered by the current patent. The remaining embodiments will not be shown for obviousness. Note that in all the 24 embodiments of the high-side/low-side shell embodiments, the discharge gas is let out into the high side before going out the discharge tube 17 to make sure a bulk of the lubricant gets separated from the discharge gas and collects in the lubricant sump 18 at the bottom. FIG. 23 shows a High-side/low-side shell refrigerant roller-piston/vane rotary compressor with a separate liquid line 39 to inject liquid from the condenser through a metering device, into the low-side shell for spraying the liquid refrigerant over the motor to achieve enhanced evaporative cooling of the motor as described previously. Note that space below the Separator 37 is the discharge gas space 82 (high-side shell) and the space above the separator 37 is the suction gas space 83 (low-side shell). The relatively small amount of refrigerant liquid flow from the condenser injected into the suction pressure space 83 through liquid refrigerant injection tube 39 will evaporate as it comes into contact with the motor and maintain the operating temperature of the motor close to the evaporator temperature resulting in the increase of the motor efficiency and removing the detrimental effect of suction temperature increase due to heating by the motor.

Figure 24:
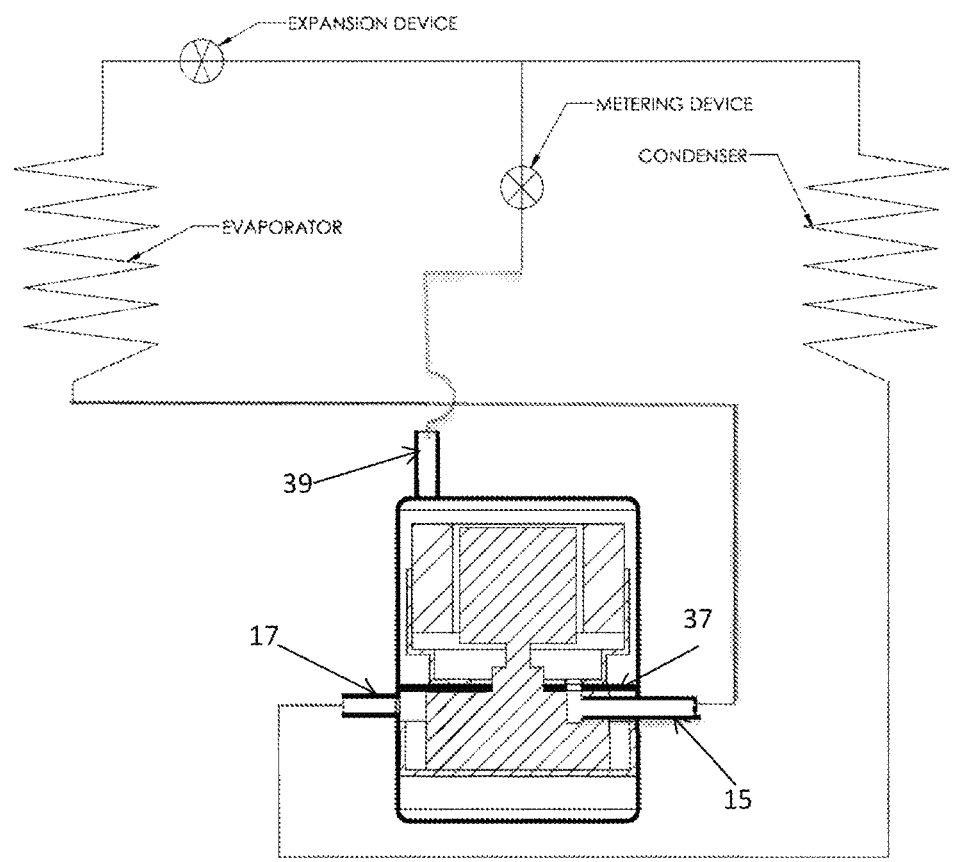
FIG. 24 is a schematic for an embodiment of a High-side/low-side shell roller-piston/vane rotary compressor shown in FIG. 20 used in a vapor Compression Refrigeration System with the main suction line connected directly to the suction port through the shell on the high-side and a metered liquid injection line goes through the low-side shell to cool the motor.

FIG. 24 shows a High-side/low-side shell refrigerant roller-piston/vane rotary compressor with a separate liquid refrigerant injection tube 39 into the low-side shell for spraying the liquid from the condenser over the motor for enhanced evaporative motor cooling as described previously and the main suction tube 15 coming from the evaporator penetrating through the high-side shell to reduce the heating of the main suction gas by the pump assembly.

Figure 25:
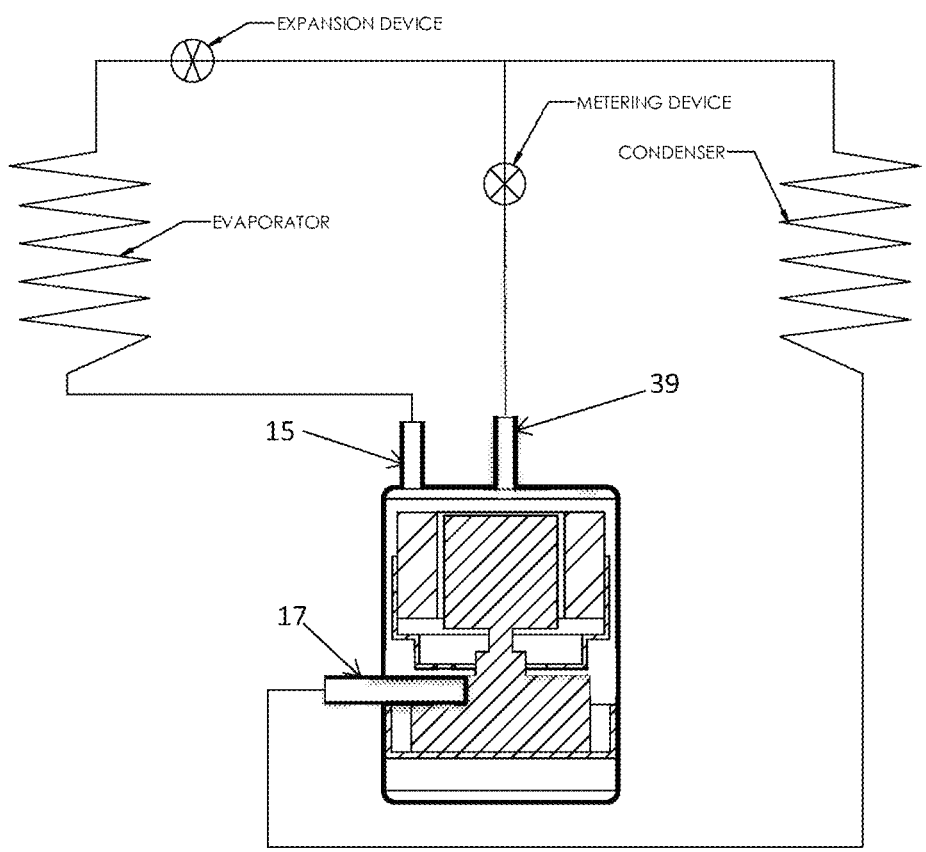
FIG. 25 is aschematic for an embodiment of a low-side shell roller-piston/vane rotary compressor used in a vapor Compression Refrigeration System with the main suction line and a metered liquid injection line going through the low-side shell to cool the motor while discharge gas directly going out of the shell through the discharge tube connected to the discharge port.

FIG. 25 shows a low-side shell refrigerant roller-piston/vane rotary compressor with a separate liquid refrigerant injection tube 39 into the low-side shell for spraying the liquid from the condenser over the motor to reduce the heating of the suction gas by the pump assembly by enhanced evaporative motor cooling as described previously. The main suction tube 15 coming from the evaporator also comes through the low-side shell. The discharge gas goes out of the pump assembly through a discharge tube 17 that is directly connected to the muffler and goes out of the low-side shell without entering the shell.

Figure 26:
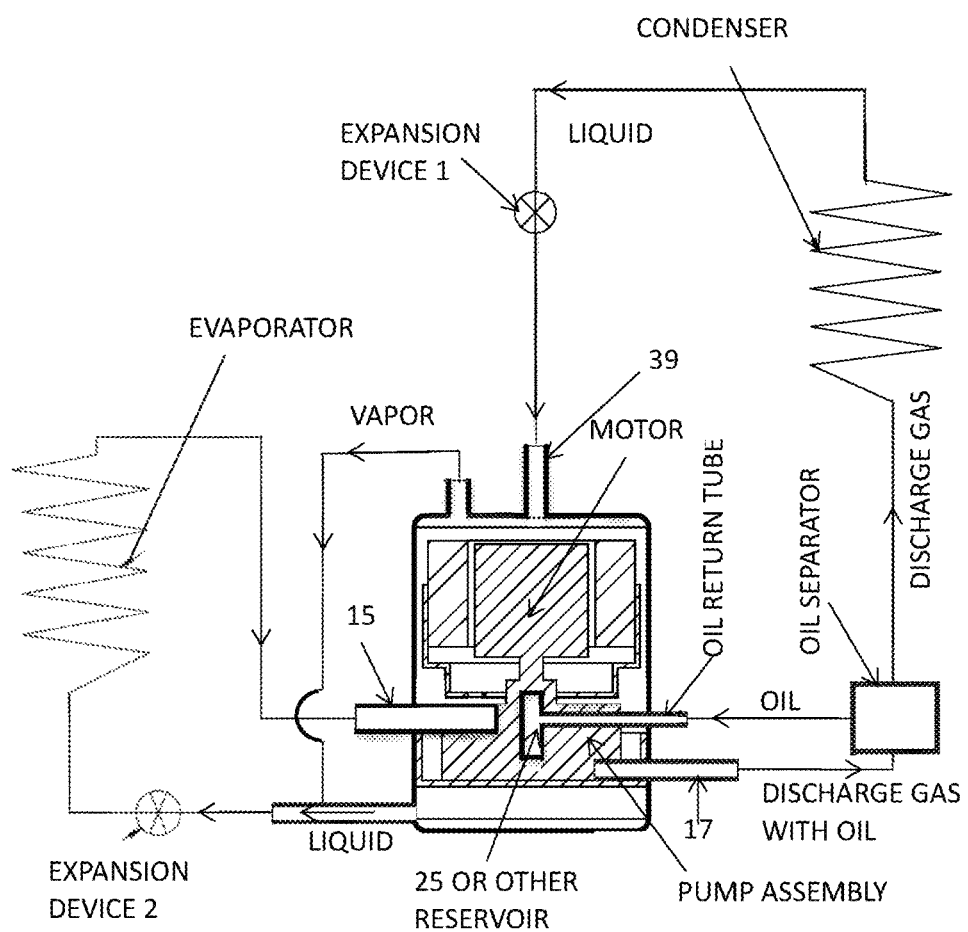
FIG. 26 is a schematic for an embodiment of an adjustable shell pressure, single-shell, oil lubricated, VCS compressor in general, with an internally disposed motor, including roller-piston/vane rotary compressor, scroll compressor, and reciprocating compressor.

FIG. 26 is an embodiment of an adjustable shell pressure, single-shell, oil lubricated, VCS compressor in general, including roller-piston/vane rotary compressor, scroll compressor, and reciprocating compressor. Both the discharge tube and suction tube are directly connected to the discharge valve port and suction port of the pump assembly, respectively. In this configuration, neither the suction gas through the suction tube 15 nor the discharge gas through the discharge tube 17 mixes with the working gas inside the shell. There is an expansion device between the condenser and liquid injection tube 39 into the shell, and after cooling the motor by evaporation of some of the liquid at the selected shell pressure, the remaining liquid goes through the liquid discharge tube at the lower part and the vapor goes through the vapor discharge tube on the upper part of the shell and the combined stream enters the second expansion device to feed the evaporator at suction pressure. The pressure inside its shell may be set between the suction pressure and discharge pressure for optimum compressor/system performance by the settings of the two expansion devices such as a thermal expansion valve, or needle valve, etc. The heat generated by the motor during conversion of electrical power to mechanical power by the motor is carried away by the evaporation of the liquid in contact with the motor. Therefore, the base temperature of the motor is the evaporation temperature of the refrigerant at the selected pressure. Due to the high heat transfer coefficient of evaporative cooling, the motor operating temperature will go only slightly higher than the evaporation temperature of the refrigerant at the selected shell pressure to the level necessary for the motor heat to be transferred from the motor to the cooling fluid. Since the motor operating temperature will be close to the evaporating temperature at the selected shell pressure, this sets off a virtuous cycle: lower motor operating temperature, lower resistivity of the stator winding, less magnet heating, higher field strength, higher torque generated by the motor, less current needed to generate the required torque, higher motor efficiency, less overall cooling demand, and improved overall compressor and vapor Compression Refrigeration System performance. One aspect of this configuration that may or may not be beneficial is the fact that the cooling medium also cools the pump assembly. Cooling the compressor pump assembly is considered beneficial in general however in this case, increases the amount of heat to be removed by the cooling medium and decreases the net cooling capacity of the vapor Compression Refrigeration System unless of course the supercharging is included.

If the compressor is oil lubricated, the oil entrained in the discharge gas is separated by an oil separator, either internal or external to the shell, and fed back into the in-shaft cavity high pressure lubricant reservoir 25 or other appropriate location inside the compressor pump assembly.

The oil return tube can be attached to various parts of the pump assembly so long as there is a pathway to the in-shaft cavity high pressure lubricant reservoir 25 or other appropriate entry points depending on the type of the compressor. The virtually oil-free discharge gas enters the condenser where the gas condenses into liquid with enhanced heat transfer between the condensing gas and the condenser heat exchanger surface in the virtual absence of oil film. The liquid from the condenser is injected onto the motor section of the compressor creating an evaporative cooling of the motor ensuring that the motor operating temperature will remain close to the condenser temperature at most if the shell pressure is set at close to the discharge pressure in sharp contrast to the temperature well above the discharge temperature that happens in the state-of-the-art high-side shell rotary compressors using discharge gas as the cooling medium with a very low convection heat transfer coefficient.

As shown in FIG. 26, this system uses two Expansion devices: Expansion device 1 controls the pressure inside the shell under which the liquid injected will be evaporating on the motor. The Expansion Device 2 sets the evaporator pressure. As the shell pressure is decreased, the evaporation temperature of the liquid in contact with the motor will decrease, the motor operating temperature will decrease, and the motor efficiency will increase but the lubricant leakages from the pump assembly into the shell through shaft bearings, etc. will increase. The shell pressure will be therefore set appropriately between the suction pressure and the discharge pressure to optimize the overall compressor performance. Even though this concept requires an oil separator, it will have the following advantages compared to the state-of-the-art high-side shell rotary VCS compressor: (1) the condenser heat exchanger effectiveness will increase because most of the entrained oil in the discharge gas will be separated and returned to the compressor resulting in a very low OCR (Oil Circulation Ratio) vapor Compression Refrigeration System; and (2) the motor operating temperature will be significantly lower and the motor efficiency will be higher than those for a compressor with discharge gas cooled motor.

Exemplary Advantages of Adjustable Shell Pressure, Single Shell, BLDC Scroll VCS Compressors with Liquid Injection Motor Cooling Over the State-of-Art Scroll Compressors:

State-of-the art scroll compressors are either a low-side shell scroll compressors or high-side shell compressors. The low-side shell scroll compressors have advantages of having the suction gas cooling the motor but with two prominent disadvantages: heated suction gas that reduces the volumetric efficiency and the need to bypass the high pressure oil to the low pressure side causing so-called oil by-pass losses. In order to overcome disadvantages of the oil by-pass loss of the low-side scroll compressor, a recent modification was reported as high-side shell scroll compressor with HiPORTM in which a method involving oil separation, supply pump and recovery pump mechanism was introduced. A crucial disadvantage in this high-side shell scroll compressor is that, the motor is to be cooled by the discharge gas that immediately puts it at a disadvantage over the new scroll compressor described below in addition to the added complexity of the oil separation and pumping mechanisms and corresponding increase in production cost. In other words, this new configuration of screw compressor as shown in FIG. 26 keeps the advantages of both low-side and high-side shell screw compressors while eliminating or mitigating the disadvantages of both. In the case of an oil free scroll compressor, the oil separator loop included in FIG. 26 is not necessary thereby simplifying the configuration. In short, major advantages of the adjustable shell pressure scroll compressor are that the motor's baseline temperature is the relatively low evaporation temperature at the selected shell pressure with much higher heat transfer coefficient of evaporative cooling and much smaller temperature rise above the evaporation temperature compared to the relatively high discharge or suction gas temperatures with relatively low convection heat transfer and larger temperature rise above the discharge or suction temperature.

Also, the adverse effects of heating the suction gas that occur in the low-side shell scroll compressor are largely eliminated by choosing the optimum shell pressure to inject the liquid refrigerant for evaporative cooling of the motor while the suction gas enters the compression chamber without interacting with the gas inside the shell. Therefore, new adjustable shell pressure scroll compressor is an improvement over both the low-side shell scroll compressor with or without liquid injection cooling and the high-side shell scroll compressor.

Applying the same design principle to the low-side shell BLDC reciprocating VCS compressor, one can turn it into a more efficient adjustable shell pressure, BLDC reciprocating refrigerant compressor. A state-of-the art BLDC reciprocating compressors are low-side shell compressors. The low-side shell reciprocating compressors have advantages of having the suction gas cooling the motor but with two prominent disadvantages: heated suction gas that reduces the volumetric efficiency and significantly degrades the COP of the vapor Compression Refrigeration System due to lowered isentropic efficiency of the reciprocating compressor which is inherently inferior to the roller-piston/vane compressors from the thermodynamic point of view under the same operating conditions. However, these compressors are much easier to produce at extremely low cost.

When an appropriate portion of the liquid refrigerant flowing out of the condenser is injected at an optimum pressure over the motor in an adjustable shell pressure reciprocating VCS compressor as illustrated in FIG. 26, the efficiency of the motor would increase significantly and the heating of the suction gas by the motor will be totally absent. However, just like any other embodiments presented so far featuring liquid injection evaporative cooling of the motor, the compressor's cooling capacity will drop due to the amount of liquid from the condenser used for the evaporative motor cooling. It is noteworthy, however, most of the VCS compressors used in household refrigerators and many other applications are generally oversized to begin with and therefore runs only part of the time at a fixed speed or reduced speed to match the load.

Therefore, the adjustable shell pressure reciprocating compressor having the liquid injection feature can readily replace the conventional, state-of-the-art, reciprocating compressors with internally disposed BLDC motors if the operating speed can be increased, run longer periods or having a proportionately larger displacement to make up for the loss in cooling capacity but operating at much higher compressor efficiency and COP.

Figure 27:
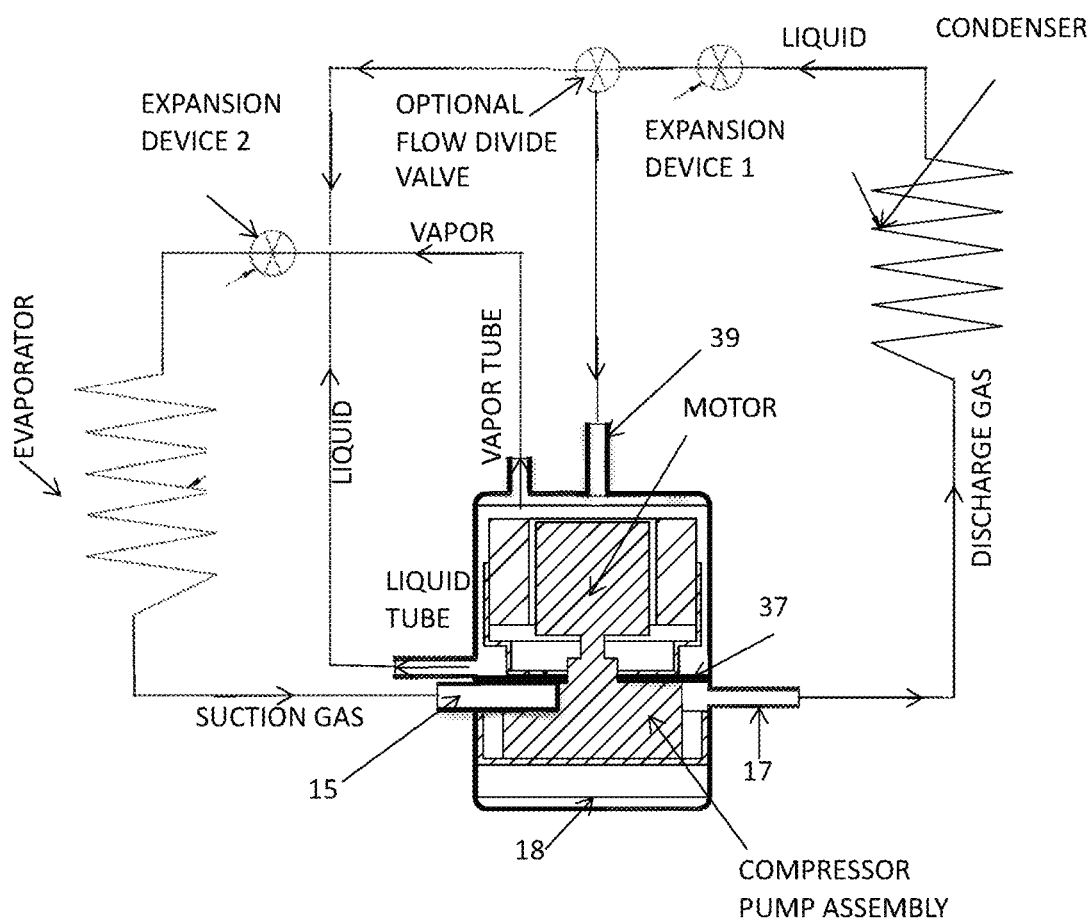
FIG. 27 is a schematic for an embodiment of a High-side/adjustable low-side, oil lubricated or oil less, VCS compressor in general, with an internally disposed motor, including roller-piston/vane rotary compressor, scroll compressor, and reciprocating compressor.

FIG. 27 is an embodiment of a High-side/adjustable low-side shell pressure, oil lubricated, VCS compressor in general, including roller-piston/vane rotary compressor, scroll compressor, turbine types, and reciprocating compressors of various kinds. This embodiment is similar in working fluid flow arrangement to the one shown in FIG. 26. However, in the embodiment in FIG. 27, only the suction tube is directly connected to the suction port of the pump assembly but the discharge tube is connected to the high-side shell. Additionally, because the discharge gas enters the high-side shell before going out, most oil gets separated from the high pressure gas, falls by gravity and forms the lubricant reservoir 18 at the bottom to feed the lubrication mechanism similar to that of the state-of-the-art VCS compressors with the high-pressure lubricant reservoir at the bottom. This configuration does not need an external oil separator unlike the embodiment of FIG. 26. Moreover, the cooling medium for the motor is used for the motor only and therefore, the pump assembly does not get cooled.

Many of the benefits of adjustable shell pressure as described for the embodiment of FIG. 26 are still retained. There is an expansion device between the condenser and liquid injection tube 39 into the low-side shell, and after cooling the motor by evaporation of some of the liquid at the selected shell pressure, the remaining liquid goes through the liquid discharge tube at the lower part of the low-side shell and the vapor goes through the vapor discharge tube on the upper part of the low-side shell and the combined stream enters the second expansion device to feed the evaporator at suction pressure. The pressure inside the low-side shell may be set between the suction pressure and discharge pressure for optimum compressor/system performance by the settings of the two expansion devices such as a thermal expansion valve, or needle valve, etc. The heat generated by the motor during conversion of electrical power to mechanical power by the motor is carried away by the evaporation of the liquid in contact with the motor. Therefore, the base temperature of the motor is the evaporation temperature of the refrigerant at the selected pressure. Due to the high heat transfer coefficient of evaporative cooling, the motor operating temperature will go only slightly higher than the evaporation temperature of the refrigerant at the selected shell pressure to the level necessary for the motor heat to be transferred from the motor to the cooling fluid. Since the motor operating temperature will be close to the evaporating temperature at the selected shell pressure, this sets off a virtuous cycle: lower motor operating temperature, lower resistivity of the stator winding, less magnet heating, higher field strength, higher torque generated by the motor, less current needed to generate the required torque, higher motor efficiency, less overall cooling demand, and improved overall compressor and vapor Compression Refrigeration System performance.

If the compressor is oil lubricated, the oil entrained in the discharge gas is separated by gravity inside the high-side shell, and fed back into the in-shaft cavity high pressure lubricant reservoir 25 or other appropriate location inside the compressor pump assembly of high-side shell VCS compressors.

The liquid from the condenser is injected onto the motor section of the compressor creating an evaporative cooling of the motor ensuring that the motor operating temperature will remain close to the condenser temperature at most if the shell pressure is set at close to the discharge pressure in sharp contrast to the temperature well above the discharge temperature that happens in the state-of-the-art high-side shell rotary compressors using discharge gas as the cooling medium with a very low convection heat transfer coefficient.

As shown in FIG. 27, this system uses two Expansion devices: Expansion device 1 in conjunction with Expansion Device 2 controls the pressure inside the low-side shell under which the liquid injected will be evaporating on the motor inside the low-side shell. The Expansion Device 2 sets the evaporator pressure. As the shell pressure is decreased, the evaporation temperature of the liquid in contact with the motor will decrease, the motor operating temperature will decrease, and the motor efficiency will increase but the lubricant leakages from the pump assembly into the shell through shaft bearings, etc. will increase. The low-side shell pressure will be therefore set appropriately between the suction pressure and the discharge pressure to optimize the overall compressor performance.

Approaches for Increasing Vapor Compression Cooling/Heating System Performance:

The following discussion illustrates the rationale and design principles to substantially improve the performance and reliability of compressors used in cooling systems and heat pumps in general: (1) Increase motor efficiency by achieving significantly lower motor operating temperature through cooling of the motor effectively and at lower base coolant temperature: this results in decreased electrical power needed to generate the mechanical power; (2) Increase isentropic compression efficiency by cooling/quenching and significantly lowering the temperature of the compression chamber: this results in decreased mechanical power required for compression process per unit mass processed by the compressor; (3) Increase sub-cooling: this results in increased cooling capacity per unit mass of refrigerant passing through the evaporator; and (4) Incorporate supercharging to reinject refrigerants needed for the above three cooling measures into the compression chamber: this will result in significant increases in cooling capacity, heating capacity, COP, and reliability.

Figure 28:
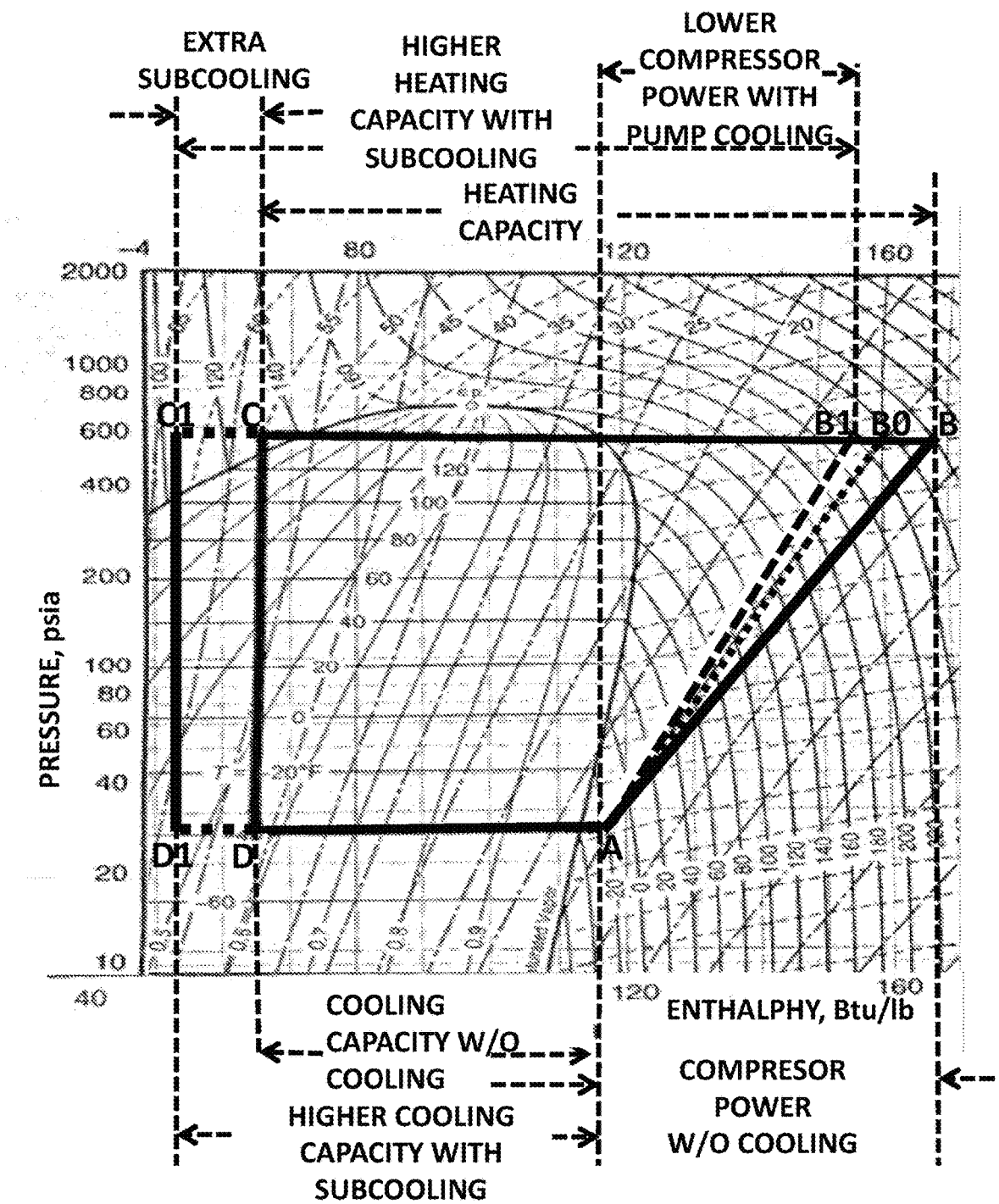
FIG. 28 is a plot illustrating benefits of cooling the pump body, according to some embodiments.

FIG. 28 is a p-h (pressure-enthalpy) diagram for R410a showing the potential effects of cooling the compression chamber on compressor power. It shows a basic compression process, A-B, assuming isentropic efficiency is approximately 86%, discharge temperature of 280 F, and the compression power per unit mass of refrigerant compressed by and discharged from the compressor, is approximately 51 Btu/lb which is equal to the difference in enthalpy (h) between B and A (=hB−hA=167−116=51 Btu/lb) without cooling the compression chamber. With cooling, the discharge temperature gets reduced to 240 F indicated by the state point B1, the compression curve turns to the left, A-B1, and as a result, the compression power per unit mass of refrigerant decreases as shown which is equal to the difference in enthalpy (h) between B1 and A, 40 Btu/lb (=hB1−hA=156−116=40 Btu/lb). It also shows that with extra sub-cooling, denoted by process C-C1, the cooling capacity per unit mass of refrigerant increases by 12 Btu/lb (=hC−hC1=65−53=12 Btu/lb). FIG. 28 is the refrigeration cycle without supercharging and as mentioned previously, since the refrigerant flow rate through the compressor and the condenser is fixed at M.

Figure 29:
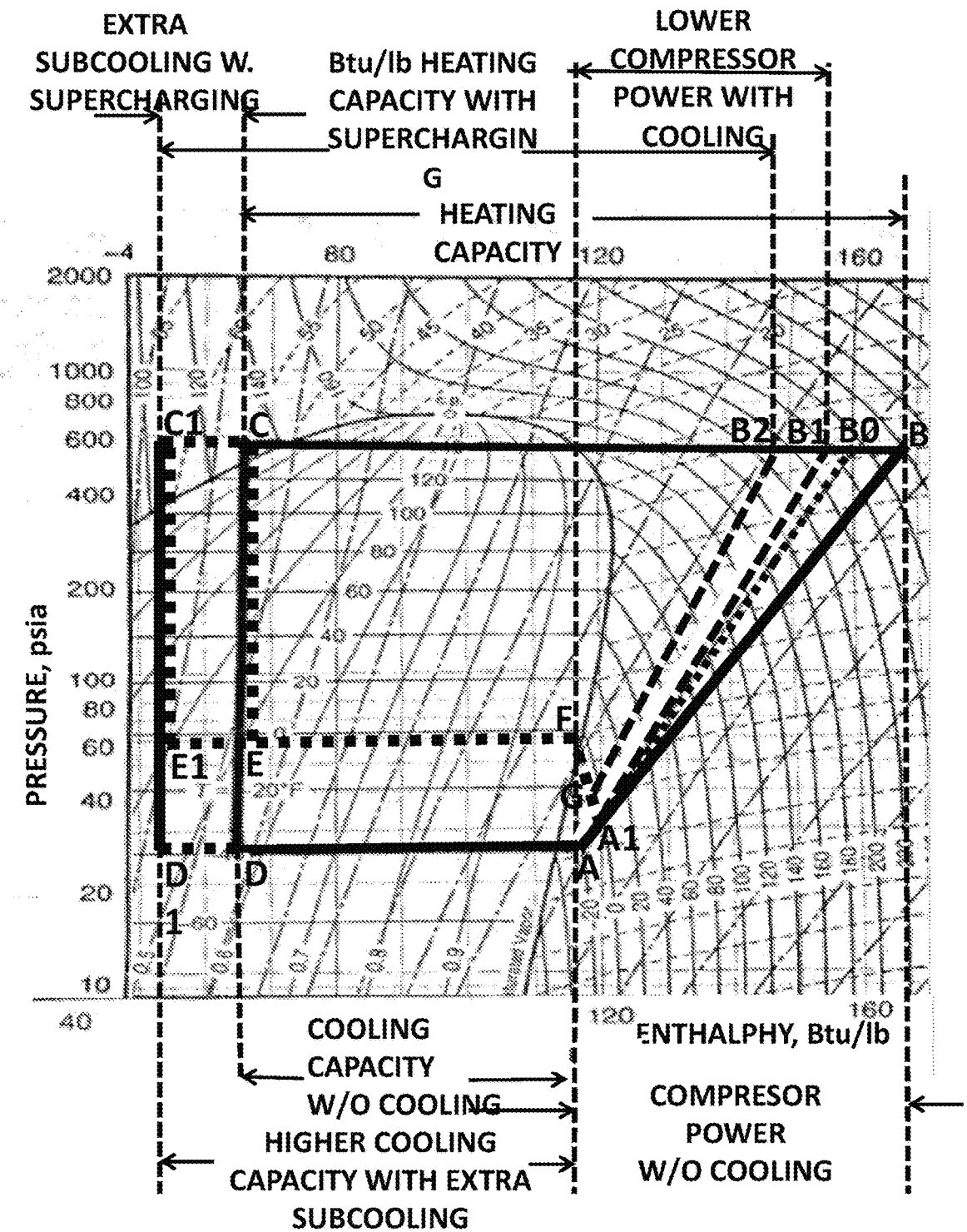
FIG. 29 is a plot of a pressure enthalpy analysis of a vapor compression system undergoing supercharging injection.

It shows a modified compression process, A-A1-G-B2, where A is the beginning state of compression stroke, and A1 denotes the thermodynamic properties of the refrigerant (pressure, temperature, enthalpy, density, etc.) inside the compression space when supercharging starts; F denotes the thermodynamic properties of the refrigerant returning from in-shell motor cooler, in-shell pump body cooler and/or external vaporizer for extra sub-cooling. G denotes the end state of supercharging process. With supercharging, the refrigerant flow rate is higher than M, which is determined by the operating conditions and compressor displacement. The discharge flow rate of the compressor in the presence of supercharging is increased by the supercharged amount of additional refrigerant flow required for cooling the motor (m1), the pump body (m2) inside the shell and/or the external vaporizer for extra sub-cooling (m3). In the example shown in FIG. 29, all three extra heat exchange processes are performed by evaporation in each of the three heat exchangers at the same pressure, and also the evaporation process denoted by E1-E-F and injection pressure during supercharging are identical to all three. This does not have to be the case for all compressors. In certain cases, when it is easy to have different injection points or timing such as for roller piston/vane compressors, reciprocating compressors, scroll compressors, or screw compressors, each of the three heat exchangers can remove heat by evaporation from the motor, pump body and the external vaporizer at its own appropriate pressure and temperature and corresponding supercharging into the compression space can also occur separately at different times and different refrigeration injection ports depending on the refrigeration compressor. It just happens that the most prevalently used rotary compressor, roller-piston vane compressor, there are more limitations on the location of the injection port and timing of supercharging that can be overcome by clever design. Compressors with the above-mentioned supercharging capabilities are called S-series compressors as described in the Definition Section. Referring to FIG. 29, the initial state of the refrigerant inside the S-series compressor when the supercharging started is represented by A and the refrigerant flow rate entering the compressor from the evaporator is represented by M. After supercharging is complete, the equilibrium state of the refrigerant inside the compressor is represented by G and the mass flow rate discharged by the compressor to the condenser is M+m1+m2+m3 if all three heat exchangers are used. The initial compression from A to A1 involved only the mass flow rate of M. The process A1-G is a very simplistic representation of the transient process of mixing of the two streams during supercharging process: one stream inside the compression chamber already undergoing compression cycle and the other stream injected through the supercharging port from one or all of the three heat exchangers after removing heat from heat sources (motor, pump body and the main liquid refrigerant flow from the condenser in the external vaporizer) at an appropriate evaporating pressure F as the compressor continues to execute its compression cycle. Therefore, from the state represented by G, whose properties can be estimated under simplifying assumptions: supercharging is instantaneous and therefore it can be approximated by instantaneous mixing of two refrigerants at different pressure, temperature and enthalpy. Rest of the compression process will involve the total refrigerant mass flow, M+m1+m2+m3 being the maximum. Compression process after the supercharging is completed is represented by G-B2, where B2 denotes the end of compression process for the total mass flow. Therefore, the full compression process is described as A-A1-G-B2-C1-D1-A. The total compression power can be estimated by adding the enthalpy increase per unit mass of refrigerant multiplied by the respective mass flow for each successive step of the compression process, A-A1-G-B2. With cooling of the pump body, the compression curve turns to the left, as before, and as a result, the compression power per unit mass of refrigerant decreases as illustrated before.

FIG. 30 shows a schematic of a VCS based on the new advanced compressor described as S-series compressor in the Definition section with supercharging capability, which is abbreviated as S-series VCS as described in the Definition Section. Note that there are four mass flow rates shown: M—original mass flow rate for a system without any supercharging, m1—mass flow rate for cooling the motor, m2—mass flow rate for cooling the pump body, and m3—mass flow rate for extra sub-cooling.

The mass flow for each part of the VCS cycle is clearly marked for easy understanding. There is only one supercharging port into the compression chamber as shown through which all three mass flows, m1, m2 and m3 gets injected to be added to the base mass flow of M.

FIG. 31 clarifies and compares various scenarios of thermodynamic cycles with corresponding mass flows in a specific case of when all three diverted refrigerants are reinjected at the same pressure during supercharging process.

S-Series Compressors and VCS:

In order to transform of a common VCS compressor design into that of an S-series compressor, its electrical motor or pump body should be internally disposed within a pressure containment shell. Its motor within its pressure containment shell functions as a secondary heat exchanger, evaporator or vaporizer ("In-shell secondary heat exchanger", hereinafter) in the VCS to actively and effectively cool the motor utilizing mostly liquid refrigerant, or high pressure near critical fluid refrigerant coming out of the high pressure heat exchanger in a CO2-based system as coolant to take advantage of highly effective heat transfer mechanism including evaporation in order to achieve significantly lower operating temperature for the motor than state-of-the-art to achieve significantly increased motor efficiency and longevity. The said refrigerant supplied to the In-shell secondary heat exchanger for the motor or the pump is an appropriate portion of the liquid refrigerant flowing out of the condenser or a high pressure trans-critical fluid flowing out of a high-pressure heat exchanger in a CO2-based system. The said refrigerant liquid or high pressure fluid may be expanded through an expansion device to appropriate pressure(s), fed into the said secondary heat exchanger and vaporized or going through a relatively high-effectiveness heat transfer process on contact with the external and internal surfaces of said motor to remove the heat generated by the motor across a relatively small temperature difference between the coolant and the motor or the coolant and the pump, and, as a result, being able to maintain significantly lower operating temperatures of the motor or the pump and thereby achieving significantly higher electrical-to-mechanical power conversion efficiency, reliability, and longevity of the motor, or relatively high isentropic efficiency of the pump of the said compressor and therefore the VCS, compared to those possible with a state-of-the art compressor for VCS where the compressor discharge gas or suction gas both with relatively poor heat transfer properties is used as coolant and the pump is not actively cooled to increase isentropic efficiency of the compression.

Preferably, the refrigerant flowing out of an In-shell secondary heat exchanger of a VCS, after effectively cooling the motor or the pump is injected back into the compression chamber of the compressor in a supercharging process to maintain the refrigerant mass flow through the evaporator and the cooling capacity of a cooling system and increase the heating capacity of a heat pump.

The supercharging injection port should be appropriately sized, shaped and located to open to the compression chamber after the suction process is completed and during appropriate part of the compression cycle when the compression chamber pressure is low enough for the selected injection pressures, and to be closed to the compression space before the discharge port opens; wherein the supercharging injection of said refrigerant with much lower enthalpy than the gas inside the compressor creates an intercooling or quenching effect for the compression process increasing the isentropic efficiency, all without reducing or otherwise adversely affecting the refrigerant mass flow through the evaporator and the cooling capacity of a cooling system while the heating capacity is enhanced due to the increase in flow rate of the refrigerant through the compressor and therefore the condenser.

An additional portion of the refrigerant stream out of the condenser may be diverted to an expansion device leading to an external secondary heat exchanger (or vaporizer) to produce a relatively low pressure and low temperature, liquid-rich refrigerant to be vaporized by taking away the heat from and cooling the main refrigerant stream out of the condenser in order to add subcooling for the main refrigerant stream flowing to the evaporator and thereby to increase the cooling capacity of the system. Afterwards, the diverted refrigerant, now mostly in vapor, gets injected back into the compression chamber as part of the supercharging process along with said other diverted refrigerant streams. Preferably, the refrigerant injected back into the compression chamber during supercharging has specific enthalpy relatively low compared to that of the refrigerant inside the compression chamber during the supercharging process, and the refrigerant may be vapor only, or mixture of vapor and liquid that would quickly evaporate by the heat of compression inside the compression chamber immediately after supercharging injection in order to maximize the beneficial effect of quenching, i.e., increased isentropic efficiency and relatively low compressor power per unit of refrigerant without causing liquid slugging or dilution of lubricant by excess liquid.

The supercharging can be done through a single port at a location and time appropriate for an overall objective such as lowest motor operating temperature and longevity of the motor, highest COP of a VCS, or highest SEER of a VCS, etc.

Alternatively, the supercharging may be done through multiple and separate ports and multiple points in time in the compression process: e.g., one shortly after the intake port is closed to the compression space at the lowest possible injection pressure and temperature to achieve the lowest operating temperature of the motor, and another to quench the compression process using liquid spray at a location and time appropriate for improved isentropic efficiency while the compressed gas inside the compression space is sufficiently hot during supercharging process to instantaneously vaporize the liquid particles to avoid liquid slugging or oil dilution inside the compression chamber.

It is possible to have a scenario in which cooling of motor can be done at lower pressure and temperature than the main evaporator. In such a case, a relatively small auxiliary compressor can be used to boost the pressure of the cooling fluid from the secondary heat exchanger to an appropriately high enough pressure so that the supercharging process can be performed under the geometric and other constraints of the compressor such as available supercharging valve port size, pumping pressure into the compression space, pressure drop through the port and the power consumption by the auxiliary compressor to achieve the best performance of the entire VCS system for a specific purpose.

The timing and the duration of opening and closing of the supercharging port or valve may be mechanically actuated by the mechanical movement of the compressor's components such as the roller, vane, or by piezo electric actuator, solenoid or other electronic means based on the crank angle information fed from the BLDC drive and/or a pressure transducer.

Preferably, a supercharging valve or port should be designed to have near zero clearance volume in order to minimize the thermodynamic losses due to sudden re-expansion in the beginning of the suction process of remaining high pressure gas trapped in the extra clearance volume at the end of the discharge process.

The refrigerant flowing out of an In-shell secondary heat exchanger, after cooling the motor or the pump, may be injected back into the main evaporator or into the compressor suction line.

The pressure of an In-shell secondary heat exchanger is either set by a thermal expansion valve or other similar device for an intended application or actively modulated over the course of operation to maximize the overall performance of the VCS as the operating conditions change over time.

In a roller-piston/vane type rotary compressor, the super charging injection port may be located in the cylinder wall, vane, or cylinder end plates such as upper and lower flanges or mid plate in case of a twin cylinder version.

In a scroll type rotary compressor, the supercharging injection port(s) may be located in a cylinder end plate in such a way that the supercharging occurs during appropriate time and place during compression process and accommodate the pressure and temperature conditions inside the compression chamber to be conducive to a specific supercharging process, whereas the supercharging processes can occur all at the same time and using the same supercharging port or at different times and different supercharging port locations.

In a screw type compressor, the super charging injection port may be located in cylinder wall at the appropriate location along the axis of the screw compressor in such a way that the supercharging occurs during appropriate time in compression process and accommodate the pressure and temperature conditions inside the compression chamber to be conducive to supercharging process; whereas the three potential supercharging processes can occur all at the same time and using the same supercharging port or at different times and different supercharging port locations.

In a turbine type compressor, the super charging injection port may be located in cylinder wall or the end plates in such a way that the supercharging occurs during appropriate time in compression process and accommodate the pressure and temperature conditions inside the compression chamber to be conducive to supercharging process; whereas the three potential supercharging processes can occur all at the same time and using the same supercharging port or at different times and different supercharging port locations.

In a reciprocating, swash plate, dual rotor or linear motor type compressor, the super charging injection port may be located in cylinder wall or end plate in such a way that the supercharging occurs during appropriate time in compression process and accommodate the pressure and temperature conditions inside the compression chamber to be conducive to supercharging process; whereas the three potential supercharging processes can occur all at the same time and using the same supercharging port or at different times and different supercharging port locations for the three potential supercharging processes.

In all cases of the above mentioned compressors, the containment shell may be a separate containment shell for the motor or the pump body in the case of an open shaft configurations; separate compartments for the motor and the pump within a common contiguous shell delineated by a pressure separating member in a hermetic or semi-hermetic configuration; or a single shell containing both the motor and the compressor pump body in a hermetic or semi-hermetic configuration.

As described in detail herein, in roller-piston/vane type compressors, the scroll compressor, and other rotary compressors, the pump body, the stator in an inner-rotor configuration (or rotor in an outer-rotor configuration) of the motor, and the shell may be attached to one another, either directly or indirectly using an intermediate structural member, or without physically connected to each other using a magnetic drive mechanism between the stator in an inner-rotor configuration (or rotor in an outer-rotor configuration) of the motor and the rotor in an inner-rotor configuration (or stator in an outer-rotor configuration) of the motor structurally connected to the pump body through the motor shaft.

EXAMPLE

Design of a Supercharging Enabled Roller-Piston/Vane Rotary Compressor ("S-Series, Rotary Compressor")

A scroll compressor lends itself very readily to supercharging injection due in large part to the fact that interleaving scrolls form distinct trapped volumes that rotate and gets smaller as the volume approaches the center of axis culminating with the discharge process. Therefore, one can pick and choose the location of the supercharging injection port in the cylinder plate to fit the objective of the supercharging. For example, if the injection is to accept the low temperature and low-pressure refrigerant from the secondary heat exchanger for the motor into the compressor, one would choose the earliest forming pocket by the lobes of the scroll compressor right after the end of suction process to locate the supercharging injection port. With scroll compressors, one can readily choose the location and timing of the supercharging injection with relative ease. That is why a vapor injection of high-pressure refrigerant diverted from the condenser outlet is injected into the scroll compressor chamber in order to increase the heating capacity of commercially available heat pumps using scroll compressor.

The most prevalently used rotary compressor is a rolling piston compressor which has excellent thermal performance as scroll but is much easier to manufacture and less costly to produce compared to scroll compressor. Unfortunately, the rolling piston compressor, is among the most difficult ones to implement the supercharging feature inside due to geometric constraints of having only one roller, and one compression space that rotates and gets smaller as the roller moves within the cylinder culminating with the discharge process. This limitation imposes severe constraints on the location and timing for supercharging injection. For example, to inject refrigerant discharged from the secondary heat exchanger for the motor at the lowest possible pressure and temperature into the compression space: the injection should be done in a very short duration right after suction port is closed to the compression space, especially for achieving lowest possible motor operating temperature. First of all, the precise timing and the short duration requirement right after suction mean the potential travel distance of the valve actuator is extremely small, meaning that the injection port/valve area tends to be small, and the crank angle duration is also very small. However, the supercharging injection valve design needs to provide a large enough port area to minimize the pressure drop during injection, and the valve must open and close precisely in sync with the motion of the roller within the cylinder without time lag and with precise timing for the valve opening duration. On top of that, in order to be acceptable to wide variety of applications, the cost of implementing the supercharging injection feature should be minimal. One has to overcome these obstacles and geometric constrains imposed by the rolling piston rotary compressor and come up with a solution that would be cost competitive.

Figure 32:
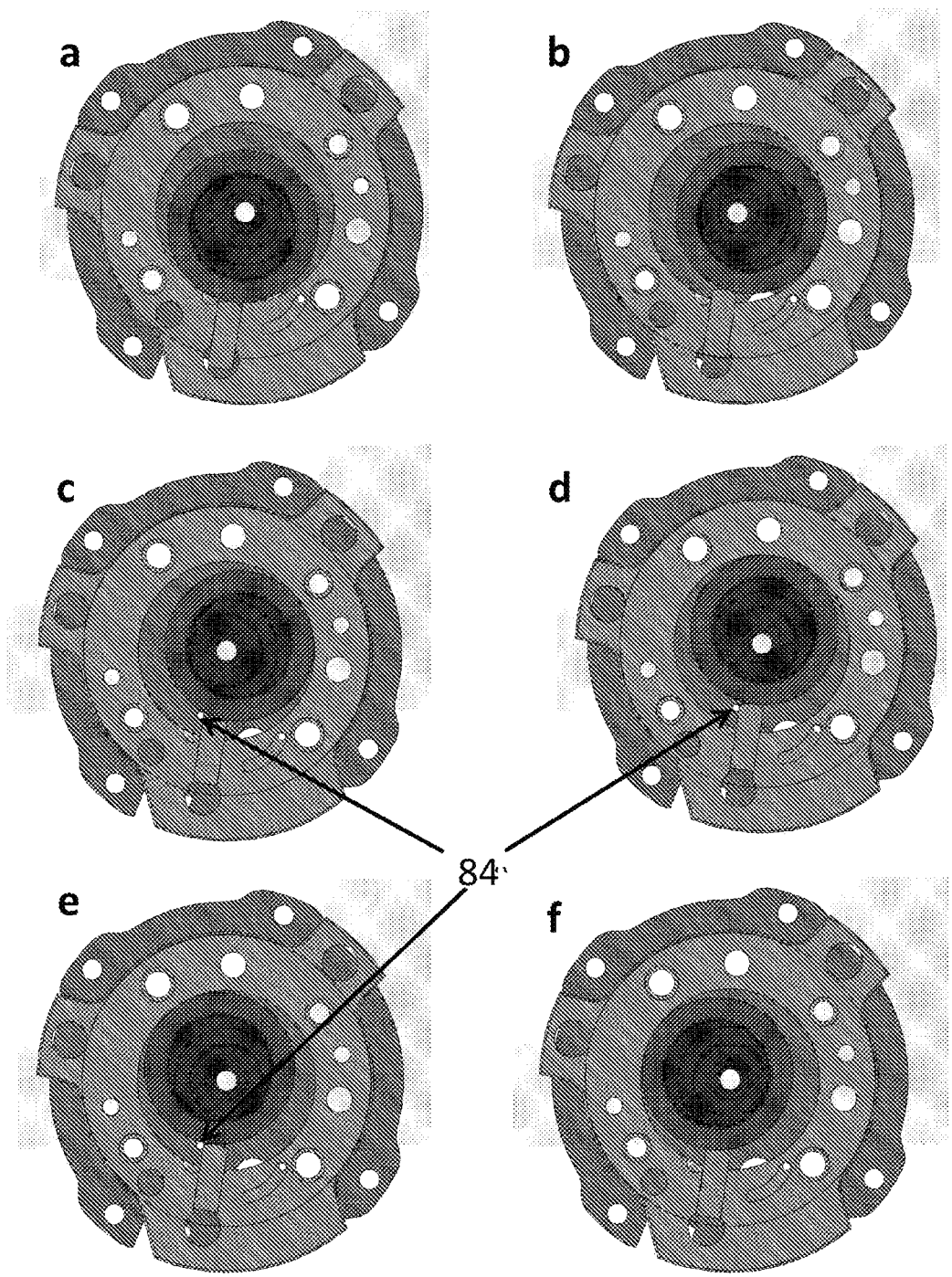
FIG. 32 is a schematic depiction of an embodiment of a supercharging injection port in a rolling piston compressor.

FIG. 32 shows a simplest example of a supercharging port incorporated into a rolling piston compressor. The crank angle positions shown as "a" through "f" are for each step of the supercharging process as an aid to better understanding by the reader in a specific compressor design using a particular performance optimization and therefore may change for different compressors or design operating conditions. Position "a" denotes the rotary compressor at crank angle 0 at which point the discharge process has ended and the suction process begins, and after the suction port is closed by the roller, starts compression process. Position "b" at 80 degree crank angle is where the compression chamber goes through the initial compression process to reach the state point A1 in FIG. 29 at which point the supercharging injection port, until this point was occluded by the roller, begins to be exposed to the compression chamber as the roller moves away from the vane slot and the vane is moving out of the vane slot to maintain contact with the roller even though one cannot yet see the supercharging injection port in FIG. 32. Position "c" at 120 degree crank angle and "d" are when the injection port is still fully open for supercharging process. The small white circular hole at the left tip of the vane shown at position "c" and "d" is the supercharging injection port 84. Position "e" at 218 degree crank angle is where the injection port begins to decrease in area by the movement of the roller toward the vane slot and the injection port and the vane begins to recede into the vane slot while maintaining the contact with the roller. Position "f" at 255 degree crank angle is when the injection port is completely closed, supercharging is competed corresponding to the state point G in FIGS. 29 and 31. The ensuing compression process correspond to the compression process G-B2 involving the total mass (M+m1+m2+m3, if all three supercharging streams as shown in FIGS. 29, 30 and 31 are activated) inside the compression chamber rapidly decreasing in volume leading up to the discharge process. Note that, in the current design, the supercharging port is sized and positioned appropriately so that the supercharging process does not start until the suction process is completed and closes before the discharge process start.

The injection port design shown in FIG. 32 is a single injection port design optimized for a rolling piston rotary compressor (which is one of roller piston/vane rotary compressor and thus a similar design can be easily transferable to other roller piston/vane compressors such as a swing compressor and a concentric vane compressor), for specific refrigerant and operating conditions using mechanical motion of the roller to control the injection time and duration in order to achieve a specific performance objective and therefore its usefulness is somewhat limited.

The injection time and duration of the supercharging injection may be better controlled by having injection valves that can be controlled for specific purpose for maximum benefits. The valve can be actuated and timed by the movement of the components within the pump such as vane, roller or crankshaft. The valve can also be actuated electronically or piezoelectrically in conjunction with a fast response microprocessor according to the crank angle information fed by the BLDC controller and/or instantaneous compression pressure information. With the active valve control of the supercharging injection, the port location and size can become quite flexible and will be optimized according to the specific role/objective of the supercharging injection such as motor cooling at the lowest evaporation temperature, compression process quenching for higher isentropic efficiency of the compressor, etc. The optimal number, sizing, timing, duration, method of flow metering control for the injection, and location(s) of the supercharging injection port(s) into the compression space are to be determined based on the following considerations: ease of access to the compression chamber, potential advantages of multiple injection ports and different evaporation pressures for each of the heat exchangers (in-shell secondary heat exchanger for the motor, in-shell secondary heat exchanger for the pump and external vaporizer for extra sub-cooling) against system complexity and cost of implementation.

Figure 33:
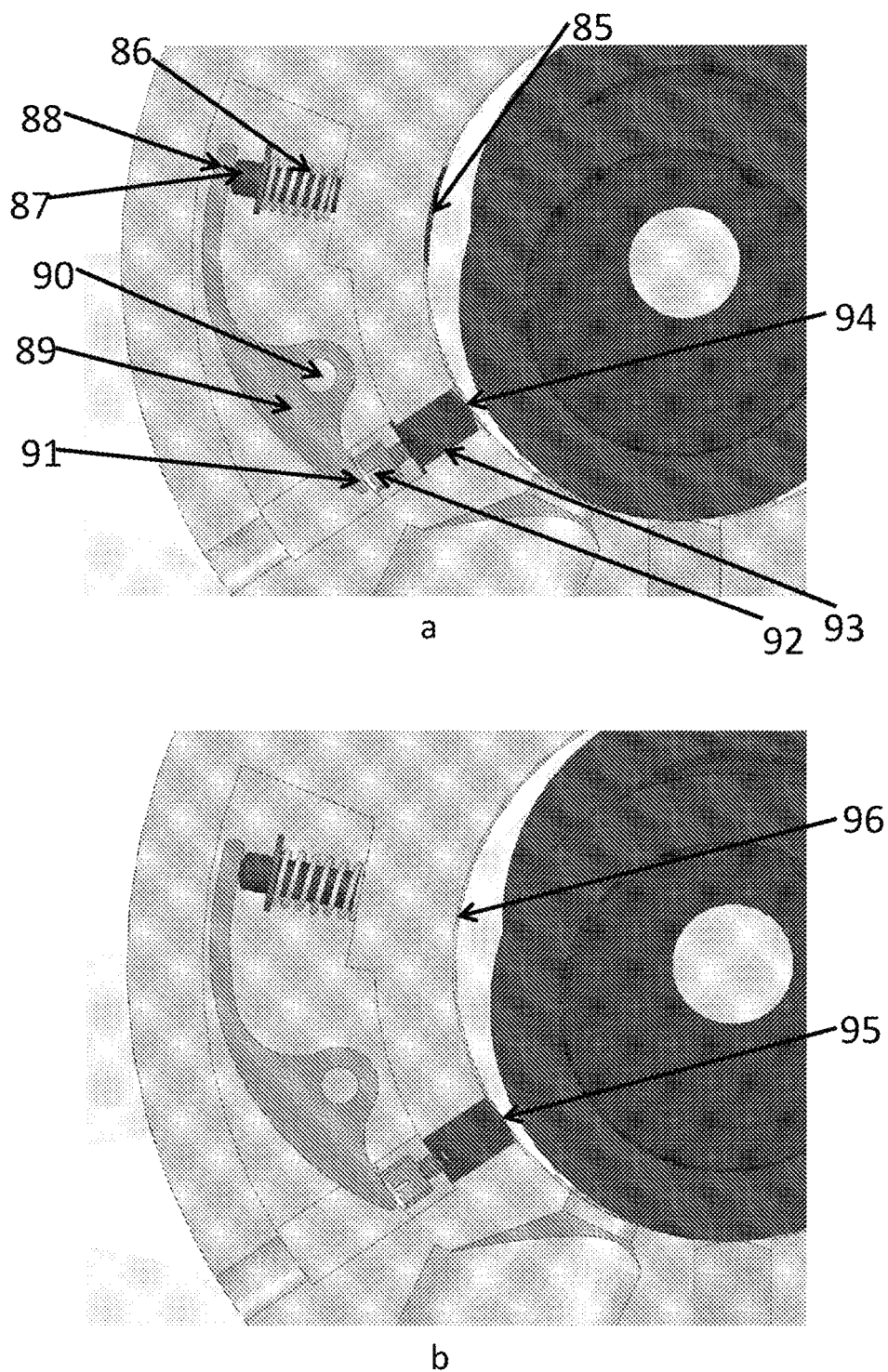
FIG. 33 is a schematic depiction of an embodiment of a Roller Activated Supercharging Valve.
Figure 34:
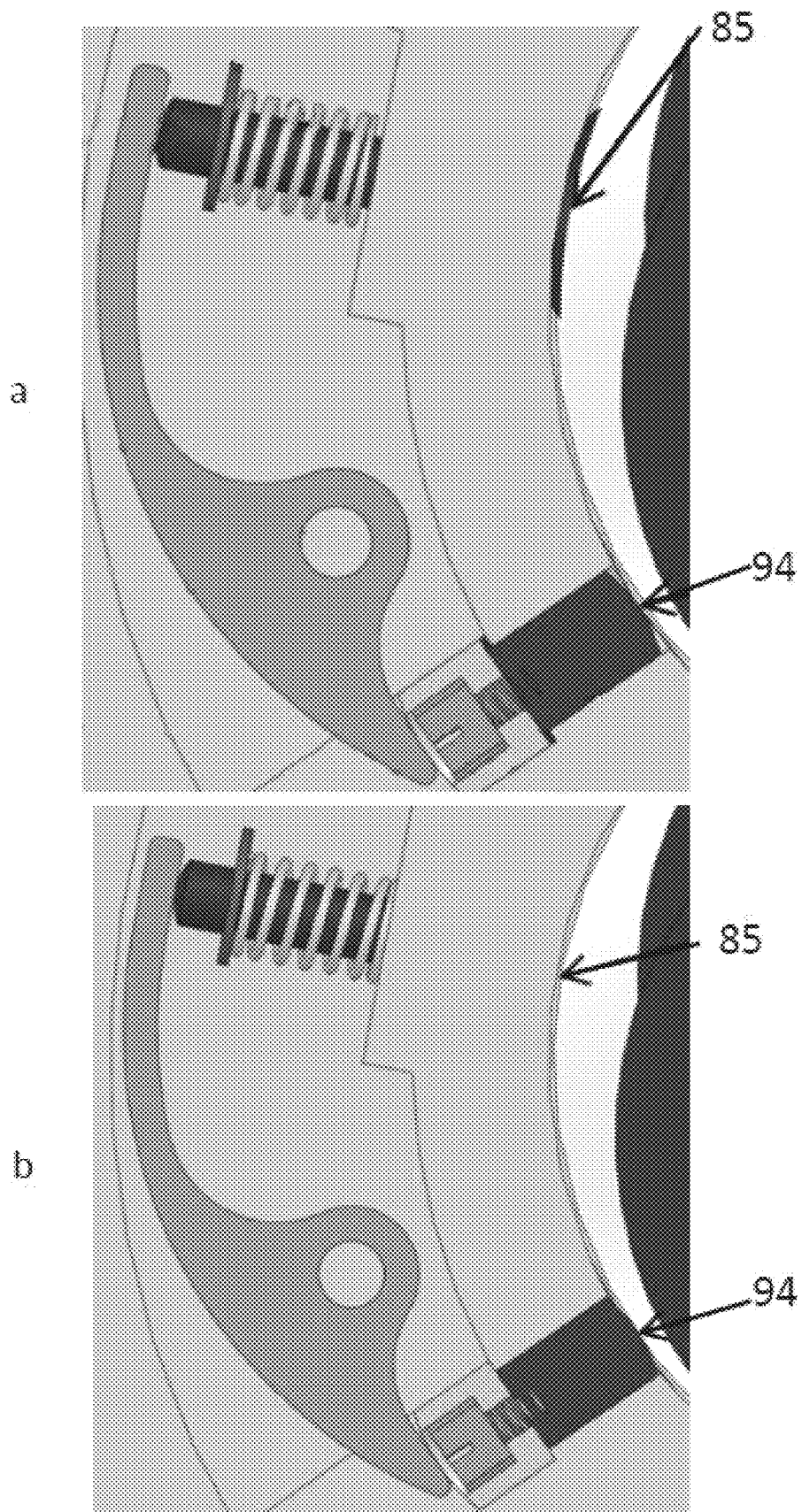
FIG. 34 is a detailed view of the Roller Activated Supercharging Valve of FIG. 33.

The embodiment shown in FIG. 33 is one such example of supercharging injection valve. This supercharging valve is actuated by the motion of the roller as it rolls around the inner diameter surface of the cylinder bore. It consists of a Valve 85 (slightly open position as shown in FIG. 33a whereas, in FIG. 33b, it is completely closed by retracting into the cylinder wall to form part of the cylinder bore), damped and preloaded by Spring 86 with Rod 87, forced to be in contact with Valve End 88 of a Rocker 89, that is pivoted on Rocker Pivot 90, and the Actuator side of the Rocker Arm 91 is forced by the preloading to be in constant contact with the Head 92 of the Actuator 93 (this embodiment shows a screw for different distance of protrusion into the cylinder bore needed for various supercharging functions) and the Bore end 94 of the Actuator 93. The cross-section of the valve, rod, and the actuator can be rectangular or circular or other appropriate shapes as needed. When the cross-section is rectangular, it will be easy to "clock" the orientation of the valve and the actuator to ensure a smooth bore surface when the valve is closed and interface with the roller as it moves. Any micro-grooves formed between the valve head and the valve seat in the cylinder wall will most likely be covered with oil to minimize or prevent undesirable leaks as the roller passes over the valve and the actuator. When the roller rolls toward Bore end 94 of the Actuator 93, the Actuator 93 gets pushed in to completely retract out of the bore and the Valve End 88 of the Rocker 89 translating and amplifying the movement of the Actuator 93 and the valve Rod 87 pushes and opens the supercharging valve into the cylinder to inject refrigerant. Note that the leverage ratio between the travel distance of the Actuator 93 and the travel distance of the Valve 85 can be designed to provide sufficient valve movement and injection port area to minimize the pressure drop of the refrigerant passing through the valve. As the roller passes over and moves away from and loses contact with the tip of the valve actuator, which is shaped like a tip of a vane where it touches the roller in the current embodiment but can have different shapes, the tip of the actuator again protrudes back into the compression chamber as before and closes the valve port flush with the curved surface of the cylinder. FIG. 34a shows expanded views of the valve 85 in its open position and the Bore End of the Actuator 94 fully depressed into its slot by the roller. FIG. 34b shows expanded views of the valve 85 in its closed position to form part of the Bore and the Bore End of the Actuator 94 fully protruding into the compression space.

This particular configuration of the supercharging injection valve is designed to have the zero-clearance volume feature that helps keep the re-expansion loss to a minimum regardless of where one may reasonably place the injection port. A similar supercharging injection valve design can be developed with different shapes of actuators and valves and flow paths all based on the concept of using the movement of the roller. Similar injection valves can also be tied to the movement of the vane as well. These will not be discussed here for obviousness and brevity. With adjustments in the actuator length sticking out into the compression chamber, the valve shown in FIG. 33 and FIG. 34 can be placed in practically at any crank angle between the onset of compression and onset of discharge process during the compression process to fit any one of various objectives of the supercharging described in this disclosure. This type of valves would transform a roller piston/vane rotary compressor just as or even more versatile than a scroll compressor in terms of supercharging capabilities with supercharging ports that could be placed at different locations on the inner side of the cylinder opening at optimal times: an example is for compression quenching by liquid injection toward the latter part of the compression cycle to instantaneously vaporize the liquid mist upon injection into sufficiently hot compressed gas within the compression chamber at precisely optimum start time and duration. Similar types of valves can be used in other compressors for the purpose of supercharging to turn them into S-Series compressors with more flexibilities than simply using open ports. For roller piston/vane type rotary compressors, as described, the movement of the actuator of the valve was determined by the changing radial distance between the roller and the cylinder. In a scroll compressor and screw compressors, a simple injection port without the valve will be sufficient to turn them into S-series compressors with most of the functionalities. If the need should ever arise for installing a similar valve in a Scroll compressor, the valve can be located on the end plate of the cylinder and opened and closed by the movement of the lobes of the scroll as they move across the actuator. In a compressor with reciprocating motion of a piston within a cylinder, a similar valve can be installed on a cylinder wall and opened and closed by the movement of the piston. In a screw compressor, a similar valve could be installed at an appropriate location along the conical housing to open and close at required location and time at the right injection pressure.

None of the components described above as described in FIG. 33 for the supercharging valve/port are costly items and most of the components can be produced by sinter-casting, and cavities in the cylinder block to house the valve, spring, rocker and the actuator can also be produced as part of the cylinder block forming process such as sinter casting. The valve face can be precision ground with the rest of the cylinder during cylinder ID grinding operation as well.

By extension, one can easily apply the same or similar modifications to achieve the same functionalities in other types of compressors in use today such as scroll compressors, reciprocating compressors, linear compressors, turbine type compressors, screw compressors, etc. so long as these compressors can accommodate the necessary supercharging injection ports to take advantage of the secondary heat exchangers for cooling the motor and the compressor pump effectively. Most compressors can accommodate the supercharging since there are no obvious obstacles to apply the same principles illustrated herein for S-Series roller piston/vane rotary compressors: enclosing the motor and pump to act as secondary heat exchangers is readily possible with each of these compressors so long as the supercharging ports can be designed into these compressors in a cost competitive manner. The tasks mainly consist of geometric design as to the location, shape and the selection of actuation methods of the supercharging port/valve for each type of these compressors. The actuation method described as an example is mechanical actuation tied to the motion of the roller but it may readily be extended to other moving parts such as vane, piston, crank shaft, etc. In addition, the actuator design can be readily modified to include activation by electronic means such as piezoelectric actuators connected to a piezoelectric device and its minute displacements can be amplified to satisfy the injection valve displacement requirement. With their ultrafast response time, this drive would be able to precisely time the supercharging process to accommodate the fast changing compression process with the help of crank angle info fed by the BLDC drive and/or fast pressure transducer. There can be many different ways to achieve supercharging and specific designs are not the main thrust of this patent. Rather, they are considered minor details compared to the main concept of using evaporative or other highly effective cooling of the motor and/or the pump in secondary heat exchangers to effectively cool the motor or the pump. One can gain further benefits by incorporating supercharging injection of refrigerants flowing out of these secondary heat exchangers back into the compression space.

The present disclosure presented numerous aspects related to providing compressors that exhibit substantial performance increases compared to current state of the art compressors.

FIG. 5 showed the potential COP increases for a VCS if the motor gets cooled by evaporation to reach operating temperature of 19 deg C. instead of 150 C. It projects a potential 34.3% increase in COP but we are diverting 12.3% flow from the condenser that would have gone into the evaporator and the corresponding decrease in cooling capacity will adversely affect the COP. In order to keep the cooling capacity at the same level, it is necessary to increase either the speed of operation or the displacement by 12.3%, either of which will immediately increase the power required for the compressor at least by the same ratio albeit at much higher motor efficiency, and therefore the projected 34.3% increase in COP would not materialize.

In order to further improve the performance of the new compressor and the VCS based on the compressor, another component, pump body, can be cooled by cooling the body or by quenching the compression chamber internally to increase the isentropic efficiency and thereby reduce the power for compression per unit mass of refrigerant processed by the compressor. For this purpose, an active cooling of the pump body, both inside and outside the compression chamber is advocated preferably by evaporation of additional liquid diverted/drawn from the condenser. In one example, it can be assumed that a 10% increase in condenser liquid flow is needed to satisfy the requirement for pump cooling including surface cooling and liquid injection for quenching during compression to increase isentropic efficiency of the compression. This would reduce the evaporator bound refrigerant flow proportionately and to prevent the reduction, one would either increase the displacement of the compressor by 10% or increase the operating speed by 10% either of which would increase the compressor power by at least by 10% and therefore the projected increase in COP due to compressor cooling would not occur. In other words, in this simplified example, the original compressor throughput/evaporator flow rate M is 1.00, the motor cooling flow $m1$ is 0.123, and the compressor pump cooling flow $m2$ is 0.1 and the flow rate through the evaporator will become 1−(0.123+0.1)=0.777 and the cooling capacity will be only 77.7% of the original cooling capacity.

By re-injecting these cooling fluids from the secondary heat exchangers ($m1+m2$) back into the compression space by supercharging injection, the effective pumping rate of the compressor increases by the same amount as the injected flow rate used for cooling the motor and the pump while the flow rate M and cooling capacity of the evaporator remain at the original levels. One can also envision injection of liquid refrigerant that will flash-vaporize immediately after injected into the compression chamber to maximize the intercooling effect to bend the compression curve to the left as shown in FIG. 29 and increase the isentropic efficiency more. In other words, utilizing supercharging, one may potentially achieve the said 34% increase in COP at the stated operating conditions without losing the cooling capacity of the VCS or inducing other penalties. In this new system using the compressor with the new cooling methods for the motor and the compressor with the added feature of supercharging, it may be possible to reduce the shaft power per unit mass of the refrigerant needed to compress the total refrigerant per cycle ($M+m1+m2$=1.223) to the extent that the required compressor power despite added mass flow approaches the original compressor power or even go lower. If the total compressor shaft power needed becomes the same as before despite the added mass flow for cooling the motor and the pump, because the motor efficiency is far higher (34.3% in the current scenario) owing to the fact that the motor operating temperature is much lower at 19 C compared to 150 C, the electrical power input to the motor will be only 74.4% (1/(1+0.343)=0.744) of the original electrical power input, resulting in 34.4% increase in COP for cooling, much higher SEER for heating and much higher heating capacity than those achievable with a VCS using state-of-the-art compressors. The actual performance gains in motor efficiency, compressor isentropic efficiency, COP, heating capacity and SEER of the new S-Series compressor and associated S-Series VCS will depend on the effectiveness of in-shell secondary heat exchangers for the motor and pump, and the effective implementation of the supercharging feature in practice.

The present disclosure presents a firm basis to significantly improve the performance of VCS for both cooling and heating. One caveat designing the new S-series VCS using the new S-series compressors is that the condenser heat exchanger design and the fan will have to accommodate the increased heat output by increasing the heat exchanger effectiveness, surface area or higher powered fan, and the motor for the compressor will have to be able to handle the increased torque to handle higher throughput.

To speed up the commercially viable development of a S-series compressor based on the principle of combining far more effective methods of cooling for the motor and pump with supercharging, several innovative design approaches and required modifications to the state-of-the-art roller/vane type rotary compressors necessary to accommodate the new designs have been devised and presented herein. They come in the form of high shell/low shell configuration with lubrication system very similar to that of the state-of-the-art high shell roller piston/vane type with passive oil pumping based on high sump pressure; low-shell configuration with active oil pumping, and fixed and adjustable pressure configurations with many innovative geometric configurations and distinct requirements such as imbedded oil pumping mechanism, shaft force balancing cavity, vane back pressure balancing features, etc. to name a few. Also, an innovative, practical and versatile configuration of supercharging valve actuated by the movement of the roller was introduced as part of a concerted effort to transform a roller piston/vane rotary compressor as well as other VCS compressors into commercially viable S-series compressors.

To recap, the use of a new S-Series compressor and S-series VCS incorporating the S-Series compressor would result in significant benefits of having a very low operating temperature of the motor leading to much higher motor efficiency and longevity, and cooling the pump body with significant boost in compression isentropic efficiency and system performance in COP or SEER and reliability of S-Series VCS. The S-Series roller-piston/vane compressors would become commercially viable in a variety of operating conditions and applications worldwide making a significant impact in global reduction of CO2.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A compressor comprising:
   at least one pressure containment shell;
   a motor positioned in a pressure containment shell of the at least one pressure containment shell;
   a pump body positioned in a pressure shell of the at least one pressure containment shell, wherein the pump body includes a pump operatively coupled to the motor;
   a liquid injection tube configured to accept refrigerant diverted from a condenser or a high pressure heat exchanger of a refrigeration system, wherein the liquid injection tube is configured to spray the diverted refrigerant onto the motor to cool the motor by evaporation of the diverted refrigerant to decrease operating temperature of the motor;

a compression chamber within the pump body; and at least one supercharging port or valve provided in the pump body leading into the compression chamber configured to receive the diverted refrigerant, after cooling the motor, such that the diverted refrigerant is injected back into the compression chamber through the at least one supercharging port or valve during an initial phase of the compression process of the pump when a suction port of the compressor is closed, and, at an end of the compression process, is discharged to the condenser together with an original refrigerant output of the pump without supercharging, such that a recirculating loop for the diverted refrigerant is created between the compressor and the condenser or the high pressure heat exchanger.

2. The compressor of claim 1, wherein the pump has a pump heat exchanger configured to accept refrigerant diverted from the condenser or the high pressure heat exchanger of the refrigeration system, wherein the pump heat exchanger is configured to cool a pump wall and indirectly cool compression gas to decrease operating temperature of the pump wall, decrease a discharge temperature and increase an efficiency of the compressor and lower a mechanical power used by the pump per unit mass flow rate of refrigerant, wherein the diverted refrigerant after cooling the pump body is injected back into the compression chamber through a supercharging port of the at least one supercharging port or valve during a portion of the compression process, and, at the end of the compression process, is discharged to the condenser.

3. The compressor of claim 1, wherein a supercharging port of the at least one supercharging port or valve is configured to accept a direct injection into the compression chamber of refrigerant diverted from the condenser or the high pressure heat exchanger of the refrigeration system, whereby the pump is configured to evaporate the diverted refrigerant in the compression chamber to cool and quench refrigerant during the compression process such that a discharge temperature is decreased, an efficiency of the compressor is increased and a mechanical power used by the pump per unit mass flow of refrigerant is reduced, wherein at an end of the compression process, the direct injection of diverted refrigerant is discharged to the condenser together with the original refrigerant output of the pump without the supercharging.

4. The compressor of claim 1, wherein the at least one supercharging port or valve is located in a cylinder wall, vane, or cylinder end plate of the compressor.

5. The compressor of claim 1, wherein a timing and a duration of opening and closing of the at least one supercharging port or valve is mechanically actuated by mechanical movement of:
- a component of the compressor, wherein the component of the compressor comprises a roller, a vane, a crankshaft, or a piston;
- a piezo electric actuator; and/or
- an electronic actuator.

6. The compressor of claim 1, wherein the compressor is one of a roller-piston/vane rotary compressor, scroll rotary compressor, screw compressor, turbine compressor, reciprocating compressor, swash plate compressor, dual rotor compressor, or linear motor compressor.

7. The compressor of claim 6, wherein the compressor is a roller-piston/vane rotary compressor, wherein the at least one supercharging port or valve is a valve and includes a valve rod, a spring configured to bias the valve toward a closed position, a pivoting rocker in contact with the valve rod at a valve side of the pivoting rocker, and an actuator in contact with the pivoting rocker at an actuator side of the pivoting rocker, wherein the at least one supercharging port or valve is configured to inject the diverted refrigerant into the compression chamber by a roller of the compressor engaging the actuator and moving the valve to an open position via the pivoting rocker.

8. The compressor of claim 6, wherein the compressor is a roller-piston/vane rotary compressor, and wherein the pump body further comprises a means for balancing forces acting on ends of a shaft of the pump body if the ends of the shaft are exposed to different shell pressures during compressor operation.

9. The compressor of claim 6, wherein the compressor is a roller-piston/vane rotary compressor, and wherein the pump body further comprises a means for maintaining a back pressure of a vane at a discharge pressure when a shell pressure outside the pump body is lower than the discharge pressure.

10. The compressor of claim 6, wherein the compressor is a roller-piston/vane rotary compressor, and wherein the pump body further comprises a lubricant reservoir within a shaft of the compressor, wherein the lubricant reservoir is maintained at a pressure above a critical reservoir pressure and below a discharge pressure.

11. The compressor of claim 6, wherein the compressor is a roller-piston/vane rotary compressor, and wherein the compressor further comprises a means for maintaining a pressure inside the at least one pressure containment shell for the pump to be fixed at a suction pressure, a pressure between the suction pressure and a critical reservoir pressure, an intermediate pressure between the critical reservoir pressure and a discharge pressure, or the discharge pressure.

12. The compressor of claim 6, wherein the compressor is a roller-piston/vane rotary compressor, and wherein the compressor further comprises means for modulating a pressure inside the at least one pressure containment shell for the pump between a suction pressure and a discharge pressure, between the suction pressure and a critical reservoir pressure, or between the critical reservoir pressure and the discharge pressure.

13. The compressor of claim 6, wherein the compressor is a roller-piston/vane rotary compressor, wherein the compressor is a low-shell compressor, and wherein the compressor further comprises an oil sump and an integrated oil pump disposed on a shaft of the compressor, wherein the integrated oil pump is configured to utilize discharge gas as a motive force to pump oil into the pump body.

14. The compressor of claim 1, wherein the liquid injection tube is disposed at a top portion of the pressure containment shell.

15. The compressor of claim 1, wherein the compressor is configured such that the supercharging occurs at multiple points in time during the compression process of the pump using the at least one supercharging port or valve.

16. The compressor of claim 15, wherein the at least one supercharging port or valve is a plurality of supercharging ports or valves, and wherein the compressor is configured to provide a discrete injection at each point in time when supercharging occurs from a separate supercharging port or valve of the plurality of supercharging ports or valves.

17. The compressor of claim 15, wherein the multiple points in time during the compression process include a first point in time after an intake port is closed and a second point in time when compressed gas in the compression chamber is sufficiently hot to instantly vaporize liquid particles, wherein the second point in time is later than the first point in time.

18. The compressor of claim 1, further comprising a separator dividing the at least one pressure containment shell into a first section and a second section, wherein the pump is positioned within the first section and the motor is positioned within the second section, wherein the first section is at a higher temperature and a higher pressure than the second section.

19. A refrigeration system comprising:
a condenser configured to condense a refrigerant from a compressed gas or vapor phase to a liquid phase, or a high pressure heat exchanger to cool compressed trans-critical fluid refrigerant;
at least one expansion device configured to receive condensed refrigerant from the condenser or cooled high pressure trans-critical fluid refrigerant and expand the refrigerant to a lower pressure, liquid or mostly liquid phase of the refrigerant;
an evaporator configured to receive the refrigerant from the at least one expansion device and evaporate the refrigerant from the liquid or mostly liquid phase to gas or vapor phase; and
a compressor comprising:
at least one pressure containment shell;
a motor positioned in a pressure containment shell of the at least one pressure containment shell;
a pump body positioned within a pressure containment shell of the at least one pressure containment shell, wherein the pump body includes a pump operatively coupled to the motor;
a liquid injection tube configured to accept refrigerant diverted from the condenser or the high pressure heat exchanger, wherein the liquid injection tube is configured to spray the diverted refrigerant onto the motor to cool the motor by evaporation of the diverted refrigerant to decrease operating temperature of the motor;
a compression chamber within the pump body; and
at least one supercharging port or valve provided in the pump body leading into the compression chamber, wherein the diverted refrigerant, after cooling the motor, is injected back into the compression chamber through the at least one supercharging port or valve during a portion of a compression process of the pump, and, at an end of the compression process, is discharged to the condenser together with an original refrigerant output of the pump without the supercharging, such that a recirculating loop for the diverted refrigerant is created between the compressor and the condenser or the high pressure heat exchanger, wherein a timing and a duration of opening and closing of the at least one supercharging port or valve is mechanically actuated by mechanical movement of:
a component of the compressor, wherein the component of the compressor comprises a roller, a vane, a crankshaft, or a piston;
a piezo electric actuator; and/or
an electronic actuator.

20. The refrigeration system of claim 19, wherein a portion of the refrigerant is diverted from the condenser or the high pressure heat exchanger through the at least one expansion device, wherein the pump has a pump heat exchanger configured to accept the lower pressure, lower temperature liquid or mostly liquid phase refrigerant, wherein the pump heat exchanger is configured to cool a pump wall and indirectly cool compression gas to decrease operating temperature of the pump wall, decrease a discharge temperature and increase an efficiency of the compressor and lower a mechanical power used by the pump per unit mass flow rate of refrigerant, wherein the diverted refrigerant after cooling the pump body is injected back into the compression chamber through a supercharging port of the at least one supercharging port or valve during a portion of the compression process.

21. The refrigeration system of claim 19, wherein a portion of the refrigerant is diverted from the condenser or the high pressure heat exchanger through the at least one expansion device, wherein a supercharging port of the at least one supercharging port or valve is configured to accept a direct injection into the compression chamber of refrigerant diverted from the condenser or the high pressure heat exchanger, whereby the pump is configured to evaporate the diverted refrigerant in the compression chamber to cool and quench refrigerant being compressed by the pump during the compression process, such that a discharge temperature is decreased, an efficiency of the compressor is increased, and a mechanical power used by the pump per unit mass flow of refrigerant is reduced.

22. The refrigeration system of claim 19, wherein the at least one supercharging port or valve of the compressor is located in a cylinder wall, vane, or cylinder end plate of the compressor.

23. The refrigeration system of claim 19, wherein the liquid injection tube is disposed at a top portion of the pressure containment shell.

24. A compressor comprising:
at least one pressure containment shell;
a motor and a motor heat exchanger, wherein the motor and the motor heat exchanger are positioned in a pressure containment shell of the at least one pressure containment shell;
a pump body positioned in a pressure shell of the at least one pressure containment shell;
wherein the pump body includes a pump operatively coupled to the motor;
wherein the motor heat exchanger is configured to accept refrigerant diverted from a condenser or a high pressure heat exchanger of a refrigeration system, whereby the motor heat exchanger is configured to cool the motor to decrease operating temperature of the motor;
a compression chamber within the pump body; and
at least one supercharging port or valve provided in the pump body leading into the compression chamber configured to receive the diverted refrigerant, after cooling the motor, such that the diverted refrigerant is injected back into the compression chamber through the at least one supercharging port or valve during a compression process of the pump, and, at an end of the compression process, is discharged to the condenser together with an original refrigerant output of the pump without the supercharging, such that a recirculating loop for the diverted refrigerant is created between the compressor and the condenser or the high pressure heat exchanger, wherein a timing and a duration of opening and closing of the at least one supercharging port or valve is mechanically actuated by mechanical movement of:
a component of the compressor, wherein the component of the compressor comprises a roller, a vane, a crankshaft, or a piston;

a piezo electric actuator; and/or an electronic actuator.

25. The compressor of claim 24, wherein the compressor is one of a roller-piston/vane rotary compressor, scroll rotary compressor, screw compressor, turbine compressor, reciprocating compressor, swash plate compressor, dual rotor compressor, or linear motor compressor.

26. The compressor of claim 25, wherein the compressor is a roller-piston/vane rotary compressor, wherein the at least one supercharging port or valve is a valve and includes a valve rod, a spring configured to bias the valve toward a closed position, a pivoting rocker in contact with the valve rod at a valve side of the pivoting rocker, and an actuator in contact with the pivoting rocker at an actuator side of the pivoting rocker, wherein the at least one supercharging port or valve is configured to inject the diverted refrigerant into the compression chamber by the roller of the compressor engaging the actuator and moving the valve to an open position via the pivoting rocker.

27. The compressor of claim 24, wherein the compressor is a roller-piston/vane rotary compressor, wherein the compressor is a low-shell compressor, and wherein the compressor further comprises an oil sump and an integrated oil pump disposed on a shaft of the compressor, wherein the integrated oil pump is configured to utilize discharge gas as a motive force to pump oil into the pump body.

28. The compressor of claim 24, wherein the refrigeration system comprises:

the condenser, wherein the condenser is configured to condense the refrigerant from a compressed gas or vapor phase to a liquid phase;

at least one expansion device configured to receive condensed refrigerant from the condenser and expand the refrigerant to a lower pressure, liquid or mostly liquid phase of the refrigerant; and an evaporator configured to receive the refrigerant from the at least one expansion device and evaporate the refrigerant from the liquid or mostly liquid phase to gas or vapor phase.

29. The compressor of claim 24, wherein the refrigeration system comprises:

the high pressure heat exchanger, wherein the heat exchanger is configured to cool compressed trans-critical fluid refrigerant;

at least one expansion device configured to receive cooled high pressure trans-critical fluid refrigerant from the heat exchanger and expand the refrigerant to a lower pressure, liquid or mostly liquid phase of the refrigerant; and an evaporator configured to receive the refrigerant from the at least one expansion device and evaporate the refrigerant from the liquid or mostly liquid phase to gas or vapor phase.

\* \* \* \* \*